US010755735B2

(12) United States Patent
Ozawa et al.

(10) Patent No.: US 10,755,735 B2
(45) Date of Patent: Aug. 25, 2020

(54) APPARATUS CAPABLE OF DETERMINING DEVIATION AMOUNT BETWEEN MAGNETIC HEAD AND MAGNETIC TAPE BASED ON READING SERVO PATTERN

(71) Applicant: FUJIFILM Corporation, Tokyo (JP)

(72) Inventors: Eiki Ozawa, Minami-ashigara (JP); Norihito Kasada, Minami-ashigara (JP); Atsushi Musha, Minami-ashigara (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 16/456,965

(22) Filed: Jun. 28, 2019

(65) Prior Publication Data

US 2020/0005820 A1  Jan. 2, 2020

(30) Foreign Application Priority Data

Jun. 29, 2018  (JP) ................................. 2018-125579
Mar. 29, 2019  (JP) ................................. 2019-066040

(51) Int. Cl.
  *G11B 5/584*  (2006.01)
  *G11B 5/596*  (2006.01)
  (Continued)

(52) U.S. Cl.
  CPC .......... *G11B 5/59677* (2013.01); *G11B 5/012* (2013.01); *G11B 5/71* (2013.01); *G11B 15/46* (2013.01); *G11B 5/09* (2013.01); *G11B 5/54* (2013.01); *G11B 5/584* (2013.01); *G11B 5/588* (2013.01); *G11B 5/70* (2013.01); *G11B 5/7006* (2013.01)

(58) Field of Classification Search
None
See application file for complete search history.

(56) References Cited

U.S. PATENT DOCUMENTS 6,744,585 B1 *  6/2004  Nishida ................... G11B 5/09
                                                          360/65
7,092,199 B2 *  8/2006  Nakamura ............ G11B 5/584
                                                          360/77.12

(Continued)

FOREIGN PATENT DOCUMENTS

JP  2011-134372 A  7/2011
JP  2016-110680 A  6/2016

*Primary Examiner* — Tan X Dinh
(74) *Attorney, Agent, or Firm* — Sughrue Mion, PLLC

(57) ABSTRACT

A magnetic tape apparatus, in which a tilt cos θ of the hexagonal ferrite powder with respect to a surface of the magnetic layer acquired by cross section observation by STEM is 0.85 to 1.00, a reading element unit includes a plurality of reading elements each of which reads data by a linear scanning method from a specific track region including a reading target track in a track region included in the magnetic tape, an extraction unit performs a waveform equalization process according to a deviation amount between positions of the magnetic tape and the reading element unit, with respect to each reading result for each reading element, to extract data derived from the reading target track from the reading result, and the deviation amount is determined in accordance with a result obtained by reading of the servo pattern included in the magnetic layer by a servo element.

19 Claims, 21 Drawing Sheets

(51) Int. Cl.
  *G11B 5/71*   (2006.01)
  *G11B 15/46*  (2006.01)
  *G11B 5/012*  (2006.01)
  *G11B 5/09*    (2006.01)
  *G11B 5/70*    (2006.01)
  *G11B 5/588*   (2006.01)
  *G11B 5/54*    (2006.01)

(56) References Cited

U.S. PATENT DOCUMENTS

| | | | |
|---|---|---|---|
| 7,187,511 B2 * | 3/2007 | Nakao | G11B 5/584 |
| | | | 360/48 |
| 7,295,394 B2 * | 11/2007 | Nagata | G11B 5/035 |
| | | | 360/46 |
| 7,494,728 B2 * | 2/2009 | Kuse | G11B 5/70 |
| | | | 428/840.2 |
| 7,532,425 B2 * | 5/2009 | Abe | G11B 5/035 |
| | | | 360/29 |
| 7,755,863 B2 | 7/2010 | Neumann et al. | |
| 9,978,414 B1 * | 5/2018 | Kaneko | G11B 5/3909 |
| 10,074,393 B2 * | 9/2018 | Kaneko | G11B 5/714 |
| 10,504,546 B2 * | 12/2019 | Kaneko | G11B 5/584 |
| 10,510,369 B2 * | 12/2019 | Kaneko | G11B 5/7305 |
| 2003/0142431 A1 * | 7/2003 | Ejiri | G11B 5/00 |
| | | | 360/55 |
| 2016/0171993 A1 | 6/2016 | Okubo | |
| 2020/0005814 A1 * | 1/2020 | Kasada | G11B 5/00813 |
| 2020/0005817 A1 * | 1/2020 | Ozawa | G11B 5/584 |
| 2020/0005818 A1 * | 1/2020 | Kasada | G11B 5/70 |
| 2020/0005822 A1 * | 1/2020 | Kasada | G11B 5/70678 |
| 2020/0005827 A1 * | 1/2020 | Ozawa | G11B 20/10046 |
| 2020/0005828 A1 * | 1/2020 | Ozawa | G11B 20/10055 |

* cited by examiner

APPARATUS CAPABLE OF DETERMINING DEVIATION AMOUNT BETWEEN MAGNETIC HEAD AND MAGNETIC TAPE BASED ON READING SERVO PATTERN

CROSS-REFERENCE TO RELATED APPLICATIONS

This application claims priority under 35 U.S.C. 119 to Japanese Patent Application No. 2018-125579 filed on Jun. 29, 2018 and Japanese Patent Application No. 2019-066040 filed on Mar. 29, 2019. Each of the above applications is hereby expressly incorporated by reference, in its entirety, into the present application.

BACKGROUND OF THE INVENTION

1. Field of the Invention

The present invention relates to a magnetic tape apparatus.

2. Description of the Related Art

A magnetic recording and reproducing apparatus which performs recording of data on a magnetic recording medium and/or reading (reproducing) of the recorded data is widely divided into a magnetic disk apparatus and a magnetic tape apparatus. A representative example of the magnetic disk apparatus is a hard disk drive (HDD). In the magnetic disk apparatus, a magnetic disk is used as the magnetic recording medium. Meanwhile, in the magnetic tape apparatus, a magnetic tape is used as the magnetic recording medium.

In both of the magnetic disk apparatus and the magnetic tape apparatus, it is preferable to narrow a recording track width, in order to increase recording capacity (increase capacity). However, the recording track width is narrowed, a signal of an adjacent track is easily mixed with a signal of a reading target track during the reproducing, and accordingly, it is difficult to maintain reproducing quality such as a signal-to-noise ratio (SNR). In regard to this point, in recent years, it is proposed to improve reproducing quality by reading a signal of a recording track by a plurality of reading elements (also referred to as "reproducing elements") two-dimensionally (for example, see JP2016-110680A, JP2011-134372A, and U.S. Pat. No. 7,755,863B). In a case where the reproducing quality can be improved by doing so, the reproducing quality can be maintained, even in a case where the recording track width is narrowed, and accordingly, it is possible to increase recording capacity by narrowing the recording track width.

SUMMARY OF THE INVENTION

In JP2016-110680A and JP2011-134372A, studies regarding a magnetic disk apparatus are conducted. Meanwhile, in recent years, a magnetic tape is receiving attention as a data storage medium for storing a large content of data for a long period of time. However, the magnetic tape apparatus is a sliding type apparatus in which data reading (reproducing) is performed due to a contact and sliding between the magnetic tape and a reading element. Accordingly, a relational position between the reading element and a reading target track easily changes during the reproducing, and the reproducing quality tends to be hardly improved, compared to a magnetic disk apparatus. U.S. Pat. No. 7,755,863B discloses the description regarding the magnetic tape apparatus (tape drive), but does not disclose specific means for improving the reproducing quality of the magnetic tape apparatus.

One aspect of the invention provides a magnetic tape apparatus capable of improving the reproducing quality.

According to one aspect of the invention, there is provided a magnetic tape apparatus comprising: a magnetic tape; a reading element unit; and an extraction unit, in which the magnetic tape includes a non-magnetic support, and a magnetic layer including a ferromagnetic powder and a binding agent on the non-magnetic support, the magnetic layer includes a servo pattern, the ferromagnetic powder is a hexagonal ferrite powder, a tilt cos θ of the hexagonal ferrite powder with respect to a surface of the magnetic layer acquired by cross section observation performed by using a scanning transmission electron microscope (hereinafter, simply referred to as a "cos θ") is 0.85 to 1.00, the reading element unit includes a plurality of reading elements each of which reads data by a linear scanning method from a specific track region including a reading target track in a track region included in the magnetic tape, the extraction unit performs a waveform equalization process according to a deviation amount between positions of the magnetic tape and the reading element unit, with respect to each reading result for each reading element, to extract data derived from the reading target track from the reading result, and the deviation amount is determined in accordance with a result obtained by reading of the servo pattern included in the magnetic layer of the magnetic tape by a servo element.

In one aspect, parts of the plurality of reading elements may be overlapped each other in a running direction of the magnetic tape.

In one aspect, the specific track region may be a region including the reading target track and adjacent tracks which are adjacent to the reading target track, and each of the plurality of reading elements may straddle over both of the reading target track and the adjacent track, in a case where a positional relationship with the magnetic tape is changed.

In one aspect, the plurality of reading elements may be disposed in a line in a state of being adjacent to each other, in a width direction of the magnetic tape.

In one aspect, the plurality of reading elements may fall in the reading target track in a width direction of the magnetic tape.

In one aspect, the waveform equalization process may be performed by using a tap coefficient determined in accordance with the deviation amount.

In one aspect, regarding each of the plurality of reading elements, a ratio between an overlapping region with the reading target track and an overlapping region with an adjacent track which is adjacent to the reading target track may be specified from the deviation amount, and the tap coefficient may be determined in accordance with the specified ratio.

In one aspect, a reading operation by the reading element unit may be performed synchronously with a reading operation by the servo element.

In one aspect, the extraction unit may include a two-dimensional finite impulse response (FIR) filter, and the two-dimensional FIR filter may compose each result obtained by performing the waveform equalization process with respect to each reading result for each reading element, to extract data derived from the reading target track from the reading result.

In one aspect, the plurality of reading elements may be a pair of reading elements.

In one aspect, an activation volume of the hexagonal ferrite powder is equal to or smaller than 1,600 nm³.

According to one aspect of the invention, it is possible to provide a magnetic tape apparatus capable of reproducing data recorded on a magnetic tape with high reproducing quality.

DESCRIPTION OF THE PREFERRED EMBODIMENTS

A magnetic tape apparatus according to one aspect of the invention includes a magnetic tape, a reading element unit, and an extraction unit.

Figure 23:
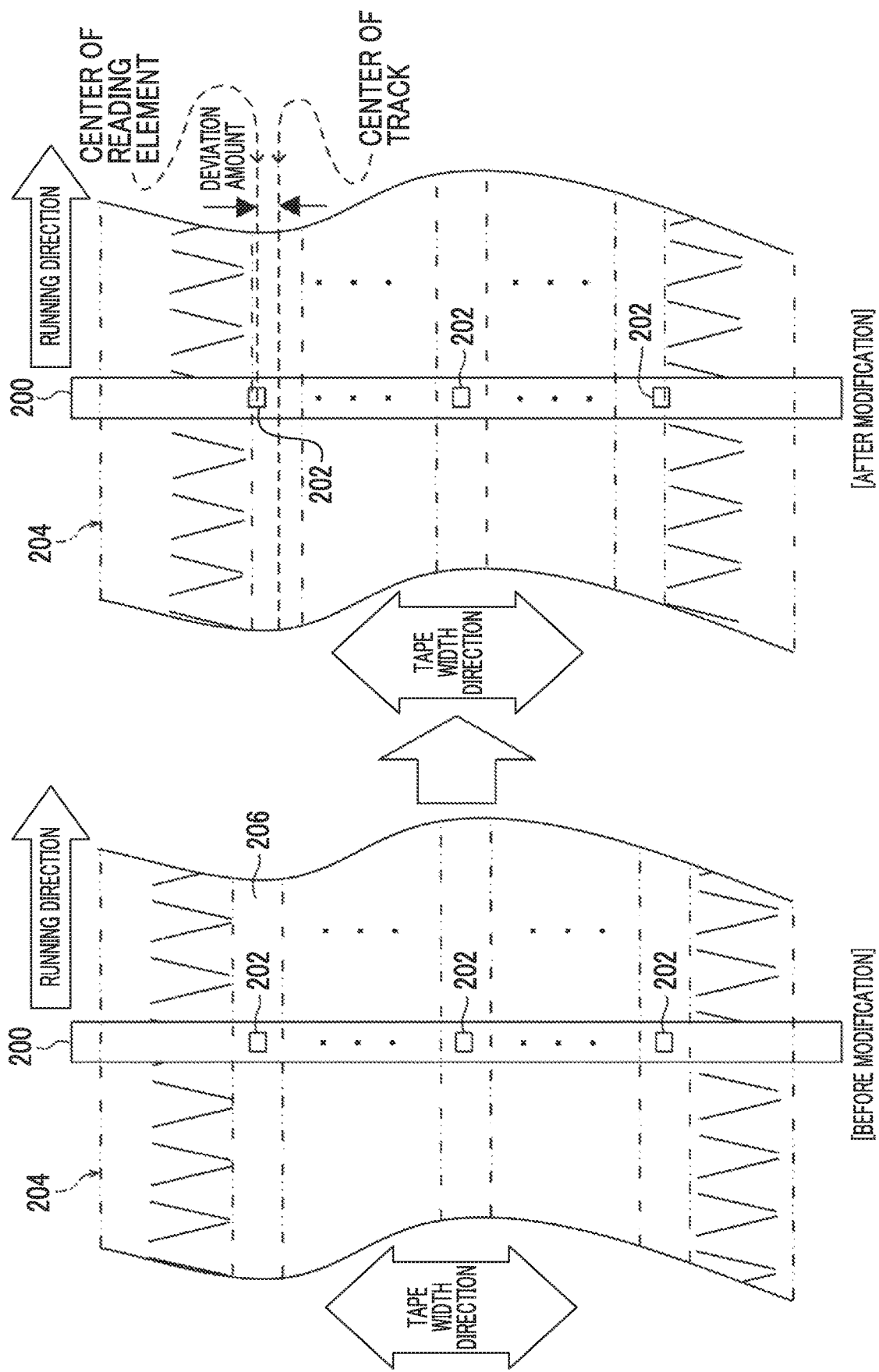
FIG. 23 is a conceptual view provided for description of a first example of the related art.

Regarding the reading of data from the magnetic tape, in the example of the related art shown in FIG. 23, an elongated reading head 200 comprises a plurality of reading elements 202 along a longitudinal direction. In a magnetic tape 204, a plurality of tracks 206 are formed. The reading head 200 is disposed so that the longitudinal direction coincides with a width direction of the magnetic tape 204. In addition, each of the plurality of reading elements 202 is allocated for each of the plurality of tracks 206 in a one-to-one relation, and reads data from the track 206 at a position faced.

However, in general, the magnetic tape 204 expands and contracts due to time elapse, an environment, a change of a tension, and the like. In a case where the magnetic tape expands and contracts in a width direction of the magnetic tape 204, the center of the reading element 202 disposed on both end in the longitudinal direction in the reading head 200 is deviated from the center of the track 206. In a case where the magnetic tape 204 is modified due to the expansion and contraction in a width direction, particularly, the reading elements 202 closer to both end of the reading head 200, among the plurality of reading elements 202, receive a greater effect of off-track. In order to reduce the effect of the off-track, for example, a method of applying a surplus width to the width of the track 206 has been considered. However, as the width of the track 206 increases, a recording capacity of the magnetic tape 204 decreases.

Figure 24:
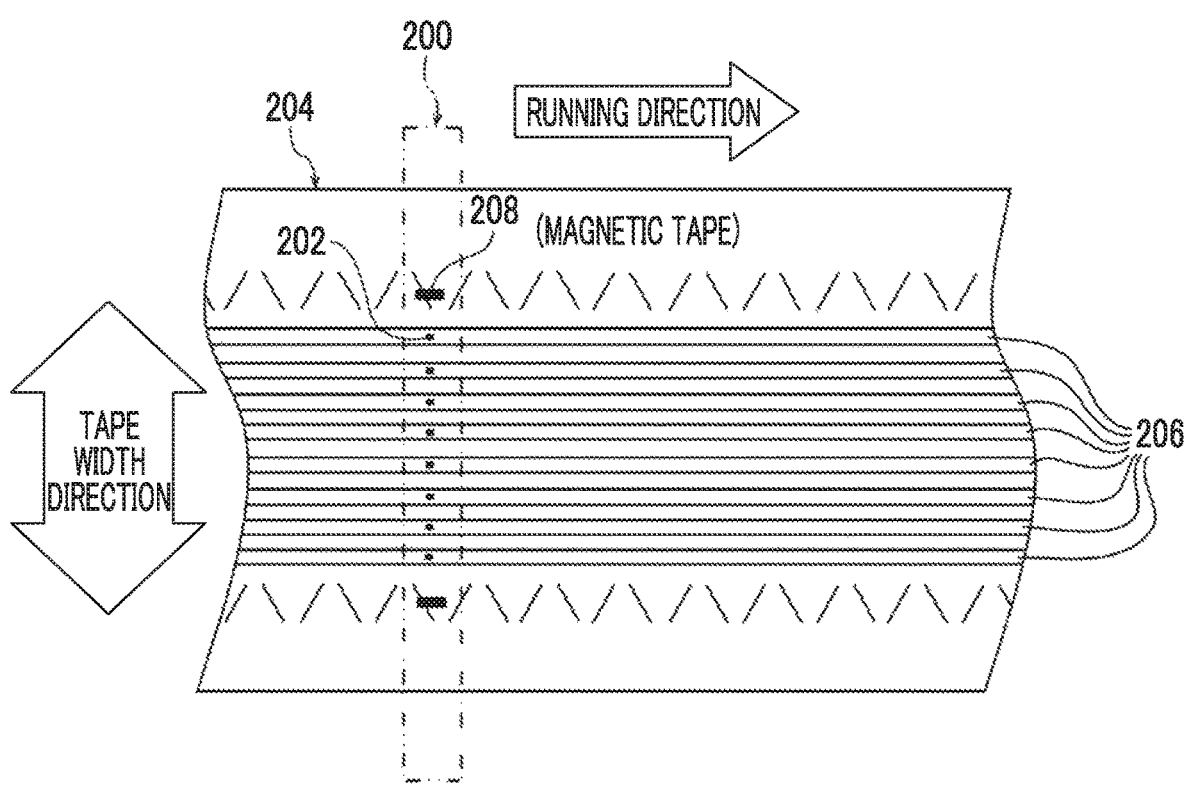
FIG. 24 is a conceptual view provided for description of a second example of the related art.

In addition, as shown in the example of the related art shown in FIG. 24, in general, a servo element 208 is provided in the reading head 200. A servo pattern which is applied to the magnetic tape 204 in advance along a running direction of the magnetic tape 204 is read by the servo element 208. A control device (not shown) specifies that which position on the magnetic tape 204 the reading element 202 runs on, for example, at regular time interval, from the servo signal obtained by reading the servo pattern by the servo element 208. Accordingly, a position error signal (PES) in a width direction of the magnetic tape 204 is detected by the control device.

As described above, in a case where the control device specifies the running position of the reading element 202, a feedback control is performed with respect to an actuator (not shown) for the reading head by the control device based on the specified running position, and accordingly, the tracking of the magnetic tape 204 in the width direction is realized.

However, although the tracking is performed, sharp vibration, a high frequency component of jitter, and the like are factors of an increase in PES, and this causes a deterioration in reproducing quality of data read from a reading target track.

On the other hand, in the magnetic tape apparatus according to one aspect of the invention, the reading element unit includes a plurality of reading elements each of which reads data by a linear scanning method from a specific track region including a reading target track in a track region included in the magnetic tape. The extraction unit performs a waveform equalization process according to a deviation amount between positions of the magnetic tape and the reading element unit, with respect to each reading result for each reading element, to extract data derived from the reading target track from the reading result. Therefore, according to the magnetic tape apparatus, it is possible to increase the reproducing quality of data read from the reading target track, compared to a case where data is read only by a single reading element from the reading target track by a linear scanning method. As a result, it is possible to increase an acceptable amount of the deviation amount (track off-set amount) capable of ensuring excellent reproducing quality.

In addition, the deviation amount is detected by the reading of the servo pattern. However, in a case where an error between a deviation amount detected by the reading of the servo pattern and a deviation amount generated in practice is great, a waveform equalization process according to the deviation amount may not be always the optimal waveform equalization process, with respect to the reading result obtained by reading at each portion of the magnetic tape. With respect to this, in a case where an error between the deviation amount detected by the reading of the servo pattern and a deviation amount generated in practice can be decreased, more suitable waveform equalization process can be performed with respect to the reading result obtained by reading at each portion. As a result, it is possible to increase the acceptable amount of the deviation amount capable of ensuring excellent reproducing quality by the waveform equalization process.

As described above, an increase in acceptable amount of the deviation amount capable of ensuring excellent reproducing quality can contribute to the reproducing with high reproducing quality (for example, high SNR or low error rate), even in a case where a track margin (recording track width–reproducing element width) is decreased. A decrease in track margin can contribute to an increase in number of recording tracks capable of being disposed in a width direction of the magnetic tape by decreasing the recording track width, that is, realization of high capacity.

With respect to the point described above, it is considered that the cos θ of the magnetic tape of 0.85 to 1.00 in which performs the reading of data in the magnetic tape apparatus contributes to an increase in accuracy for specifying the position of the reading element by reading the servo pattern. It is surmised that this causes to decrease the error between the deviation amount detected by the reading of the servo pattern and the deviation amount generated in practice. This point will be further described later.

Hereinafter, the magnetic tape apparatus will be described later in detail. Hereinafter, the magnetic tape apparatus may be described with reference to the drawings. However, the magnetic tape apparatus is not limited to the aspect shown in the drawings.

Configuration of Magnetic Tape Apparatus and Magnetic Tape Reading Process

Figure 1:
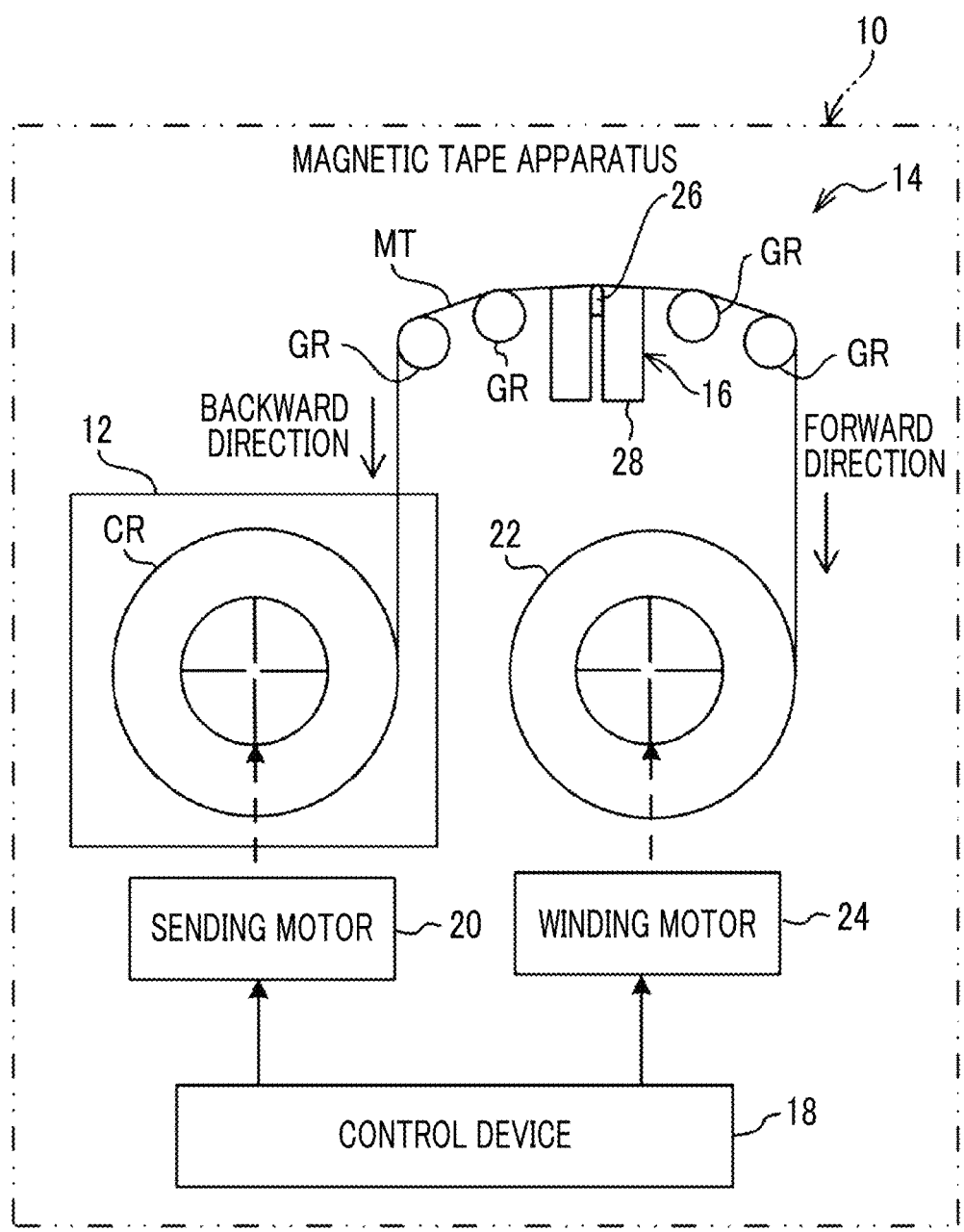
FIG. 1 is a schematic configuration view showing an example of the entire configuration of a magnetic tape apparatus.

As an example shown in FIG. 1, a magnetic tape apparatus 10 comprises a magnetic tape cartridge 12, a transportation device 14, a reading head 16, and a control device 18.

The magnetic tape apparatus 10 is an apparatus which extracts a magnetic tape MT from the magnetic tape cartridge 12 and reads data from the extracted magnetic tape MT by using the reading head 16 by a linear scanning method. The reading of data can also be referred to as reproducing of data.

The control device 18 controls the entire magnetic tape apparatus 10. In one aspect, the control performed by the control device 18 can be realized with an application specific integrated circuit (ASIC). In addition, in one aspect, the control performed by the control device 18 can be realized with a field-programmable gate array (FPGA). The control performed by the control device 18 may be realized with a computer including a central processing unit (CPU), a read only memory (ROM), and a random access memory (RAM). Further, the control may be realized with a combination of two or more of AISC, FPGA, and the computer.

The transportation device 14 is a device which selectively transports the magnetic tape MT in a forward direction and a backward direction, and comprises a sending motor 20, a winding reel 22, a winding motor 24, a plurality of guide rollers GR, and the control device 18.

A cartridge reel CR is provided in the magnetic tape cartridge 12. The magnetic tape MT is wound around the cartridge reel CR. The sending motor 20 causes the cartridge reel CR in the magnetic tape cartridge 12 to be rotatably driven under the control of the control device 18. The control device 18 controls the sending motor 20 to control a rotation direction, a rotation rate, a rotation torque, and the like of the cartridge reel CR.

In a case of winding the magnetic tape MT around the winding reel 22, the control device 18 rotates the sending motor 20 so that the magnetic tape MT runs in a forward direction. The rotation rate, the rotation torque, and the like of the sending motor 20 are adjusted in accordance with a speed of the magnetic tape MT wound around the winding reel 22.

The winding motor 24 causes the winding reel 22 to be rotatably driven under the control of the control device 18. The control device 18 controls the winding motor 24 to control a rotation direction, a rotation rate, a rotation torque, and the like of the winding reel 22.

In a case of winding the magnetic tape MT around the winding reel 22, the control device 18 rotates the winding motor 24 so that the magnetic tape MT runs in the forward direction. The rotation rate, the rotation torque, and the like of the winding motor 24 are adjusted in accordance with a speed of the magnetic tape MT wound around the winding reel 22.

By adjusting the rotation rate, the rotation torque, and the like of each of the sending motor 20 and the winding motor 24 as described above, a tension in a predetermined range is applied to the magnetic tape MT. Here, the predetermined range indicates a range of a tension obtained from a computer simulation and/or a test performed with a real machine, as a range of a tension in which data can be read from the magnetic tape MT by the reading head 16, for example.

In a case of rewinding the magnetic tape MT to the cartridge reel CR, the control device 18 rotates the sending motor 20 and the winding motor 24 so that the magnetic tape MT runs in the backward direction.

In one aspect, the tension of the magnetic tape MT is controlled by controlling the rotation rate, the rotation torque, and the like of the sending motor 20 and the winding motor 24. In addition, in one aspect, the tension of the magnetic tape MT may be controlled by using a dancer roller, or may be controlled by drawing the magnetic tape MT to a vacuum chamber.

Each of the plurality of guide rollers GR is a roller guiding the magnetic tape MT. A running path of the magnetic tape MT is determined by separately disposing the plurality of guide rollers GR on positions crossing the reading head 16 between the magnetic tape cartridge 12 and the winding reel 22.

The reading head 16 comprises a reading unit 26 and a holder 28. The reading unit 26 is held by the holder 28 so as to come into contact with the magnetic tape MT during the running.

Figure 2:
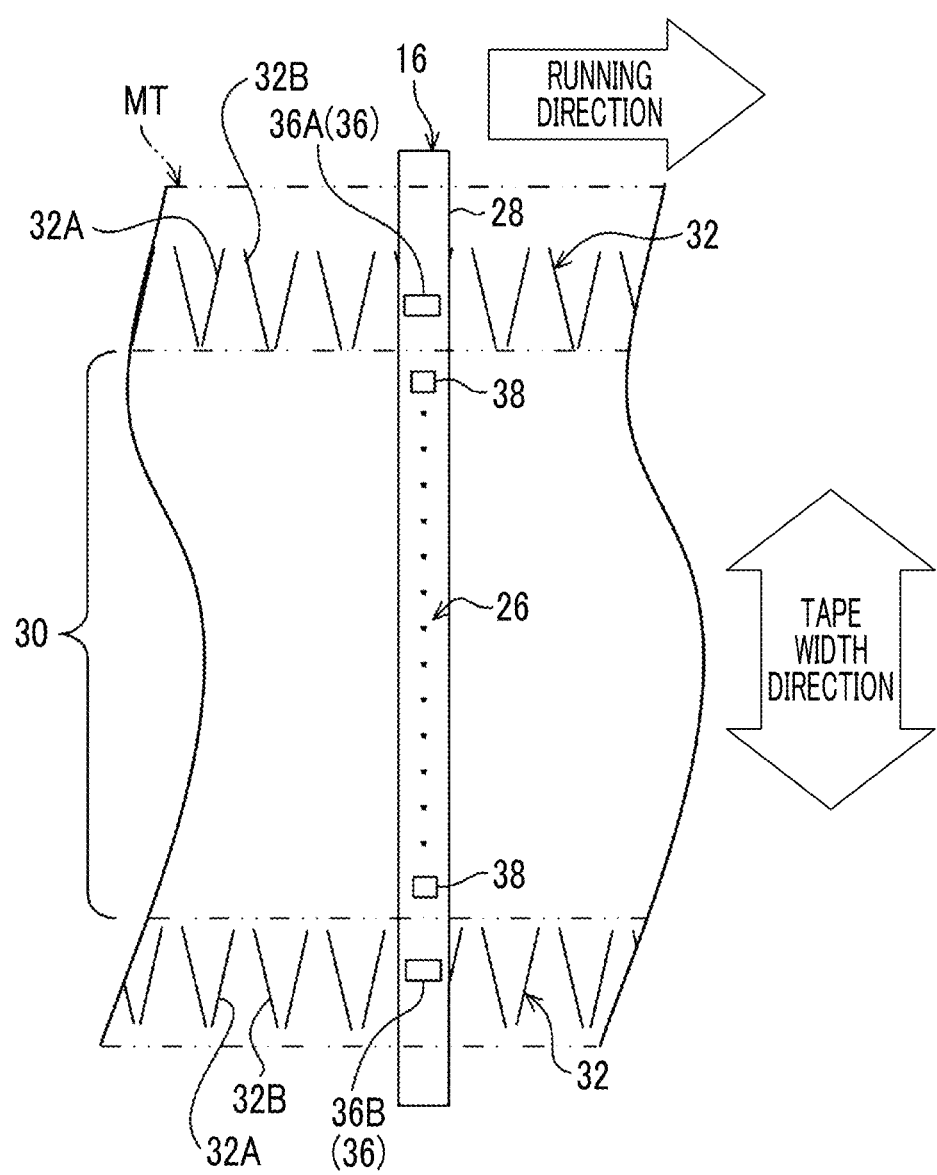
FIG. 2 is a schematic plan view showing an example of a schematic configuration in a plan view of a reading head and a magnetic tape included in the magnetic tape apparatus.

As an example shown in FIG. 2, the magnetic tape MT comprises a track region 30 and a servo pattern 32. The servo pattern 32 is a pattern used for detection of the position of the reading head 16 on the magnetic tape MT. The servo pattern 32 is a pattern in which a first diagonal line 32A at a first predetermined angle (for example, 95 degrees) and a second diagonal line 32B at a second predetermined angle (for example, 85 degrees) are alternately disposed on both end portions in a tape width direction at a constant pitch (cycle) along a running direction of the magnetic tape MT. The "tape width direction" here indicates a width direction of the magnetic tape MT.

The track region 30 is a region where the data which is a reading target is written, and is formed on the center of the magnetic tape MT in the tape width direction. The "center in the tape width direction" here indicates, for example, a region between the servo pattern 32 on one end portion and the servo pattern 32 on the other end portion of the magnetic tape MT in the tape width direction. Hereinafter, for convenience of description, the "running direction of the magnetic tape MT" is simply referred to as the "running direction".

The reading unit 26 comprises a servo element pair 36 and a plurality of reading element units 38. The holder 28 is formed to be elongated in the tape width direction, and a total length of the holder 28 in the longitudinal direction is longer than the width of the magnetic tape MT. The servo element pair 36 are disposed on both end portions of the holder 28 in the longitudinal direction, and the plurality of reading element units 38 are disposed on the center of the holder 28 in the longitudinal direction.

The servo element pair 36 comprise servo elements 36A and 36B. The servo element 36A is disposed on a position facing the servo pattern 32 on one end portion of the magnetic tape MT in the tape width direction, and the servo element 36B is disposed on a position facing the servo pattern 32 on the other end portion of the magnetic tape MT in the tape width direction.

In the holder 28, the plurality of reading element units 38 are disposed between the servo element 36A and the servo element 36B along the tape width direction. The track region 30 comprises the plurality of tracks at regular interval in the tape width direction, and in a default state of the magnetic tape apparatus 10, each of the plurality of reading element units 38 is disposed to face each track in the track region 30.

Thus, since the reading unit 26 and the magnetic tape MT relatively move linearly along the longitudinal direction of the magnetic tape MT, the data of each track in the track region 30 is read by each reading element unit 38 at the corresponding position among the plurality of reading element units 38 by the linear scanning method. In addition, in the linear scanning method, the servo patterns 32 are read by the servo element pair 36 synchronously with the reading operation of the reading element units 38. That is, in one aspect of the linear scanning method, the reading with respect to the magnetic tape MT is performed in parallel by the plurality of reading element units 38 and the servo element pair 36.

Here, "each track in the track region 30" here indicates a track included in "each of a plurality of specific track region including each reading target track in the track region included in the magnetic tape".

The "default state of the magnetic tape apparatus 10" indicates a state where the magnetic tape MT is not deformed and a positional relationship between the magnetic tape MT head the reading head 16 is a correct positional relationship. Here, the "correct positional relationship" indicates a positional relationship in which the center of the magnetic tape MT in the tape width direction and the center of the reading head 16 in the longitudinal direction coincide with each other.

In one aspect, each of the plurality of reading element unit 38 has the same configuration. Hereinafter, the description will be performed using one of the plurality of reading element unit 38 as an example, for convenience of description. As an example shown in FIG. 3, the reading element unit 38 comprises one pair of reading elements. In the example shown in FIG. 3, "one pair of reading elements" indicate a first reading element 40 and a second reading element 42. Each of the first reading element 40 and the second reading element 42 reads data from a specific track region 31 including a reading target track 30A in the track region 30.

Figure 3:
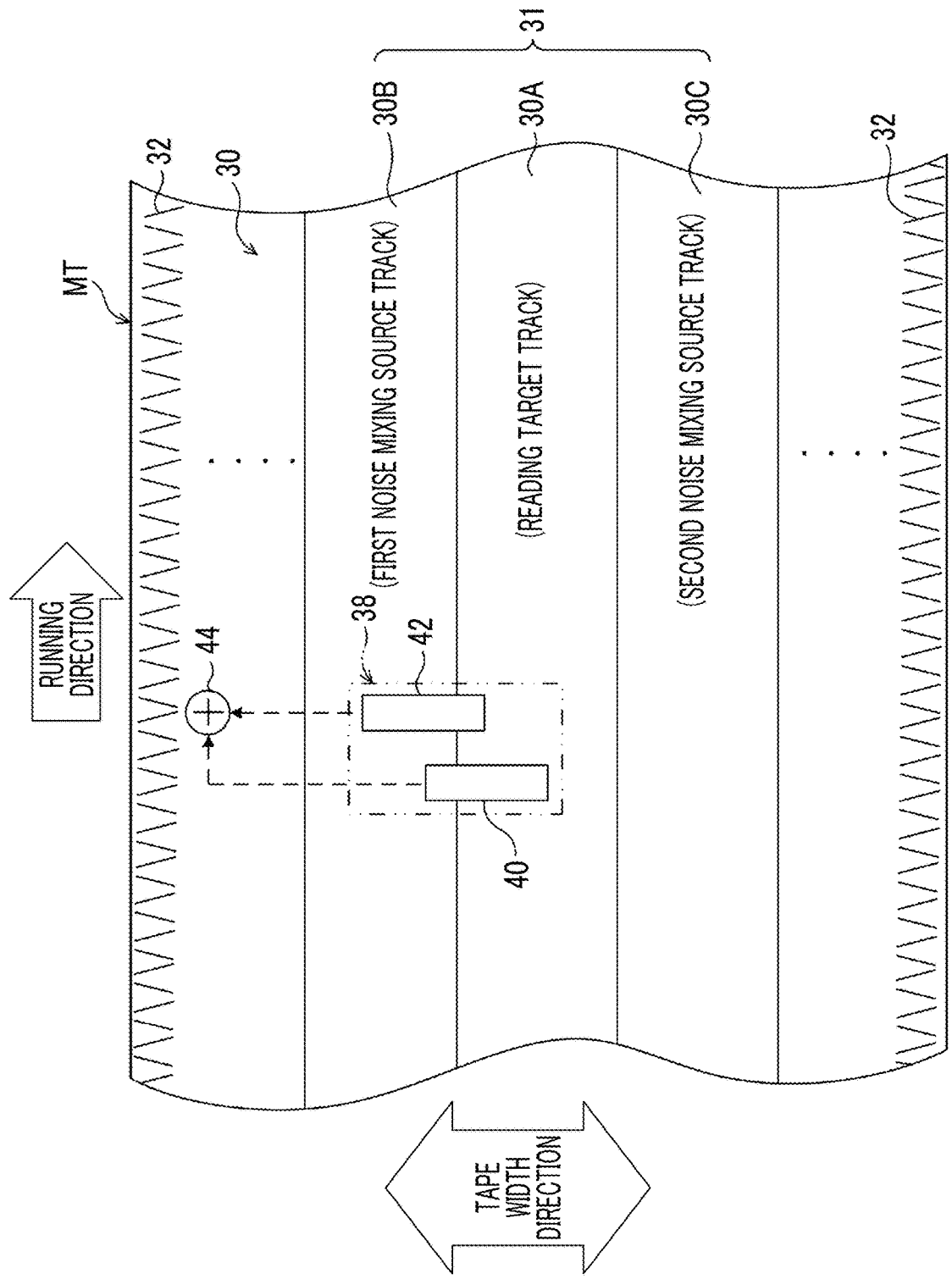
FIG. 3 is a schematic plan view showing an example of a schematic configuration in a plan view of a reading element unit and a magnetic tape.

In the example shown in FIG. 3, for convenience of description, one specific track region 31 is shown. In practice, in general, in the track region 30, a plurality of specific track regions 31 are present, and the reading target track 30A is included in each specific track region 31. The reading element unit 38 is allocated to each of the plurality of specific track regions 31 in a one-to-one manner. Specifically, the reading element unit 38 is allocated to the reading target track 30A in each of the plurality of specific track regions 31 in a one-to-one manner.

The specific track region 31 indicates three adjacent tracks. A first track among the three adjacent tracks is the reading target track 30A in the track region 30. A second track among the three adjacent tracks is a first noise mixing source track 30B which is one adjacent track adjacent to the reading target track 30A. A third track among the three adjacent tracks is a second noise mixing source track 30C which is one adjacent track adjacent to the reading target track 30A. The reading target track 30A is a track at a position facing the reading element unit 38 in the track region 30. That is, the reading target track 30A indicates a track having data to be read by the reading element unit 38.

The first noise mixing source track 30B is a track which is adjacent to the reading target track 30A on one side in the tape width direction and is a mixing source of noise mixed to data read from the reading target track 30A. The second noise mixing source track 30C is a track which is adjacent to the reading target track 30A on the other side in the tape width direction and is a mixing source of noise mixed to data read from the reading target track 30A. Hereinafter, for convenience of description, in a case where it is not necessary to describe the first noise mixing source track 30B and the second noise mixing source track 30C separately, these are referred to as the "adjacent track" without reference numerals.

In one aspect, in the track region 30, the plurality of specific track regions 31 are disposed at regular interval in the tape width direction. For example, in the track region 30, 32 specific track regions 31 are disposed at regular interval in the tape width direction, and the reading element unit 38 is allocated to each specific track region 31 in a one-to-one manner.

The first reading element 40 and the second reading element 42 are disposed at positions a part of which is overlapped in the running direction, in a state of being adjacent in the running direction. In a default state of the magnetic tape apparatus 10, the first reading element 40 is disposed at a position straddling over the reading target track 30A and the first noise mixing source track 30B. In a default state of the magnetic tape apparatus 10, the second reading element 42 is disposed at a position straddling over the reading target track 30A and the first noise mixing source track 30B.

In a default state of the magnetic tape apparatus 10, the area of a portion of the first reading element 40 facing the reading target track 30A is greater than the area of a portion of the first reading element 40 facing the first noise mixing source track 30B, in a plan view. Meanwhile, in a default state of the magnetic tape apparatus 10, the area of a portion of the second reading element 42 facing the first noise mixing source track 30B is greater than the area of a portion of the first reading element 40 facing the reading target track 30A, in a plan view.

Figure 7:
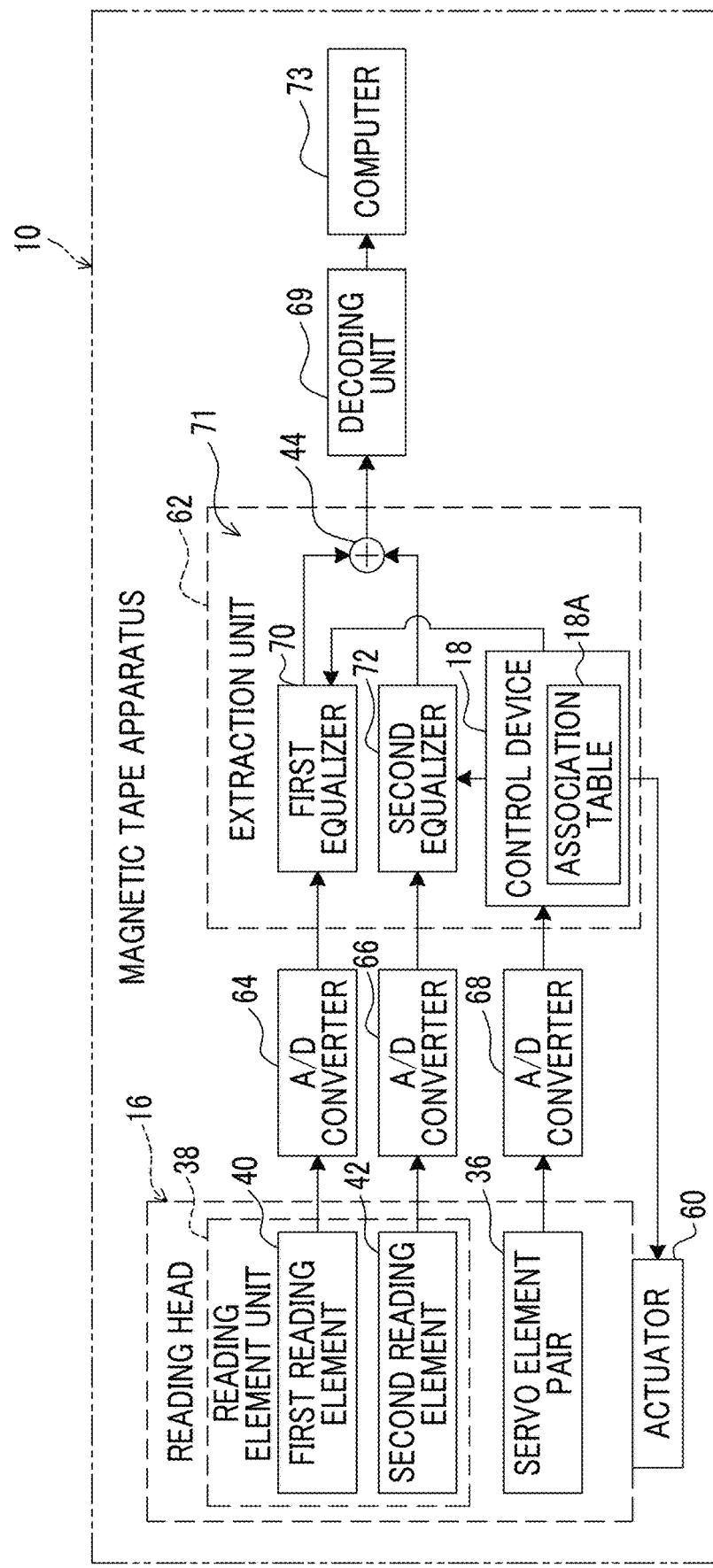
FIG. 7 is a block view showing an example of a main configuration of hardware of an electric system of the magnetic tape apparatus.

The data read by the first reading element 40 is subjected to a waveform equalization process by a first equalizer 70 (see FIG. 7). The data read by the second reading element 42 is subjected to a waveform equalization process by a second equalizer 72 (see FIG. 7). Each data item obtained by performing the waveform equalization process by each of the first equalizer 70 and the second equalizer 72 is added by an adder 44 and composed.

In FIG. 3, the aspect in which the reading element unit 38 includes the first reading element 40 and the second reading element 42 has been described as an example. However, for example, even in a case where only one reading element (hereinafter, also referred to as a single reading element) among a pair of reading elements is used, a signal corresponding to a reproducing signal obtained from the reading element unit 38 is obtained.

Figure 8:
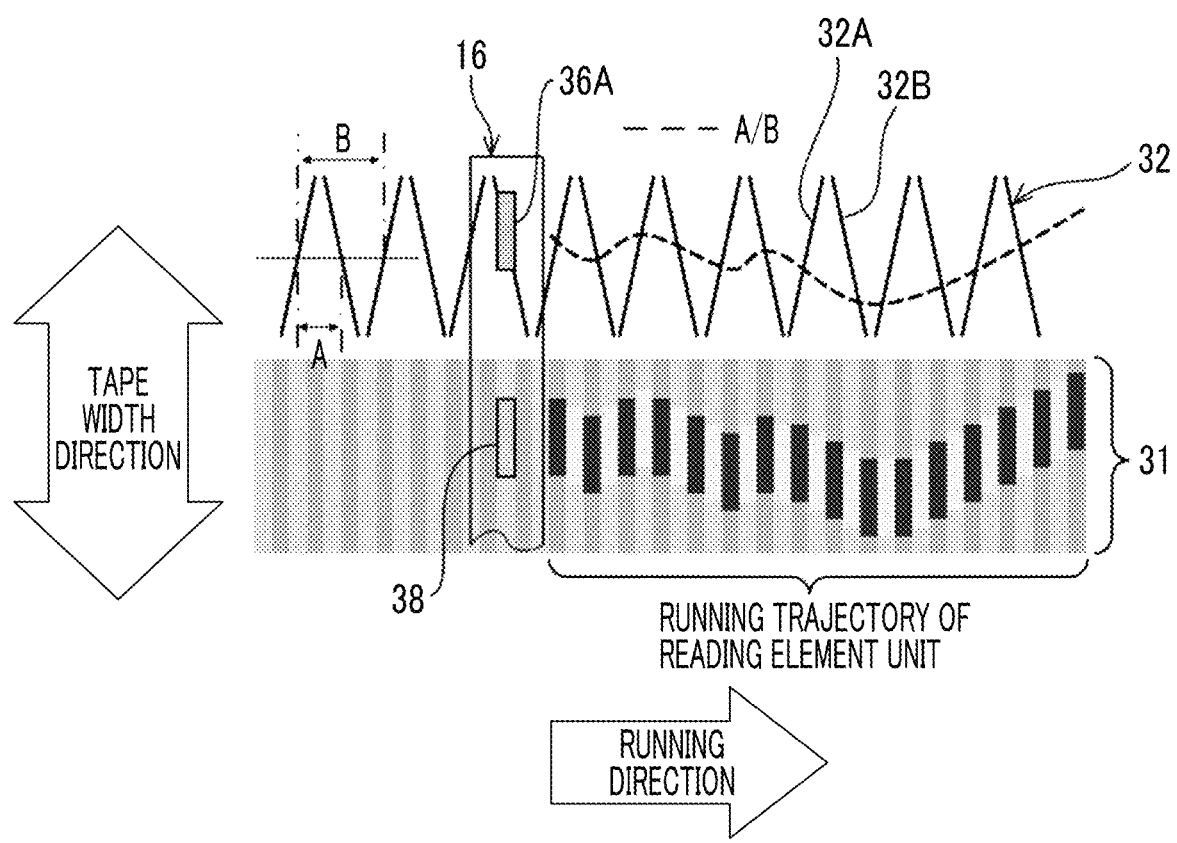
FIG. 8 is a conceptual view provided for description of a method of calculating a deviation amount.

In this case, for example shown in FIG. 8, the reproducing signal obtained from the single reading element is allocated to a plane position on a track calculated from a servo signal obtained by the servo element pair 36 synchronously with the reproducing signal. By repeating this operation while moving the single reading element in the tape width direction, a two-dimensional image of the reproducing signal (hereinafter, simply referred to as a "two-dimensional image") is obtained. Here, a reproducing signal configuring the two-dimensional image or a part of the two-dimensional image (for example, reproducing signal corresponding to the position of the plurality of tracks) is signal corresponding to the reproducing signal obtained from the reading element unit 38.

Figure 25:
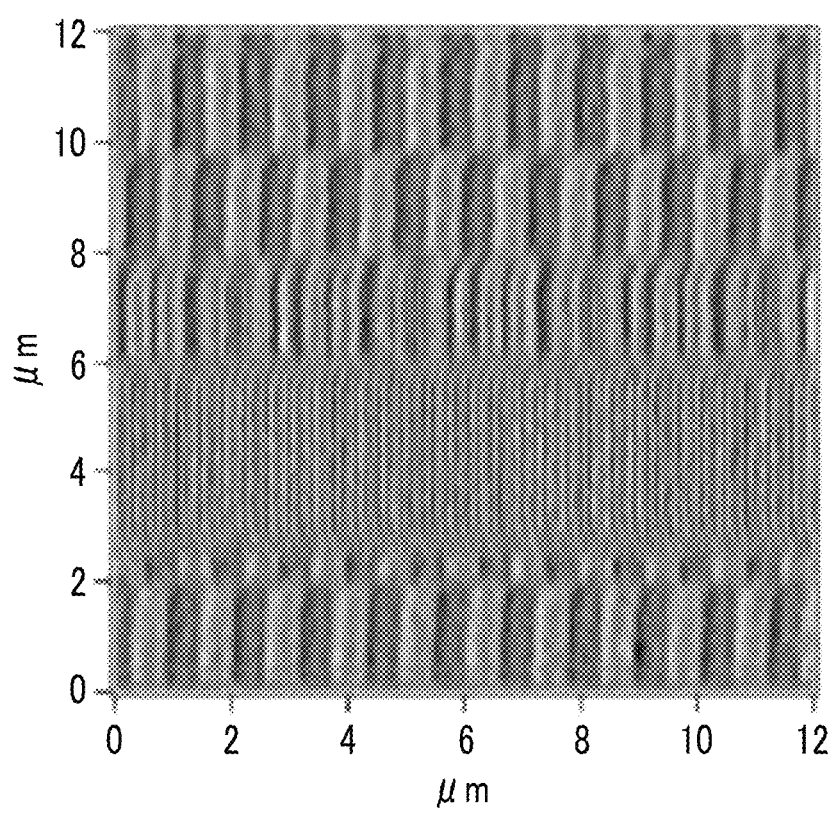
FIG. 25 is a view showing an example of a two-dimensional image of a reproducing signal obtained from a single reading element.

FIG. 25 shows an example of a two-dimensional image of the reproducing signal of the magnetic tape MT in a loop shape (hereinafter, also referred to as a "loop tape") obtained by using a loop tester. Here, the loop tester indicates a device which transports the loop tape in a state where the loop tape is repeatedly in contact with the single reading element, for example. In order to obtain a two-dimensional image in the same manner as in the case of the loop tester, a reel tester may be used or an actual tape drive may be used. The "reel tester" here indicates a device which transports the magnetic tape MT in a reel state, for example.

As described above, even in a case where a head for a magnetic tape of the related art which does not include the reading element unit on which the plurality of reading elements are loaded at adjacent positions is used, the effect according to the technology disclosed in the specification can be quantitatively evaluated. As an example of an index for quantitatively evaluating the effect according to the technology disclosed in the specification, an SNR, an error rate, and the like are used.

Figure 4:
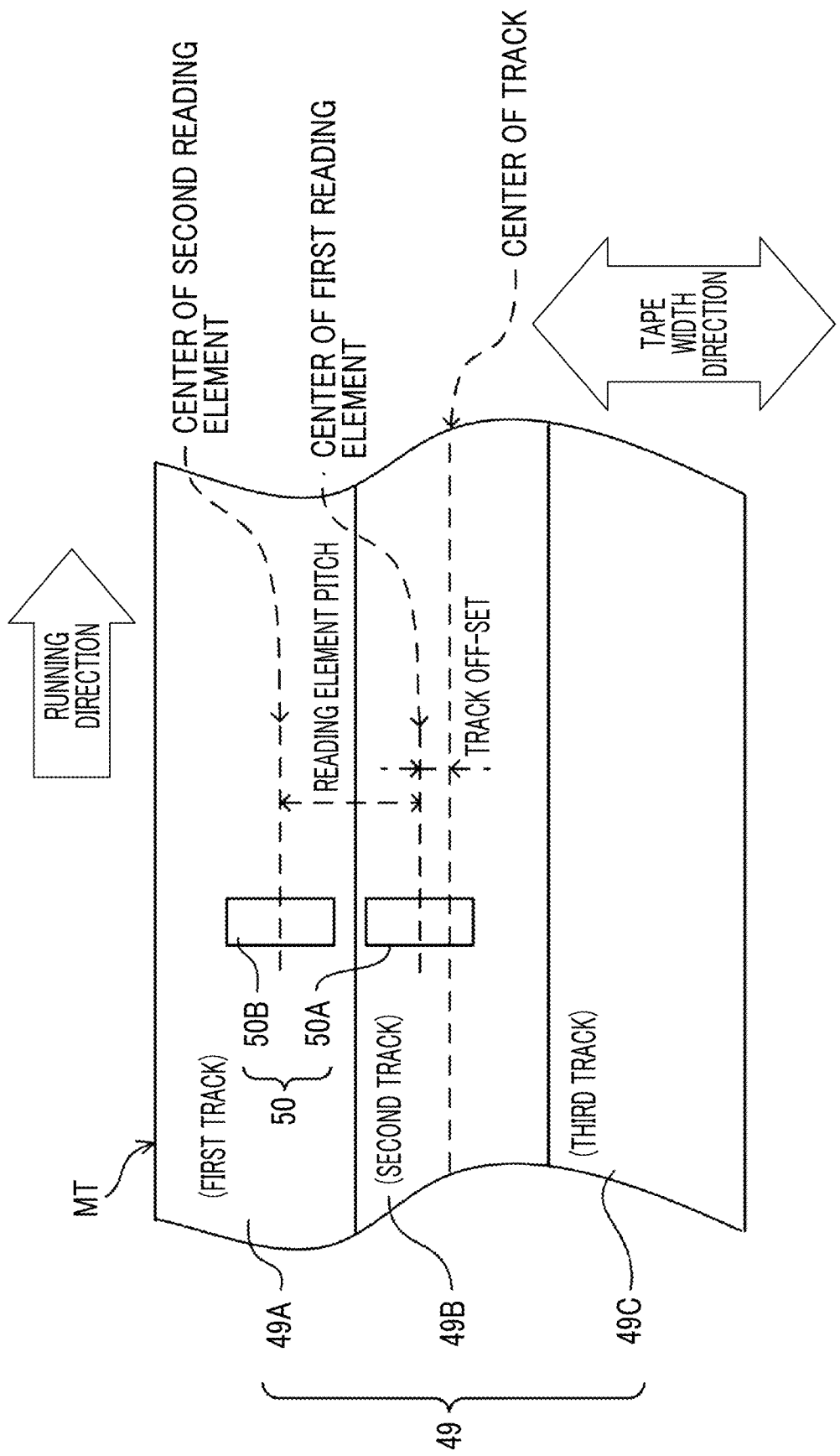
FIG. 4 is a schematic plan view showing an example of a schematic configuration in a plan view of a track region and a reading element pair.
Figure 5:
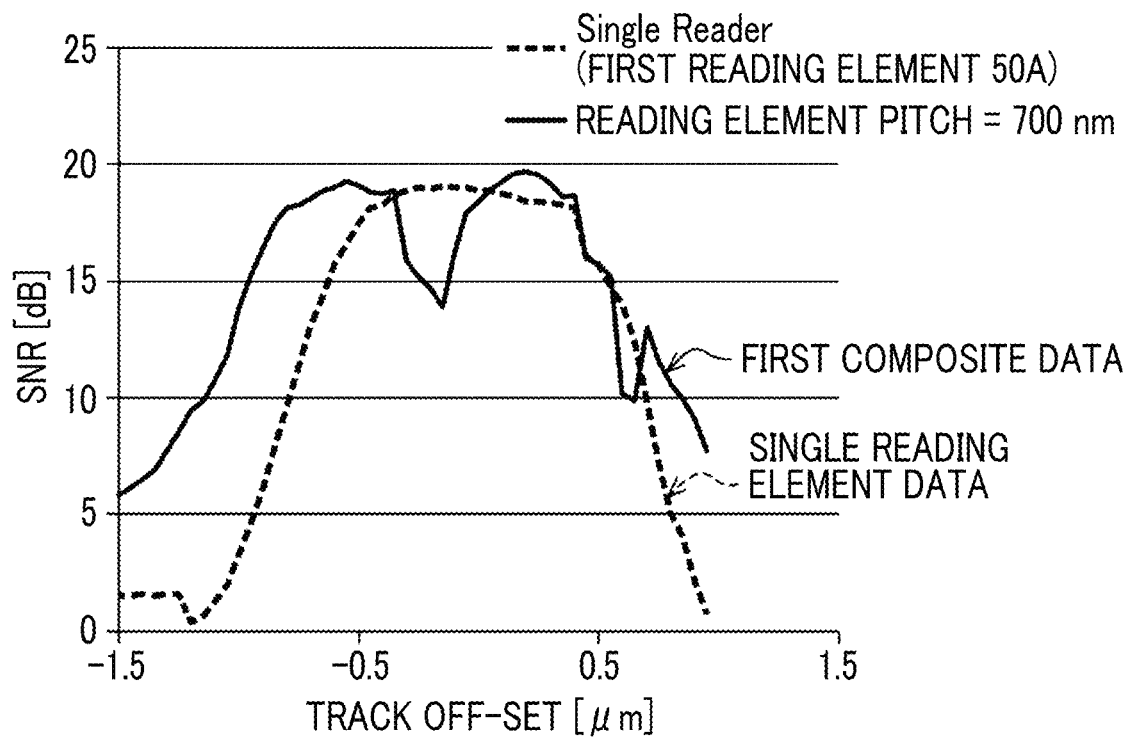
FIG. 5 is a graph showing an example of a correlation between an SNR regarding each of a single reading element data item and a first composite data item under a first condition, and track off-set.
Figure 6:
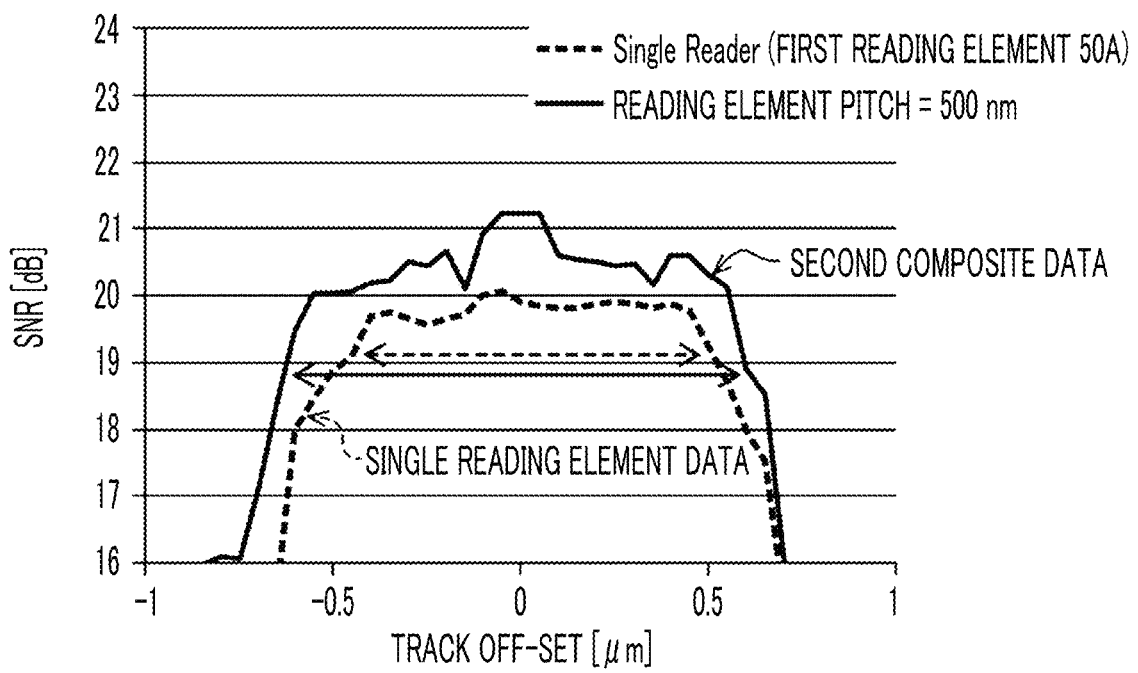
FIG. 6 is a graph showing an example of a correlation between an SNR regarding each of the single reading element data item and a second composite data item under a second condition, and track off-set.

FIGS. 4 to 6 show results obtained from experiments performed by the present inventors. As an example shown in FIG. 4, a reading element pair 50 are disposed on a track region 49. The track region 49 is a first track 49A, a second track 49B, and a third track 49C adjacent to each other in the tape width direction. The reading element pair 50 are a first reading element 50A and a second reading element 50B. The first reading element 50A and the second reading element 50B are disposed at positions adjacent to each other in the tape width direction. The first reading element 50A is disposed so as to face the second track 49B which is the reading target track and fall in the second track 49B. In addition, the second reading element 50B is disposed so as to face the first track 49A adjacent to one side of the second track 49B and fall in the first track 49A.

FIG. 5 shows an example of a correlation between an SNR regarding each of a single reading element data item and a first composite data item under a first condition, and track off-set. In addition, FIG. 6 shows an example of a correlation between an SNR regarding each of the single reading element data item and a second composite data item under a second condition, and track off-set.

Here, the single reading element data indicates data obtained by performing a waveform equalization process with respect to data read by the first reading element 50A, in the same manner as in the case of the first reading element 40 shown in FIG. 3. The first condition indicates a condition in which a reading element pitch is 700 nm (nanometers). The second condition indicates a condition in which a reading element pitch is 500 nm. The reading element pitch indicates a pitch of the first reading element 50A and the second reading element 50B in the tape width direction, as shown in FIG. 4 as an example. The track off-set indicates a deviation amount between the center of the second track 49B in the tape width direction and the center of the first reading element 50A in the track width direction, as an example shown in FIG. 4.

The first composite data indicates data composed by adding a first waveform equalized data item and a second waveform equalized data item obtained under the first condition. The first waveform equalized data item indicates data obtained by performing the waveform equalization process with respect to the data read by the first reading element 50A, in the same manner as in the case of the first reading element 40 shown in FIG. 3. The second waveform equalized data item indicates data obtained by performing the waveform equalization process with respect to the data read by the second reading element 50B, in the same manner as in the case of the second reading element 42 shown in FIG. 3. The second composite data indicates data composed by adding a first waveform equalized data item and a second waveform equalized data item obtained under the second condition.

In a case of comparing the SNR of the first composite data shown in FIG. 5 to the SNR of the second composite data shown in FIG. 6, the SNR of the first composite data rapidly declines to generate a groove of the graph, in a case where the track off-set is −0.4 µm (micrometers) to 0.2 µm, whereas the SNR of the second composite data does not rapidly decline as the graph of the SNR of the first composite data. Each of the SNR of the first composite data and the SNR of the second composite data is higher than the SNR of the single reading element data, and particularly, the SNR of the second composite data is higher than the SNR of the single reading element data over the entire range of the track off-set.

From the experimental results shown in FIGS. 5 and 6, the present inventors have found that it is preferable to perform the reading of data in a state where the first reading element 50A and the second reading element 50B are adjacent to each other in the tape width direction, compared to a case where the reading of data is performed by only the first reading element 50A. The "state adjacent to each other" here means that the first reading element 50A and the second reading element 50B are not in contact with each other, but are disposed in a line in the tape width direction, so that the SNR becomes higher than the SNR of the single reading element data, over the entire range of the track off-set.

In one aspect, as an example shown in FIG. 3, in the reading element unit 38, parts of the first reading element 40 and the second reading element 42 are overlapped each other in the running direction, and accordingly, a high density of the tracks included in the magnetic tape MT is realized.

As shown in FIG. 7 as an example, the magnetic tape apparatus 10 comprises an actuator 60, an extraction unit 62, an analog/digital (A/D) converters 64, 66, and 68, a decoding unit 69, and a computer 73.

The control device 18 is connected to the servo element pair 36 through the analog-to-digital (A/D) converter 68. The A/D converter 68 outputs a servo signal obtained by converting an analog signal obtained by reading the servo pattern 32 by the servo elements 36A and 36B included in the servo element pairs 36 into a digital signal, to the control device 18.

The control device 18 is connected to the actuator 60. The actuator 60 is attached to the reading head 16 and applies electric power to the reading head 16 under the control of the control device 18, to change the position of the reading head 16 in the tape width direction. The actuator 60, for example, includes a voice coil motor, and the electric power applied to the reading head 16 is electric power obtained by converting an electric energy based on a current flowing through the coil into a kinetic energy, using an energy of a magnet as a medium.

Here, the aspect in which the voice coil motor is loaded on the actuator 60 has been described. However, the magnetic tape apparatus is not limited to the aspect, and for example, a piezoelectric element can also be used, instead of the voice coil motor. In addition, the voice coil motor and the piezoelectric element can be combined with each other.

The deviation amount of the positions of the magnetic tape MT and the reading element unit 38 is determined in accordance with a servo signal which is a result obtained by reading the servo patterns 32 by the servo element pair 36. The control device 18 controls the actuator 60 to apply the electric power according to the deviation amount of the positions of the magnetic tape MT and the reading element unit 38 to the reading head 16. Accordingly, the position of the reading head 16 is changed in the tape width direction and the position of the reading head 16 is adjusted to a normal position. Here, for example shown in FIG. 3, the normal position indicates a position of the reading head 16 in a default state of the magnetic tape apparatus 10.

Hereinafter, for convenience of description, the deviation amount of the positions of the magnetic tape MT and the reading element unit 38 is simply referred to as a "deviation amount". For example shown in FIG. 8, the deviation amount is calculated based on a ratio of a distance A to a distance B. The distance A indicates a distance calculated from a result obtained by reading the first diagonal line 32A and the second diagonal line 32B adjacent to each other by the servo element 36A. The distance B indicates a distance calculated from a result obtained by reading the two first diagonal lines 32A adjacent to each other by the servo element 36A.

The extraction unit 62 comprises the control device 18 and a two-dimensional FIR filter 71. The two-dimensional FIR filter 71 comprises the adder 44, the first equalizer 70, and the second equalizer 72.

The first equalizer 70 is connected to the first reading element 40 through the A/D converter 64. In addition, the first equalizer 70 is connected to each of the control device 18 and the adder 44. The data read by the first reading element 40 from the specific track region 31 is an analog signal, and the A/D converter 64 outputs a first reading signal obtained by converting the data read by the first reading element 40 from the specific track region 31 into a digital signal, to the first equalizer 70.

The second equalizer 72 is connected to the second reading element 42 through the A/D converter 66. In addition, the second equalizer 72 is connected to each of the control device 18 and the adder 44. The data read by the second reading element 42 from the specific track region 31 is an analog signal, and the A/D converter 66 outputs a second reading signal obtained by converting the data read by the second reading element 42 from the specific track region 31 into a digital signal, to the second equalizer 72. The first reading signal and the second reading signal are one example of a "reading result for each reading element".

The first equalizer 70 performs the waveform equalization process with respect to the input first reading signal. For example, the first equalizer 70 performs a convolution arithmetic operation of a tap coefficient with respect to the input first reading signal, and outputs the first arithmetic operation processed signal which is a signal after the arithmetic operation.

The second equalizer 72 performs the waveform equalization process with respect to the input second reading signal. For example, the second equalizer 72 performs a convolution arithmetic operation of a tap coefficient with respect to the input second reading signal, and outputs the second arithmetic operation processed signal which is a signal after the arithmetic operation.

Each of the first equalizer 70 and the second equalizer 72 outputs the first arithmetic operation processed signal and the second arithmetic operation processed signal to the adder 44. The adder 44 adds and composes the first arithmetic operation processed signal input from the first equalizer 70 and the second arithmetic operation processed signal input from the second equalizer 72, and outputs the composite data obtained by the composite to the decoding unit 69.

Each of the first equalizer 70 and the second equalizer 72 is a one-dimensional FIR filter.

In one aspect, the FIR filter is a series of actual values including positive and negative values, the number of lines of the series is referred to as a tap number, and the numerical value is referred to as a tap coefficient. In addition, in one aspect, the waveform equalization indicates a process of the convolution arithmetic operation of the series of actual values, that is, the tap coefficient, with respect to the reading signal. The "reading signal" here indicates a collective term of the first reading signal and the second reading signal. In one aspect, the equalizer indicates a circuit which carries out a process of performing the convolution arithmetic operation of the tap coefficient with respect to the reading signal or the other input signal and outputting the signal after the arithmetic operation. In addition, in one aspect, the adder indicates a circuit which simply adds two series. The weighting of the two series is reflected on the numerical values, that is, the tap coefficient of the FIR filter used in the first equalizer 70 and the second equalizer 72.

The control device 18 performs the waveform equalization process according to the deviation amount with respect to each of the first equalizer 70 and the second equalizer 72 by setting the tap coefficient according to the deviation amount with respect to the FIR filter of each of the first equalizer 70 and the second equalizer 72.

The control device 18 comprises an association table 18A. The association table 18A associates the tap coefficient with the deviation amount regarding each of the first equalizer 70 and the second equalizer 72. A combination of the tap coefficient and the deviation amount is, for example, a combination obtained in advance as a combination of the tap coefficient and the deviation amount, with which the best composite data is obtained by the adder 44, based on the result obtained by performing at least one of the test performed with a real machine or a simulation. The "best composite data" here indicates data corresponding to the reading target track data.

Here, the "reading target track data" indicates "data derived from the reading target track 30A". The "data derived from the reading target track 30A" indicates data corresponding to data written on the reading target track 30A. As an example of the data written on the reading target track 30A, data which is read from the reading target track 30A and to which a noise component from the adjacent tracks is not mixed is used.

As described above, the association table 18A is used as an example. In another aspect, an arithmetic expression may be used instead of the association table 18A. The "arithmetic expression" here indicates an arithmetic expression in which an independent variable is set as the deviation amount and a dependent variable is set as the tap coefficient, for example.

As described above, the aspect in which the tap coefficient is derived from the association table 18A, in which combinations of the tap coefficients and the deviation amounts are regulated, has been described. In another aspect, for example, the tap coefficient may be derived from the association table in which the combinations of tap coefficients and ratios are regulated, or the arithmetic expression. The "ratio" here indicates a ratio between an overlapping region with the reading target track 30A and an overlapping region with the adjacent track, regarding each of the first reading element 40 and the second reading element 42. The ratio is calculated and specified from the deviation amount by the control device 18 and the tap coefficient is determined in accordance with the specified ratio.

The decoding unit 69 decodes the composite data input from the adder 44 and outputs a decoded signal obtained by the decoding to the computer 73. The computer 73 performs various processes with respect to the decoded signal input from the decoding unit 69.

Next, a magnetic tape reading process carried out by the extraction unit 62 will be described with reference to FIG. 9. Hereinafter, for convenience of description, the embodiment is described based on assumption that the servo signal is input to the control device 18, in a case where a period of the sampling comes. Here, the sampling is not limited to the sampling of the servo signal and also means the sampling of the reading signal. That is, in one aspect, the track region 30 is formed in parallel with the servo pattern 32 along the running direction, and accordingly, the reading operation by the reading element unit 38 is performed synchronously with the reading operation by the servo element pair 36.

Figure 9:
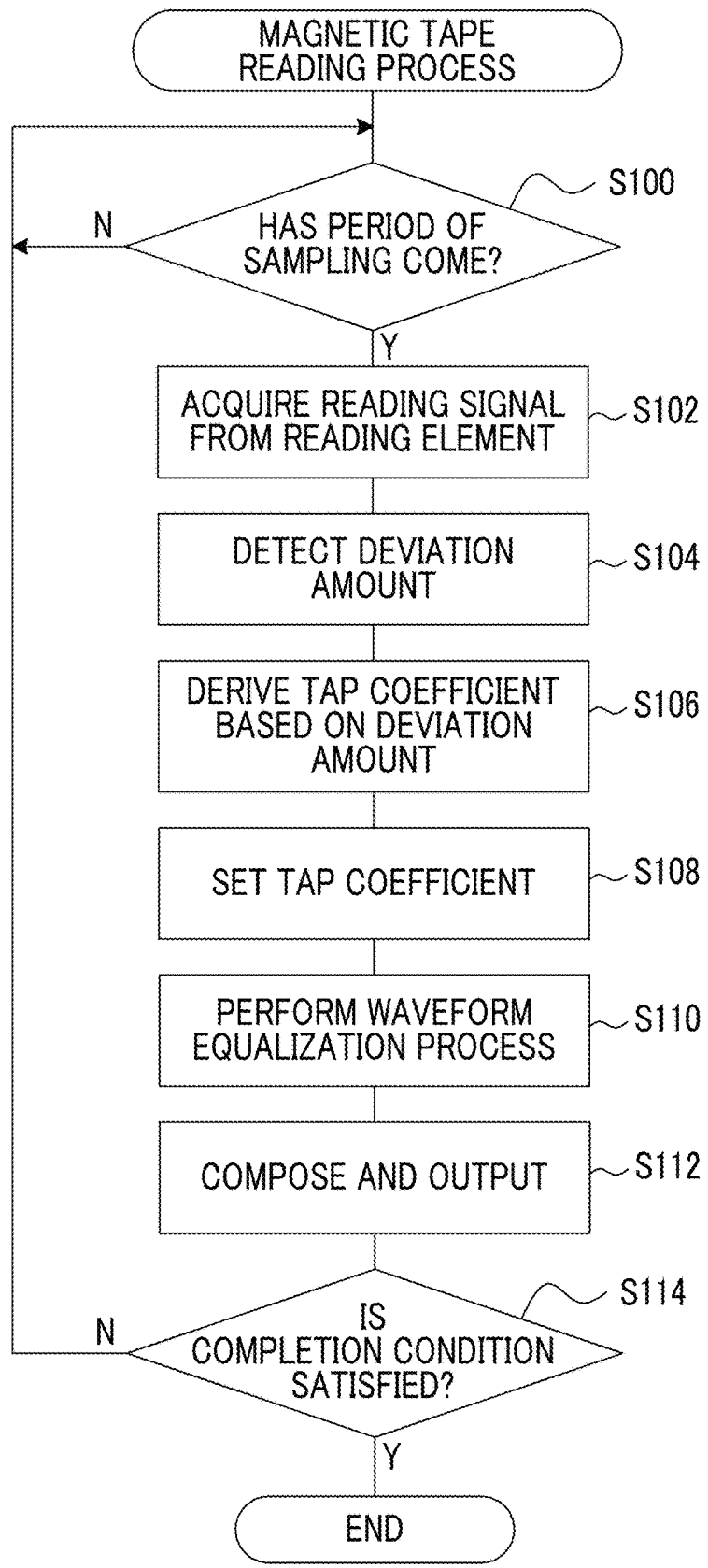
FIG. 9 is a flowchart showing an example of a flow of a magnetic tape reading process.

In the process shown in FIG. 9, first, in a step S100, the control device 18 determines whether or not the period of the sampling comes. In the step S100, in a case where the period of the sampling comes, the determination is affirmative and the magnetic tape reading process moves to a step S102. In the step S100, in a case where the period of the sampling does not come, the determination is denied, and the determination of the step S100 is performed again.

In a step S102, the first equalizer 70 acquires a first reading signal, the second equalizer 72 acquires a second reading signal, and then, the magnetic tape reading process moves to a step S104.

In the step S104, the control device 18 acquires a servo signal and calculates a deviation amount from the acquired servo signal, and then the magnetic tape reading process moves to a step S106.

In the step S106, the control device 18 derives a tap coefficient corresponding to the deviation amount calculated in the process of the step S104 from the association table 18A, regarding first to third taps of each of the first equalizer 70 and the second equalizer 72. That is, by performing the process of the step S106, an optimal combination is determined as a combination of a one-dimensional FIR filter which is an example of the first equalizer 70 and a one-dimensional filter which is an example of the second equalizer 72. The "optimal combination" here indicates, for example, a combination in which the composite data output by performing a process of a step S112 which will be described later is set as data corresponding to the reading target track data.

In the next step S108, the control device 18 sets the tap coefficient derived in the process of the step S106 with respect to each of the first equalizer 70 and the second equalizer 72, and then the magnetic tape reading process moves to a step S110.

In the step S110, the first equalizer 70 performs the waveform equalization process with respect to the first reading signal acquired in the process of the step S102, and accordingly, the first arithmetic operation processed signal is generated. The first equalizer 70 outputs the generated first arithmetic operation processed signal to the adder 44. The second equalizer 72 performs the waveform equalization process with respect to the second reading signal acquired in the process of the step S102, and accordingly, the second arithmetic operation processed signal is generated. The second equalizer 72 outputs the generated second arithmetic operation processed signal to the adder 44.

Figure 10:
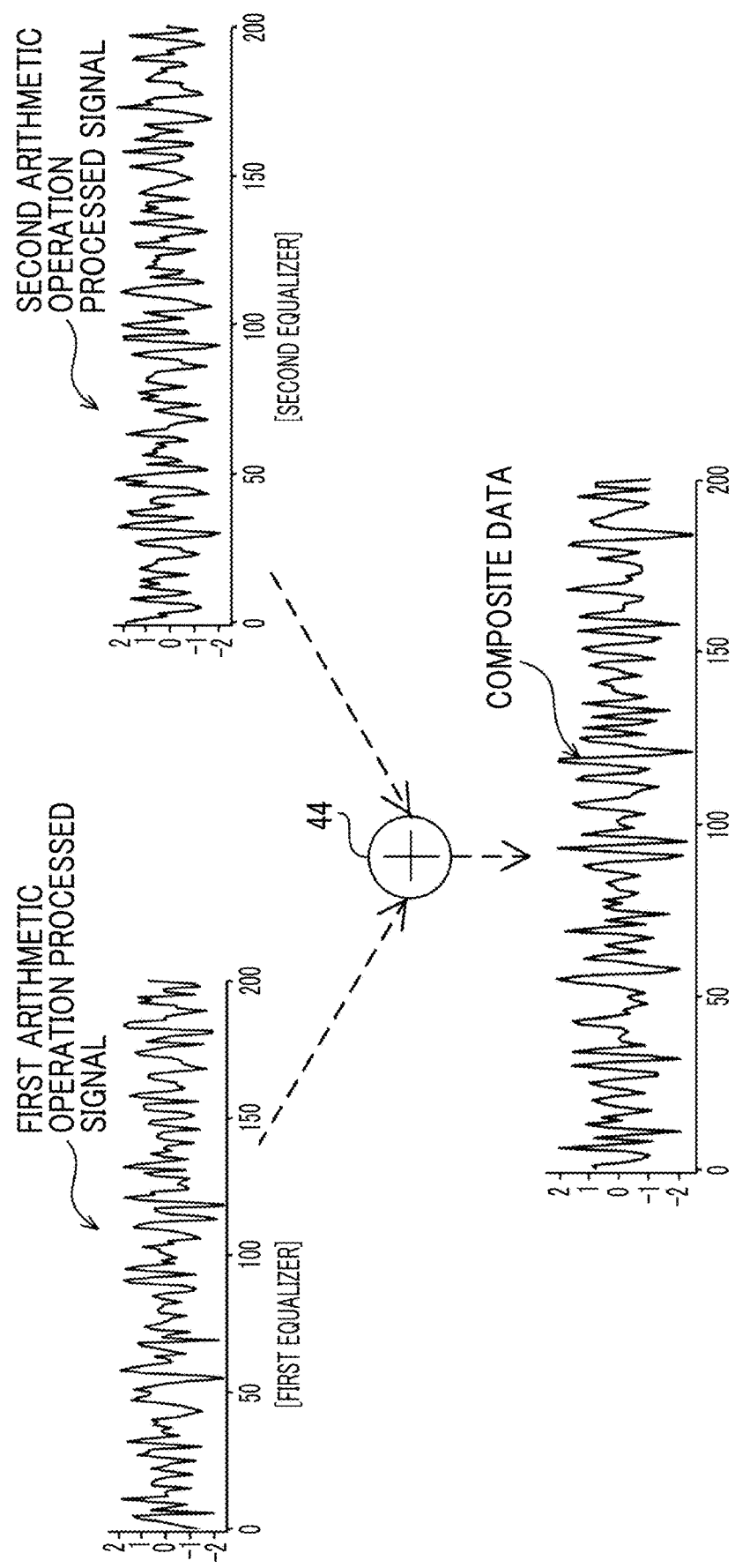
FIG. 10 is a conceptual view provided for description of a process performed by a two-dimensional FIR filter of an extraction unit.

In the next step S112, the adder 44 adds and composes the first arithmetic operation processed signal input from the first equalizer 70 and the second arithmetic operation processed signal input from the second equalizer 72, as shown in FIG. 10 as an example. The adder 44 outputs the composite data obtained by the composite to the decoding unit 69.

In a case where the reading element unit 38 is disposed in the specific track region 31, as the example shown in FIG. 3, the data corresponding to the reading target track data, from which the noise component from the first noise mixing source track 30B is removed, is output as the composite data, by performing the process of the step S112. That is, by performing the process of the step S102 to the step S112, the extraction unit 62 extracts only the data derived from the reading target track 30A.

Figure 11:
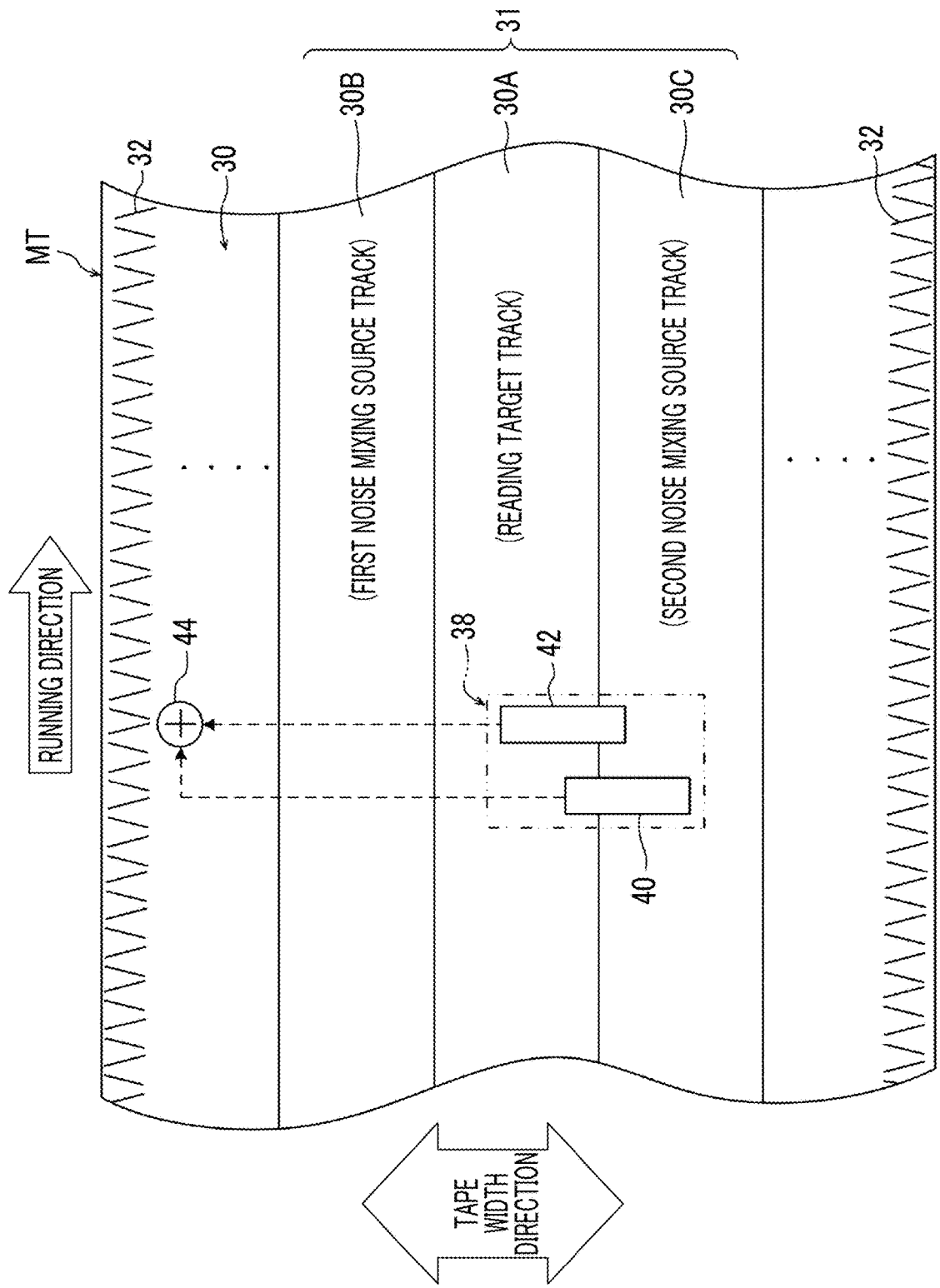
FIG. 11 is a schematic plan view showing an example of a state where the reading element unit straddles over a reading target track and a second noise mixing source track.

In a case where the magnetic tape MT expands and contracts in the tape width direction or vibration is applied to at least one of the magnetic tape MT or the reading head 16, the reading element unit 38 is displaced to a position shown in FIG. 11 from the position shown in FIG. 3 as an example. In the example shown in FIG. 11, the first reading element 40 and the second reading element 42 are disposed at positions straddling over both of the reading target track 30A and the second noise mixing source track 30C. In this case, by performing the process of the step S102 to the step S112, the data corresponding to the reading target track data, from which the noise component from the second noise mixing source track 30C is removed, is output to the decoding unit 69 as the composite data.

In the next step S114, the control device 18 determines whether or not a condition for completing the magnetic tape reading process (hereinafter, referred to as a "completion condition") is satisfied. The completion condition indicates, for example a condition in which the entire magnetic tape MT is wound around the winding reel 22, a condition in which an instruction for forced completion of the magnetic tape reading process is applied from the outside, and the like.

In the step S114, in a case where the completion condition is not satisfied, the determination is denied, and the magnetic tape reading process is moved to the step S100. In the step S114, in a case where the completion condition is satisfied, the determination is affirmative, and the magnetic tape reading process ends.

As described above, in one aspect of the magnetic tape apparatus 10, the data from the specific track region 31 is read by each of the first reading element 40 and the second reading element 42 disposed in a state of being adjacent to each other. In addition, the extraction unit 62 performs the waveform equalization process according to the deviation amount with respect to each of the first reading element 40 and the second reading element 42, to extract the data derived from the reading target track 30A from the first reading signal and the second reading signal. Therefore, in the magnetic tape apparatus 10, it is possible to prevent a deterioration in reproducing quality of data read from the reading target track 30A by the linear scanning method, compared to a case where the data is read from the reading target track 30A only by a single reading element by the linear scanning method.

In one aspect of the magnetic tape apparatus 10, parts of the first reading element 40 and the second reading element 42 are overlapped each other in the running direction. Therefore, in the magnetic tape apparatus 10, it is possible to increase reproducing quality of data read from the reading target track 30A by the linear scanning method, compared to a case where the entire portions of the plurality of reading elements are overlapped in the running direction.

In one aspect of the magnetic tape apparatus 10, the specific track region 31 is the reading target track 30A, the first noise mixing source track 30B, and the second noise mixing source track 30C, and each of the first reading element 40 and the second reading element 42 straddles over both of the reading target track 30A and the adjacent track, in a case where a positional relationship with the magnetic tape MT is changed. Therefore, in the magnetic tape apparatus 10, it is possible to reduce the noise component generated in one of the reading element of the first reading element 40 and the second reading element 42 due to entering the adjacent track from the reading target track 30A in the tape width direction, by using the reading result obtained by the other reading element entering the adjacent track from the reading target track 30A in the tape width direction, compared to a case where the data is read by only the single reading element from the reading target track 30A by the linear scanning method.

In one aspect of the magnetic tape apparatus 10, the tap coefficient used in the waveform equalization process is determined in accordance with the deviation amount. Therefore, in the magnetic tape apparatus 10, it is possible to instantaneously reduce the noise component generated due to the entering the reading target track 30A from the adjacent track in the tape width direction, in accordance with a change of the positional relationship between the magnetic tape MT and the reading element unit 38, compared to a case where the tap coefficient is determined in accordance with a parameter with no relation with the deviation amount.

In one aspect of the magnetic tape apparatus 10, regarding each of the first reading element 40 and the second reading element 42, the ratio between the overlapping region with the reading target track 30A and the overlapping region with the adjacent track is specified from the deviation amount, and the tap coefficient according to the specified ratio is determined. Therefore, in the magnetic tape apparatus 10, it is possible to exactly reduce the noise component, even in a case where the positional relationship between the magnetic tape MT and the reading element unit 38 is changed, compared to a case where the tap coefficient is determined in accordance with a parameter with no relation with a ratio between the overlapping region with the reading target track 30A and the overlapping region with the adjacent track regarding each of the plurality of reading elements.

In one aspect of the magnetic tape apparatus 10, the deviation amount is determined in accordance with the result obtained by reading the servo patterns 32 by the servo element pair 36. Therefore, in the magnetic tape apparatus 10, it is possible to easily determine the deviation amount, compared to a case where the servo patterns 32 are not applied to the magnetic tape MT.

In one aspect of the magnetic tape apparatus 10, the reading operation by the reading element unit 38 is performed synchronously with the reading operation by the servo element pair 36. Therefore, in the magnetic tape apparatus 10, it is possible to instantaneously reduce the noise component generated due to the entering the reading target track from the adjacent track in the width direction of the magnetic tape, compared to a case of a magnetic disk and a magnetic tape in a helical scanning method, in which a servo pattern and data cannot be synchronously read.

In one aspect of the magnetic tape apparatus 10, the extraction unit 62 includes the two-dimensional FIR filter 71. Each result obtained by performing the waveform equalization process with respect to each of the first reading signal and the second reading signal is composed by the two-dimensional FIR filter 71, and accordingly, the data derived from the reading target track 30A is extracted from the first reading signal and the second reading signal. Therefore, in the magnetic tape apparatus 10, it is possible to rapidly extract the data derived from the reading target track 30A from the first reading signal and the second reading signal, compared to a case of using only a one-dimensional FIR filter. In addition, in the magnetic tape apparatus 10, it is possible to realize simple calculation due to a smaller operation amount, compared to a case of performing a matrix operation.

In one aspect of the magnetic tape apparatus 10, the first reading element 40 and the second reading element 42 are used as a pair of reading elements. Therefore, in the magnetic tape apparatus 10, it is possible to contribute to miniaturization of the reading element unit 38, compared to a case of using three or more reading elements. By miniaturizing the reading element unit 38, the reading unit 26 and the reading head 16 can also be miniaturized. In addition, in the magnetic tape apparatus 10, it is possible to prevent occurrence of a situation in which the reading element units 38 adjacent to each other are in contact with each other.

In one aspect of the magnetic tape apparatus 10, each of the plurality of reading element units 38 reads data from the corresponding reading target track 30A included in each of the plurality of specific track regions 31 by the linear scanning method. Therefore, in the magnetic tape apparatus 10, it is possible to rapidly complete the reading of data from the plurality of reading target tracks 30A, compared to a case where the data is read by only the single reading element unit 38 from each of the plurality of reading target tracks 30A.

In the aspect, in a default state of the magnetic tape apparatus 10, each of the first reading element 40 and the second reading element 42 is provided to straddle over both of the reading target track 30A and the first noise mixing source track 30B, but the magnetic tape apparatus is not limited to the aspect. In an example shown in FIG. 12, a reading element unit 138 is used instead of the reading element unit 38 described above. The reading element unit 138 comprises a first reading element 140 and a second reading element 142. In a default state of the magnetic tape apparatus 10, the center of the first reading element 140 in the tape width direction coincides with a center CL of the reading target track 30A in the tape width direction. In a default state of the magnetic tape apparatus 10, the first reading element 140 and the second reading element 142 fall in the reading target track 30A, without being protruded to the first noise mixing source track 30B and the second noise mixing source track 30C. In addition, in a default state of the magnetic tape apparatus 10, parts of the first reading element 140 and the second reading element 142 are provided to be overlapped each other in the running direction, in the same manner as the case of the first reading element 40 and the second reading element 42 described in the embodiment.

Figure 12:
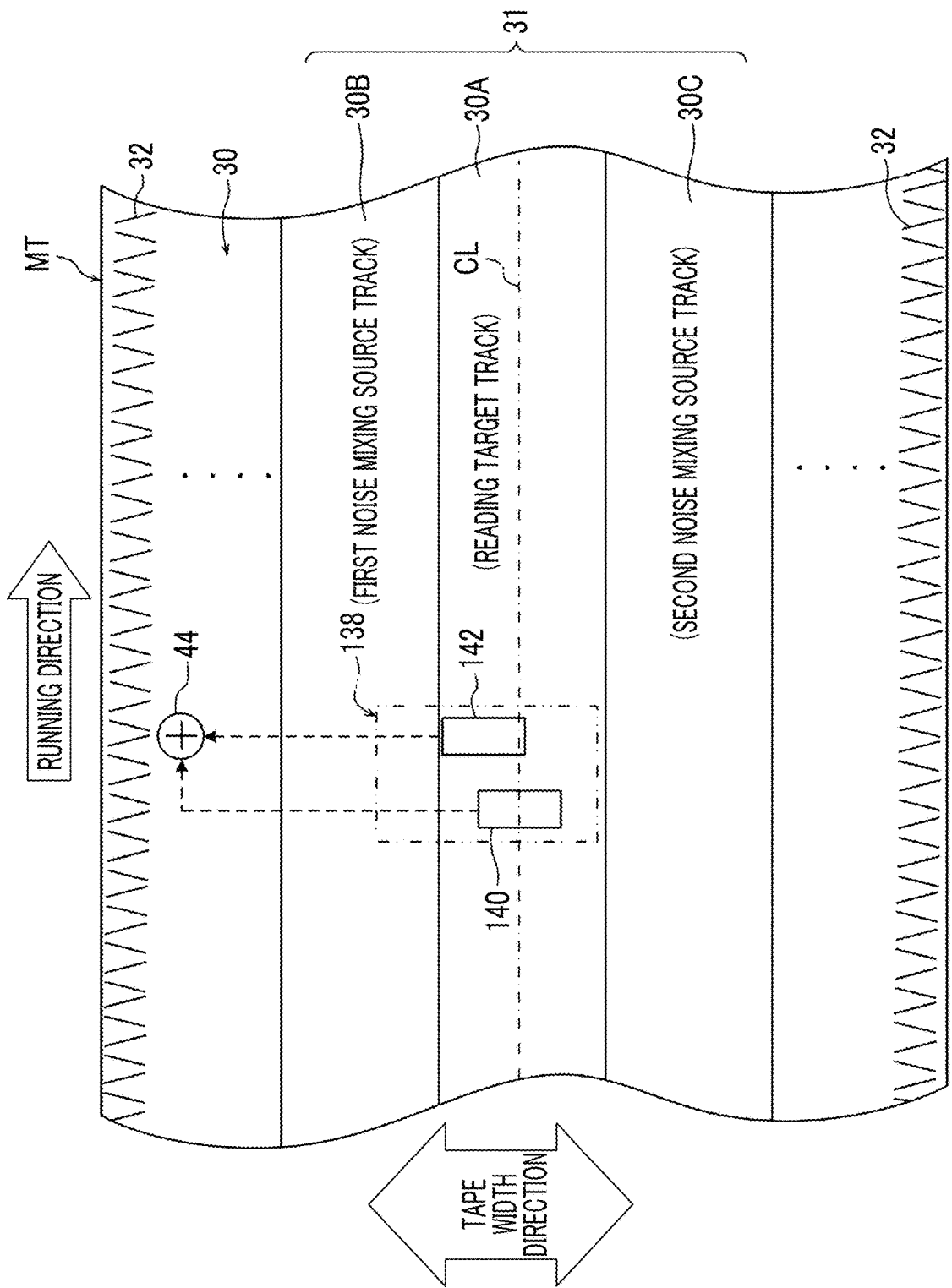
FIG. 12 is a schematic plan view showing a first modification example of the reading element unit.

As shown in FIG. 12 as an example, even in a state where the first reading element 140 and the second reading element 142 face the reading target track 30A, without being protruded from the reading target track 30A, a positional relationship between the reading element unit 138 and the magnetic tape MT may be changed. That is, the reading element unit 138 may straddle over the reading target track 30A and the first noise mixing source track 30B, or the reading element unit 138 may straddle over the reading target track 30A and the second noise mixing source track 30C. Even in these cases, by performing the processes in the step S102 to the step S112 described above, it is possible to obtain the data corresponding to the reading target track data, from which the noise component from the first noise mixing source track 30B or the second noise mixing source track 30C is removed.

In addition, parts of the first reading element 140 and the second reading element 142 are disposed at position to be overlapped each other in the running direction, and accordingly, the second reading element 142 can read the data from a portion of the reading target track 30A where the reading cannot be performed by the first reading element 140. As a result, it is possible to increase reliability of the reading target track data, compared to a case where the first reading element 140 singly reads the data from the reading target track 30A.

As shown in FIG. 11 as an example, in a default state of the magnetic tape apparatus 10, each of the first reading element 40 and the second reading element 42 may be disposed at a position to straddle over both of the reading target track 30A and the second noise mixing source track 30C.

As described above, the reading element unit 38 including the first reading element 40 and the second reading element 42 has been described. However, the magnetic tape apparatus is not limited to the aspect. In an example shown in FIG. 13, a reading element unit 238 may be used instead of the reading element unit 38. The reading element unit 238 is different from the reading element unit 38, in a point that a third reading element 244 is included. In a default state of the magnetic tape apparatus 10, the third reading element 244 is disposed at a position where a part thereof is overlapped with a part of the first reading element 40 in the running direction. In addition, in a default state of the magnetic tape apparatus 10, the third reading element 244 is disposed at a position to straddle over the reading target track 30A and the second noise mixing source track 30C.

In this case, a third equalizer (not shown) is also allocated to the third reading element 244, in the same manner as a case where the first equalizer 70 is allocated to the first reading element 40 and the second equalizer 72 is allocated to the second reading element 42. The third equalizer also has the same function as that of the first equalizer and the second equalizer described above, and performs a waveform equalization process with respect to a third reading signal obtained by reading performed by the third reading element 244. The third equalizer performs a convolution arithmetic operation of a tap coefficient with respect to the third reading signal and outputs the third arithmetic operation processed signal which is a signal after the arithmetic operation. The adder 44 adds and composes a first arithmetic operation processed signal corresponding to the first reading signal, a second arithmetic operation processed signal corresponding to the second reading signal, the third arithmetic operation processed signal corresponding to the third reading signal, and outputs the composite data obtained by the composite to the decoding unit 69.

Figure 13:
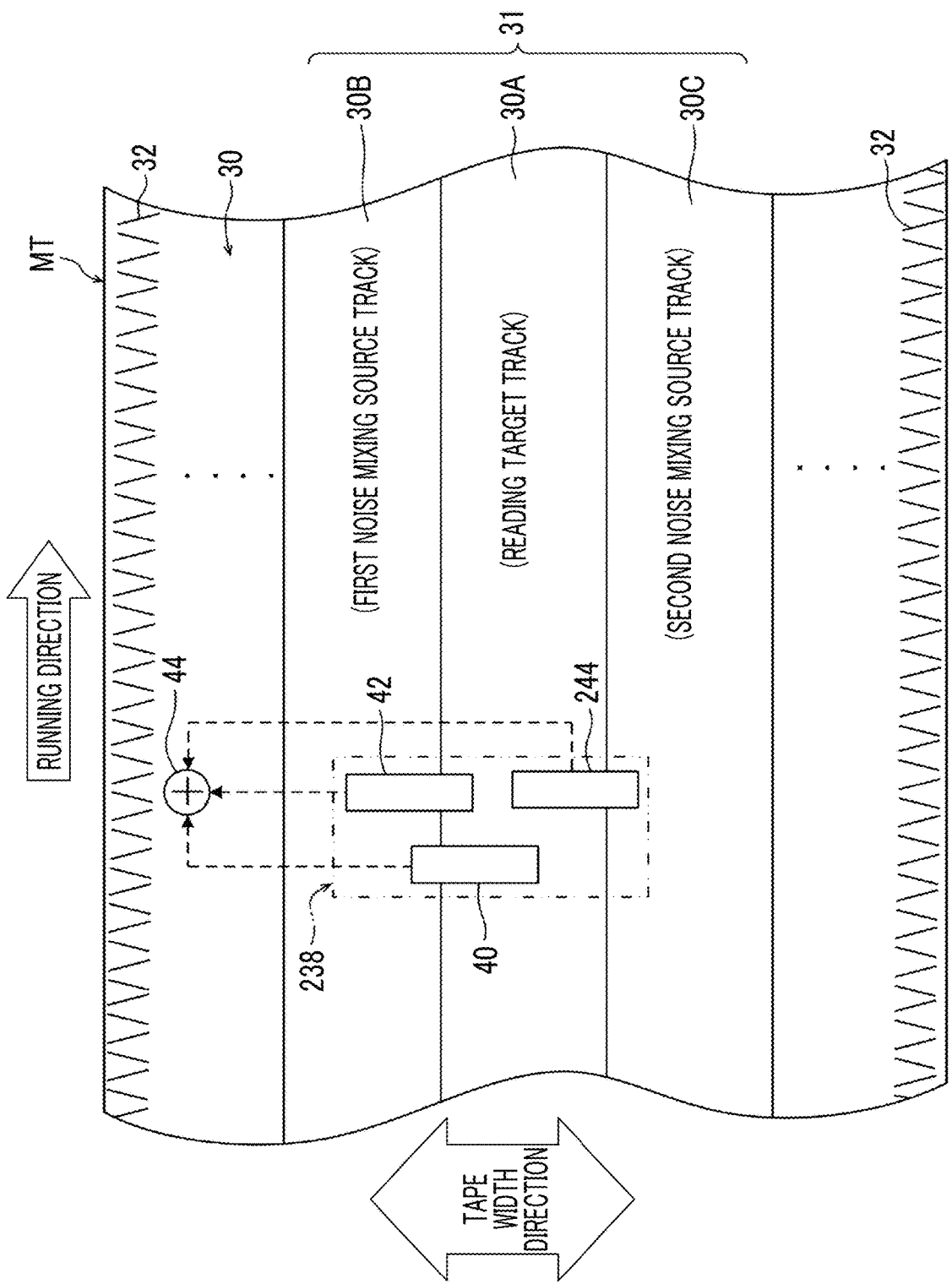
FIG. 13 is a schematic plan view showing a second modification example of the reading element unit.

In the example shown in FIG. 13, in a default state of the magnetic tape apparatus 10, the third reading element 244 is disposed at the position straddling over the reading target track 30A and the second noise mixing source track 30C, but the technology of the present disclosure is not limited thereto. In a default state of the magnetic tape apparatus 10, the third reading element 244 may be disposed at the position facing the reading target track 30A, without being protruded from the reading target track 30A.

As described above, the reading element unit 38 has been described. However, the magnetic tape apparatus is not limited to the aspect. For example, the reading element pair 50 shown in FIG. 4 may be used instead of the reading element unit 38. In this case, the first reading element 50A and the second reading element 50B are set to be disposed at positions adjacent to each other in the tape width direction. In addition, the first reading element 50A and the second reading element 50B are set to be disposed in a line in the tape width direction so that the SNR is higher than the SNR of the single reading element data over the entire range of the track off-set, as shown in FIG. 6 as an example, without being in contact with each other.

In the example shown in FIG. 4, for example, the first reading element 50A falls in the second track 49B in a plan view, and the second reading element 50B falls in the first track 49A in a plan view.

As described above, the servo element pair 36 have been described. However, the magnetic tape apparatus is not limited to the aspect. For example, one of the servo elements 36A and 36B may be used instead of the servo element pair 36.

As described above, the aspect in which the plurality of specific track regions 31 are arranged in the track region 30 at regular interval in the tape width direction has been described. However, the magnetic tape apparatus is not limited to the aspect. For example, in two specific track regions 31 adjacent to each other in the plurality of specific track regions 31, one specific track region 31 and the other specific track region 31 may be arranged in the tape width direction so as to be overlapped by the area of one track in the tape width direction. In this case, one adjacent track included in one specific track region 31 (for example, first noise mixing source track 30B) becomes the reading target track 30A in the other specific track region 31. In addition, the reading target track 30A included in one specific track region 31 becomes the adjacent track region (for example, second noise mixing source track 30C) in the other specific track region 31.

The configuration of the magnetic tape apparatus and the magnetic tape reading process described above are merely an example. Accordingly, unnecessary steps can be removed, new steps can be added, and the process procedure can be changed, within a range not departing from the gist.

The magnetic tape apparatus can perform the reading (reproducing) of data recorded on the magnetic tape, and can also have a configuration for recording data on the magnetic tape.

Magnetic Tape

Next, the magnetic tape on which the reading of the data is performed in the magnetic tape apparatus will be described in detail.

cos θ

In the magnetic tape, the tilt cos θ of the hexagonal ferrite powder with respect to the surface of the magnetic layer acquired by the cross section observation performed by using a scanning transmission electron microscope is 0.85 to 1.00. It is thought that a reason for a deterioration in accuracy for specifying the position of the reading element by reading the servo pattern is magnetization of an unintended portion on the magnetic layer, during the magnetization (formation of servo pattern) performed by the servo write head. It is surmised that the magnetization of an unintended portion described above easily occurs due to generation of a magnetic strain on the magnetic layer. On the other hand, it is thought that, by setting the cos θ to be equal to or greater than 0.85, it is possible to prevent the generation of a magnetic strain on the magnetic layer. Accordingly, it is possible to increase an accuracy for specifying the position of the reading element by reading of the servo pattern, and as a result, it is surmised that, it is possible to decrease the error between the deviation amount detected by the reading of the servo pattern and the deviation amount generated in practice. It is thought that this contributes to setting more suitable waveform equalization process to be performed with respect to the reading result obtained by the reading at each portion. The cos θ is preferably equal to or greater than 0.89, more preferably equal to or greater than 0.90, even more preferably equal to or greater than 0.92, and still preferably equal to or greater than 0.95. Meanwhile, in a case where all of the hexagonal ferrite particles having an aspect ratio and a length in a long axis direction which will be described later are present in parallel with the surface of the magnetic layer, the cos θ becomes 1.00 which is the maximum value. It is thought that a greater value of the cos θ is preferable, from a viewpoint of further preventing the magnetization of an unintended portion on the magnetic layer, during the magnetization (formation of servo pattern) performed by the servo write head. Accordingly, in the magnetic tape, the upper limit of the cos θ is equal to or smaller than 1.00. The cos θ may be, for example, equal to or smaller than 0.99. However, as described above, it is thought that a greater value of the cos θ is preferable, and thus, the cos θ may exceed 0.99.

Calculation Method of cos θ

The cos θ is acquired by the cross section observation performed by using a scanning transmission electron microscope (hereinafter, also referred to as a "STEM"). The cos θ of the invention and the specification is a value measured and calculated by the following method.

(1) A cross section observation sample is manufactured by performing the cutting out from any determined position of the magnetic tape which is a target for acquiring the cos θ. The manufacturing of the cross section observation sample is performed by focused ion beam (FIB) processing using a gallium ion ($Ga^+$) beam. A specific example of such a manufacturing method is shown in an example which will be described later.

(2) The manufactured cross section observation sample is observed with the STEM, and a STEM images are captured. The STEM images are captured at positions of the same cross section observation sample randomly selected, except for selecting so that the imaging ranges are not overlapped, and 10 images in total are obtained. The STEM image is a STEM-high-angle annular dark field (HAADF) image which is captured at an acceleration voltage of 300 kV and a magnification ratio of imaging of 450,000, and the imaging is performed so that entire region of the magnetic layer in a thickness direction is included in one image. The entire region of the magnetic layer in the thickness direction is a region from the surface of the magnetic layer observed in the cross section observation sample to an interface with a layer adjacent to the magnetic layer or the non-magnetic support. The expression, the surface of the magnetic layer is used in the same manner as the surface of the magnetic tape on the magnetic layer side. The adjacent layer is a non-magnetic layer, in a case where the magnetic tape which is a target for acquiring the cos θ includes the non-magnetic layer which will be described later between the magnetic layer and the non-magnetic support. Meanwhile, in a case where the magnetic tape which is a target for acquiring the cos θ includes the magnetic layer directly on the non-magnetic support, the interface is an interface between the magnetic layer and the non-magnetic support.

(3) In each STEM image obtained as described above, a linear line connecting both ends of a line segment showing the surface of the magnetic layer is determined as a reference line. In a case where the STEM image is captured so that the magnetic layer side of the cross section observation sample is positioned on the upper side of the image and the non-magnetic support side is positioned on the lower side, for example, the linear line connecting both ends of the line segment described above is a linear line connecting an intersection between a left side of the image (normally, having a rectangular or square shape) of the STEM image and the line segment, and an intersection between a right side of the STEM image and the line segment to each other.

(4) Among the hexagonal ferrite particles observed in the STEM image, an angle θ formed by the reference line and the long axis direction of the hexagonal ferrite particles (primary particles) having an aspect ratio in a range of 1.5 to 6.0 and a length in the long axis direction equal to or greater than 10 nm is measured, and regarding the measured angle θ, the cos θ is calculated as a cos θ based on a unit circle. The calculation of the cos θ is performed with 30 particles randomly extracted from the hexagonal ferrite particles having the aspect ratio and the length in the long axis direction in each STEM image.

(5) The measurement and the calculation are respectively performed for 10 images, the values of the acquired cos θ of the 30 hexagonal ferrite particles of each image, that is, 300 hexagonal ferrite particles in total of the 10 images, are arithmetically averaged. The arithmetical mean acquired as described above is set as the tilt cos θ of the hexagonal ferrite powder with respect to the surface of the magnetic layer acquired by the cross section observation performed by using the scanning transmission electron microscope.

Here, the "aspect ratio" observed in the STEM image is a ratio of "length in the long axis direction/length in a short axis direction" of the hexagonal ferrite particles.

The "long axis direction" means a direction in a case where an end portion close to the reference line and an end portion far from the reference line are connected to each other, among the end portions which are most separated from each other, in the image of one hexagonal ferrite particle observed in the STEM image. In a case where a line segment connecting one end portion and the other end portion is parallel with the reference line, a direction parallel to the reference line becomes the long axis direction.

The "length in the long axis direction" means a length of a line segment drawn by connecting end portions which are most separated from each other, in the image of one hexagonal ferrite particle observed in the STEM image. Meanwhile, the "length in the short axis direction" means a length of the longest line segment, among the line segments connecting two intersections between an outer periphery of the image of the particle and a perpendicular line with respect to the long axis direction.

In addition, the angle θ formed by the reference line and the tilt of the particle in the long axis direction is determined to be in a range of 0° to 90°, by setting an angle of the long axis direction parallel to the reference line as 0°. Hereinafter, the angle θ will be further described with reference to the drawings.

Figure 21:
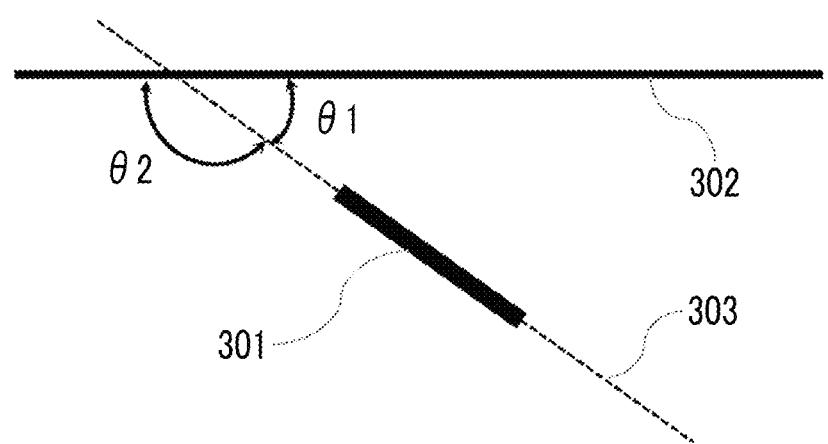
FIG. 21 is an explanatory view of an angle θ regarding a cos θ.
Figure 22:
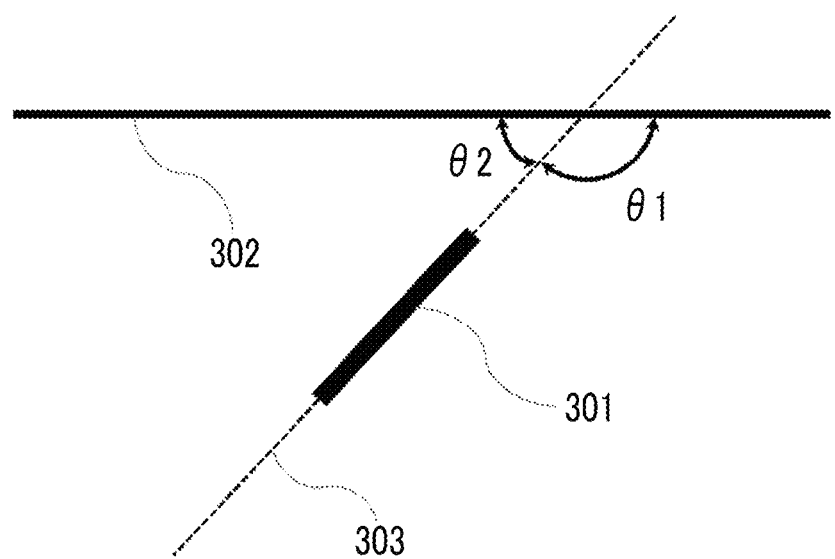
FIG. 22 is another explanatory view of the angle θ regarding the cos θ.

FIGS. 21 and 22 are explanatory views of the angle θ. In FIGS. 21 and 22, a reference numeral 301 indicates a line segment (length in the long axis direction) drawn by connecting end portions which are most separated from each other, a reference numeral 302 indicates the reference line, and a reference numeral 303 indicates an extended line of the line segment (reference numeral 301). In this case, as the angle formed by the reference line 302 and the extended line 303, θ1 and θ2 are exemplified as shown in FIGS. 21 and 22. Here, a smaller angle is used from the θ1 and θ2, and this is set as the angle θ. Accordingly, in the aspect shown in FIG. 21, the θ1 is set as the angle θ, and in the aspect shown in FIG. 22, θ2 is set as the angle θ. A case where θ1=θ2 is a case where the angle θ=90°. The cos θ based on the unit circle becomes 1.00, in a case where the θ=0°, and becomes 0, in a case where the θ=90°.

Adjustment Method of cos θ

The magnetic tape can be manufactured through a step of applying a magnetic layer forming composition onto the non-magnetic support. As an adjustment method of the cos θ, a method of controlling a dispersion state of the hexagonal ferrite powder of the magnetic layer forming composition is used. In regards to this point, it is thought that, as dispersibility of the hexagonal ferrite powder in the magnetic layer forming composition is increased, the hexagonal ferrite particles having the aspect ratio in a range and a length in the long axis direction in the ranges described above, in the magnetic layer formed by using this magnetic layer forming composition are easily aligned in a state closer to parallel to the surface of the magnetic layer. As means for increasing dispersibility, any one or both of the following methods (1) and (2) are used.

(1) Adjustment of Dispersion Conditions
(2) Use of Dispersing Agent

In addition, in the magnetic tape including an abrasive in the magnetic layer, as means for increasing dispersibility, a method of separately dispersing the hexagonal ferrite powder and the abrasive is also used. The separate dispersing is specifically a method of preparing the magnetic layer forming composition through a step of mixing a magnetic liquid including the hexagonal ferrite powder, a binding agent, and a solvent (here, substantially not including an abrasive), and an abrasive solution including an abrasive and a solvent with each other. By performing the mixing after separately dispersing the abrasive and the hexagonal ferrite powder as described above, it is possible to increase the dispersibility of the hexagonal ferrite powder in the magnetic layer forming composition. The expression of "substantially not including an abrasive" means that the abrasive is not added as a constituent component of the magnetic liquid, and a small amount of the abrasive present as impurities by being mixed without intention is allowed. In addition, it is also preferable that any one or both of the methods (1) and (2) is combined with the separate dispersion described above. In this case, by controlling the dispersion state of the hexagonal ferrite powder in the magnetic liquid, it is possible to control the dispersion state of the hexagonal ferrite powder in the magnetic layer forming composition obtained through the step of mixing the magnetic liquid with the abrasive solution.

For example, as one aspect of a dispersing agent, a polyester chain-containing compound can be used, and a weight-average molecular weight thereof is preferably 1,000 to 80,000. As one aspect of the polyester chain-containing compound, a compound represented by General Formula 1 disclosed in JP2016-177851A can be used. In addition, in one aspect, the polyester chain-containing compound can include at least one polyalkyleneimine chain. As one aspect of the polyester chain, a polyester chain represented by Formula 2-A or a polyester chain represented by Formula 2-B disclosed in JP2016-177851A can be used.

For details of various adjustment methods and dispersing agent, a description disclosed in paragraphs 0038 to 0144 of JP2016-177851A and paragraphs 0045 to 0136 of JP2017-224365A can be referred to.

Next, the magnetic layer and the like included in the magnetic tape will be described more specifically.

Magnetic Layer

Ferromagnetic Powder

The ferromagnetic powder included in the magnetic layer is a hexagonal ferrite powder. As an index for a particle size of the hexagonal ferrite powder, an activation volume which is a unit of magnetization reversal can be used. In one aspect, the activation volume of the hexagonal ferrite powder included in the magnetic layer can be equal to or smaller than 1,600 $nm^3$, or may be equal to or smaller than 1,500 $nm^3$ or equal to or smaller than 1,400 $nm^3$. In general, a smaller activation volume can be suitable for high-density recording. Meanwhile, from a viewpoint of stability of magnetization, the activation volume of the hexagonal ferrite powder is preferably equal to or greater than 800 $nm^3$, more preferably equal to or greater than 1,000 $nm^3$, and even more preferably equal to or greater than 1,200 $nm^3$.

The "activation volume" is a unit of magnetization reversal and an index showing a magnetic magnitude of the particles. Regarding the activation volume and an anisotropy constant Ku which will be described later disclosed in the invention and the specification, magnetic field sweep rates of a coercivity Hc measurement part at time points of 3 minutes and 30 minutes are measured by using a vibrating sample magnetometer (measurement temperature: 23° C.±1° C.), and the activation volume and the anisotropy constant Ku are values acquired from the following relational expression of Hc and an activation volume V. A unit of the anisotropy constant Ku is 1 erg/cc=1.0×10$^{-1}$ J/m$^3$.

$$Hc=2Ku/Ms\{1-[(kT/KuV)\ln(At/0.693)]^{1/2}\}$$

[In the expression, Ku: anisotropy constant (unit: J/m$^3$), Ms: saturation magnetization (unit: kA/m), k: Boltzmann's constant, T: absolute temperature (unit: K), V: activation volume (unit: cm$^3$), A: spin precession frequency (unit: s$^{-1}$), and t: magnetic field reversal time (unit: s)]

Regarding the hexagonal ferrite powder present as powder, the activation volume described above can be obtained by using the powder as a measurement sample. Meanwhile, regarding the hexagonal ferrite powder included in the magnetic layer of the magnetic tape, powder can be collected from the magnetic layer to obtain a measurement sample. The collecting of the measurement sample can be performed by the following method, for example.

1. The surface treatment is performed with respect to the surface of the magnetic layer with a plasma reactor manufactured by Yamato Scientific Co., Ltd. for 1 to 2 minutes, and an organic component (binding agent and the like) on the surface of the magnetic layer is incinerated and removed.

2. A filter paper dipped in an organic solvent such as cyclohexanone or acetone is bonded to an edge portion of a metal rod, the surface of the magnetic layer subjected to the treatment of 1. is rubbed thereon, the component of the magnetic layer is peeled off and transferred to the filter paper from the magnetic tape.

3. The component peeled in 2. is shaken off to fall into an organic solvent such as cyclohexanone or acetone (the filter paper is put into the organic solvent and the component is shaken off by an ultrasonic dispersing device), the organic solvent is dried, and the peeled component is extracted.

4. The component shaken off in 3. is put into a sufficiently washed glass test tube, for example, approximately 20 ml of n-butylamine is added thereto, and the glass test tube is sealed (the amount of n-butylamine capable of decomposing the remaining organic component without being incinerated is added).

5. The glass test tube is heated at an internal temperature of 170° C. for 20 hours or longer, and the organic component is decomposed.

6. The precipitate after the decomposition in 5. is sufficiently washed with pure water and dried, and powder is extracted.

7. A neodymium magnet is brought close to the powder collected in 6. and the adsorbed powder (that is, hexagonal ferrite powder) is extracted.

With the steps described above, the hexagonal ferrite powder for measuring the activation volume can be collected from the magnetic layer. The hexagonal ferrite powder is substantially not damaged due to the treatment described above, and thus, the measurement of the activation volume of the hexagonal ferrite powder in a state of being included in the magnetic layer can be performed by the method described above.

In the invention and the specification, the ferromagnetic powder means an aggregate of a plurality of ferromagnetic particles, and the aggregate not only includes an aspect in which particles configuring the aggregate directly come into contact with each other, but also includes an aspect in which a binding agent or an additive is interposed between the particles. The same applies to various powders such as non-magnetic powder in the invention and the specification. The particles (hexagonal ferrite particles) configuring the hexagonal ferrite powder are also referred to as "hexagonal ferrite particles" or simply "particles". A percentage of the hexagonal ferrite particles having the aspect ratio and the long axis direction in the ranges described above in all of the hexagonal ferrite particles observed in the STEM image described above, can be, for example, equal to or greater than 50%, as a percentage with respect to all of the hexagonal ferrite particles observed in the STEM image, based on the particle number. In addition, the percentage can be, for example, equal to or smaller than 95% and can exceed 95%. For other details of hexagonal ferrite powder, descriptions disclosed in paragraphs 0012 to 0030 of JP2011-225417A, paragraphs 0134 to 0136 of JP2011-216149A, paragraphs 0013 to 0030 of JP2012-204726A, and paragraphs 0029 to 0084 of JP2015-127985A can be referred to, for example.

In the invention and the specification, the "hexagonal ferrite powder" is to be understood to mean ferromagnetic powder from which a hexagonal ferrite type crystal structure can be detected as a main phase by X-ray diffraction analysis. The main phase is to be understood to mean a structure to which the diffraction peak with the highest intensity in an X-ray diffraction spectrum obtained by X-ray diffraction analysis is assigned. For example, when the diffraction peak with the highest intensity in an X-ray diffraction spectrum obtained by X-ray diffraction analysis is assigned to the hexagonal ferrite type crystal structure, it shall be determined that the hexagonal ferrite type crystal structure is detected as a main phase. When a single structure is only detected by X-ray diffraction analysis, this detected structure is determined as a main phase. The hexagonal ferrite type crystal structure at least contains, as constitutional atoms, an iron atom, a divalent metal atom, and an oxygen atom. A divalent metal atom is a metal atom which can convert into a divalent cation as an ion thereof, and examples thereof include alkaline earth metal atoms, such as a strontium atom, a barium atom, and a calcium atom, and a lead atom. In the invention and the specification, the hexagonal strontium ferrite powder is to be understood to mean powder in which a main divalent metal atom contained therein is a strontium atom, and the hexagonal barium ferrite powder is to be understood to mean powder in which a main divalent metal atom contained therein is a barium atom. The main divalent metal atom is to be understood to mean a divalent metal atom having the highest content in terms of atom % among divalent metal atoms contained in this powder. However, the divalent metal atom does not include rare earth atoms. In the invention and the specification, the rare earth atoms are selected from the group consisting of a scandium atom (Sc), an yttrium atom (Y), and a lanthanoid atom. The lanthanoid atom is selected from the group consisting of a lanthanum atom (La), a cerium atom (Ce), a praseodymium atom (Pr), a neodymium atom (Nd), a promethium atom (Pm), a samarium atom (Sm), an europium atom (Eu), a gadolinium atom (Gd), a terbium atom (Tb), a dysprosium atom (Dy), a holmium atom (Ho), an erbium atom (Er), a thulium atom (Tm), an ytterbium atom (Yb), and a lutetium atom (Lu).

Hereinafter, the hexagonal strontium ferrite powder which is one aspect of the hexagonal ferrite powder will be described in more detail.

The anisotropy constant Ku can be used as an index of reduction of thermal fluctuation, that is, improvement of thermal stability. The hexagonal strontium ferrite powder can preferably have Ku equal to or greater than $1.8 \times 10^5$ $J/m^3$, and more preferably have Ku equal to or greater than $2.0 \times 10^5$ $J/m^3$. In addition, Ku of the hexagonal strontium ferrite powder can be, for example, equal to or smaller than $2.5 \times 10^5$ $J/m^3$. However, the high Ku is preferable, because it means high thermal stability, and thus, Ku is not limited to the exemplified value.

The hexagonal strontium ferrite powder may or may not include rare earth atom. In a case where the hexagonal strontium ferrite powder includes rare earth atom, it preferably includes rare earth atom in a content (bulk content) of 0.5 to 5.0 atom %, with respect to 100 atom % of iron atom is 0.5 to 5.0 atom %. In one aspect, the hexagonal strontium ferrite powder which includes rare earth atom can have a rare earth atom surface portion uneven distribution. The "rare earth atom surface portion uneven distribution" of the invention and the specification means that a rare earth atom content with respect to 100 atom % of iron atom in a solution obtained by partially dissolving the hexagonal strontium ferrite powder with acid (referred to as a "rare earth atom surface portion content" or simply as a "surface portion content" for rare earth atom) and a rare earth atom content with respect to 100 atom % of iron atom in a solution obtained by totally dissolving the hexagonal strontium ferrite powder with acid (referred to as a "rare earth atom bulk content" or simply as a "bulk content" for rare earth atom) satisfy a ratio of "rare earth atom surface portion content/rare earth atom bulk content >1.0". The rare earth atom content of the hexagonal strontium ferrite powder is identical to the bulk content. With respect to this, the partial dissolving using acid is to dissolve the surface portion of particles configuring the hexagonal strontium ferrite powder, and accordingly, the rare earth atom content in the solution obtained by the partial dissolving is the rare earth atom content in the surface portion of the particles configuring the hexagonal strontium ferrite powder. The rare earth atom surface portion content satisfying a ratio of "rare earth atom surface portion content/rare earth atom bulk content >1.0" means that the rare earth atoms are unevenly distributed in the surface portion (that is, a larger amount of the rare earth atom is present, compared to that inside), in the particles configuring the hexagonal strontium ferrite powder. The surface portion of the specification and the specification means a part of the region of the particles configuring the hexagonal strontium ferrite powder from the inside from the surface.

In a case where the hexagonal strontium ferrite powder includes rare earth atom, the hexagonal strontium ferrite powder preferably includes rare earth atom having a content (bulk content) of 0.5 to 5.0 atom % with respect to 100 atom % of an iron atom. It is surmised that the rare earth atom having the bulk content in the range described above and uneven distribution of the rare earth atom in the surface portion of the particles configuring the hexagonal strontium ferrite powder contribute to prevention of a decrease in reproducing output during repeated reproducing. This is surmised that it is because the anisotropy constant Ku can be increased due to the rare earth atom having the bulk content in the range described above included in the hexagonal strontium ferrite powder and the uneven distribution of the rare earth atom in the surface portion of the particles configuring the hexagonal strontium ferrite powder. As the value of the anisotropy constant Ku is high, occurrence of a phenomenon which is so-called thermal fluctuation can be prevented (that is, thermal stability can be improved). By preventing occurrence of thermal fluctuation, a decrease in reproducing output during repeated reproducing can be prevented. This is surmised that, the uneven distribution of the rare earth atom in the surface portion of the particles of the hexagonal strontium ferrite powder may contribute to stabilization of a spin at an iron (Fe) site in a crystal lattice of the surface portion, thereby increasing the anisotropy constant Ku.

In addition, it is also surmised that, by using the hexagonal strontium ferrite powder having a rare earth atom surface portion uneven distribution as ferromagnetic powder of the magnetic layer, chipping of the surface of the magnetic layer due to sliding with a magnetic head can be prevented. That is, it is surmised that the hexagonal strontium ferrite powder having a rare earth atom surface portion uneven distribution also contributes to improvement of running durability of a magnetic recording medium. It is surmised that, this is because the uneven distribution of the rare earth atom in the surface of the particles configuring the hexagonal strontium ferrite powder contributes to an interaction between the surface of the particles and an organic substance (for example, binding agent and/or additive) included in the magnetic layer, thereby improving hardness of the magnetic layer.

From a viewpoint of further preventing a decrease in reproducing output during repeated running and/or a viewpoint of further improving running durability, the rare earth atom content (bulk content) is preferably 0.5 to 4.5 atom %, more preferably 1.0 to 4.5 atom %, and even more preferably 1.5 to 4.5 atom %.

The bulk content is a content obtained by totally dissolving the hexagonal strontium ferrite powder. In the invention and the specification, the content of the atom is a bulk content obtained by totally dissolving the hexagonal strontium ferrite powder, unless otherwise noted. The hexagonal strontium ferrite powder which includes rare earth atom may include only one kind of rare earth atom or may include two or more kinds of rare earth atom, as the rare earth atom. In a case where two or more kinds of rare earth atom are included, the bulk content is obtained from the total of the two or more kinds of rare earth atom. The same also applies to the other components of the invention and the specification. That is, for a given component, only one kind may be used or two or more kinds may be used, unless otherwise noted. In a case where two or more kinds are used, the content is a content of the total of the two or more kinds.

In a case where the hexagonal strontium ferrite powder includes rare earth atom, the rare earth atom included therein may be any one or more kinds of the rare earth atom. Examples of the rare earth atom preferable from a viewpoint of further preventing a decrease in reproducing output during repeated reproducing include a neodymium atom, a samarium atom, an yttrium atom, and a dysprosium atom, a neodymium atom, a samarium atom, an yttrium atom are more preferable, and a neodymium atom is even more preferable.

In the hexagonal strontium ferrite powder having a rare earth atom surface portion uneven distribution, a degree of uneven distribution of the rare earth atom is not limited, as long as the rare earth atom is unevenly distributed in the surface portion of the particles configuring the hexagonal strontium ferrite powder. For example, regarding the hexagonal strontium ferrite powder, a ratio of the surface portion content of the rare earth atom obtained by partial dissolving performed under the dissolving conditions exemplified below and the bulk content of the rare earth atom obtained by total dissolving performed under the dissolving conditions exemplified below, "surface portion content/bulk content" is greater than 1.0 and can be equal to or greater than 1.5. The surface portion content satisfying a ratio of "surface portion content/bulk content >1.0" means that the rare earth atoms are unevenly distributed in the surface portion (that is, a larger amount of the rare earth atoms is present, compared to that inside), in the particles configuring the hexagonal strontium ferrite powder. In addition, the ratio of the surface portion content of the rare earth atom obtained by partial dissolving performed under the dissolving conditions exemplified below and the bulk content of the rare earth atom obtained by total dissolving performed under the dissolving conditions exemplified below, "surface portion content/bulk content" can be, for example, equal to or smaller than 10.0, equal to or smaller than 9.0, equal to or smaller than 8.0, equal to or smaller than 7.0, equal to or smaller than 6.0, equal to or smaller than 5.0, or equal to or smaller than 4.0. However, the "surface portion content/bulk content" is not limited to the exemplified upper limit or the lower limit, as long as the rare earth atom is unevenly distributed in the surface portion of the particles configuring the hexagonal strontium ferrite powder.

The partial dissolving and the total dissolving of the hexagonal strontium ferrite powder will be described below. Regarding the hexagonal strontium ferrite powder present as the powder, sample powder for the partial dissolving and the total dissolving are collected from powder of the same batch. Meanwhile, regarding the hexagonal strontium ferrite powder included in a magnetic layer of a magnetic recording medium, a part of the hexagonal strontium ferrite powder extracted from the magnetic layer is subjected to the partial dissolving and the other part is subjected to the total dissolving. The extraction of the hexagonal strontium ferrite powder from the magnetic layer can be performed by a method disclosed in a paragraph 0032 of JP2015-91747A.

The partial dissolving means dissolving performed so that the hexagonal strontium ferrite powder remaining in the solution can be visually confirmed at the time of the completion of the dissolving. For example, by performing the partial dissolving, a region of the particles configuring the hexagonal strontium ferrite powder which is 10% to 20% by mass with respect to 100% by mass of a total of the particles can be dissolved. On the other hand, the total dissolving means dissolving performed until the hexagonal strontium ferrite powder remaining in the solution is not visually confirmed at the time of the completion of the dissolving.

The partial dissolving and the measurement of the surface portion content are, for example, performed by the following method. However, dissolving conditions such as the amount of sample powder and the like described below are merely examples, and dissolving conditions capable of performing the partial dissolving and the total dissolving can be randomly used.

A vessel (for example, beaker) containing 12 mg of sample powder and 10 ml of hydrochloric acid having a concentration of 1 mol/L is held on a hot plate at a set temperature of 70° C. for 1 hour. The obtained solution is filtered with a membrane filter having a hole diameter of 0.1 μm. The element analysis of the solution obtained as described above is performed by an inductively coupled plasma (ICP) analysis device. By doing so, the surface portion content of the rare earth atom with respect to 100 atom % of the iron atom can be obtained. In a case where a plurality of kinds of rare earth atoms are detected from the element analysis, a total content of the entirety of the rare earth atoms is the surface portion content. The same applies to the measurement of the bulk content.

Meanwhile, the total dissolving and the measurement of the bulk content are, for example, performed by the following method.

A vessel (for example, beaker) containing 12 mg of sample powder and 10 ml of hydrochloric acid having a concentration of 4 mol/L is held on a hot plate at a set temperature of 80° C. for 3 hours. After that, the process is performed in the same manner as in the partial dissolving and the measurement of the surface portion content, and the bulk content with respect to 100 atom % of the iron atom can be obtained.

From a viewpoint of increasing reproducing output in a case of reproducing information recorded on a magnetic recording medium, it is desirable that the mass magnetization σs of ferromagnetic powder included in the magnetic recording medium is high. In regards to this point, in hexagonal strontium ferrite powder which includes the rare earth atom but does not have the rare earth atom surface portion uneven distribution, σs tends to significantly decrease, compared to that in hexagonal strontium ferrite powder not including the rare earth atom. With respect to this, it is surmised that, hexagonal strontium ferrite powder having the rare earth atom surface portion uneven distribution is preferable for preventing such a significant decrease in σs. In one aspect, σs of the hexagonal strontium ferrite powder can be equal to or greater than 45 A·m$^2$/kg and can also be equal to or greater than 47 A·m$^2$/kg. On the other hand, from a viewpoint of noise reduction, σs is preferably equal to or smaller than 80 A·m$^2$/kg and more preferably equal to or smaller than 60 A·m$^2$/kg. σs can be measured by using a known measurement device capable of measuring magnetic properties such as a vibrating sample magnetometer. Unless stated otherwise, the mass magnetization σs is a value measured at a magnetic field strength of 15 kOe. With regard to the unit of σs, 1[kOe]=10$^6$/4π[A/m]

With regard to the contents (bulk contents) of the constituting atoms of the hexagonal strontium ferrite powder, the content of the strontium atom in the hexagonal strontium ferrite powder can be, for example, 2.0 to 15.0 atom % with respect to 100 atom % of the iron atom. In one aspect, in the hexagonal strontium ferrite powder, the divalent metal atom included in this powder can be only a strontium atom. In another aspect, the hexagonal strontium ferrite powder can also include one or more kinds of other divalent metal atoms, in addition to the strontium atom. For example, a barium atom and/or a calcium atom can be included. In a case where the divalent metal atom other than the strontium atom is included, a content of a barium atom and a content of a calcium atom in the hexagonal strontium ferrite powder respectively can be, for example, 0.05 to 5.0 atom % with respect to 100 atom % of the iron atom.

As the crystal structure of the hexagonal ferrite, a magnetoplumbite type (also referred to as an "M type"), a W type, a Y type, and a Z type are known. The hexagonal strontium ferrite powder may have any crystal structure. The crystal structure can be confirmed by X-ray diffraction analysis. In the hexagonal strontium ferrite powder, a single crystal structure or two or more kinds of crystal structure can be detected by the X-ray diffraction analysis. For example, in one aspect, in the hexagonal strontium ferrite powder, only the M type crystal structure can be detected by the X-ray diffraction analysis. For example, the M type hexagonal ferrite is represented by a compositional formula of $AFe_{12}O_{19}$. Here, A represents a divalent metal atom, in a case where the hexagonal strontium ferrite powder has the M type, A is only a strontium atom (Sr), or in a case where a plurality of divalent metal atoms are included as A, the strontium atom (Sr) occupies the hexagonal strontium ferrite powder with the greatest content based on atom % as described above. A content of the divalent metal atom in the hexagonal strontium ferrite powder is generally determined according to the type of the crystal structure of the hexagonal ferrite and is not particularly limited. The same applies to a content of an iron atom and a content of an oxygen atom. The hexagonal strontium ferrite powder at least includes an iron atom, a strontium atom, an oxygen atom, may include a rare earth atom, and may or may not include atoms other than these atoms. As an example, the hexagonal strontium ferrite powder may include an aluminum atom (Al). A content of the aluminum atom can be, for example, 0.5 to 10.0 atom % with respect to 100 atom % of the iron atom. From a viewpoint of further preventing a decrease in reproducing output during repeated reproducing, the hexagonal strontium ferrite powder includes the iron atom, the strontium atom, the oxygen atom, and the rare earth atom, and a content of the atoms other than these atoms is preferably equal to or smaller than 10.0 atom %, more preferably 0 to 5.0 atom %, and may be 0 atom % with respect to 100 atom % of the iron atom. That is, in one aspect, the hexagonal strontium ferrite powder may not include atoms other than the iron atom, the strontium atom, the oxygen atom, and the rare earth atom. The content shown with atom % described above is obtained by converting the content (unit: % by mass) of each atom obtained by totally dissolving the hexagonal strontium ferrite powder by using the atomic weight. In addition, in the invention and the specification, a given atom which is "not included" means that the content thereof obtained by performing total dissolving and measurement by using an ICP analysis device is 0% by mass. A detection limit of the ICP analysis device is generally equal to or smaller than 0.01 ppm (parts per million) based on mass. The expression "not included" is used as a meaning including that a given atom is included with the amount smaller than the detection limit of the ICP analysis device. In one aspect, the hexagonal strontium ferrite powder does not include a bismuth atom (Bi).

The content (filling percentage) of the ferromagnetic powder of the magnetic layer is preferably 50 to 90 mass % and more preferably 60 to 90 mass %. The component other than the ferromagnetic powder of the magnetic layer is at least a binding agent, and one or more kinds of additives may be randomly included. A high filling percentage of the ferromagnetic powder in the magnetic layer is preferable from a viewpoint of improvement recording density.

Binding Agent

The magnetic tape is a coating type magnetic tape, and includes a binding agent in the magnetic layer. The binding agent is one or more kinds of resin. The resin may be a homopolymer or a copolymer. As the binding agent included in the magnetic layer, a resin selected from a polyurethane resin, a polyester resin, a polyamide resin, a vinyl chloride resin, an acrylic resin obtained by copolymerizing styrene, acrylonitrile, or methyl methacrylate, a cellulose resin such as nitrocellulose, an epoxy resin, a phenoxy resin, and a polyvinylalkylal resin such as polyvinyl acetal or polyvinyl butyral can be used alone or a plurality of resins can be mixed with each other to be used. Among these, a polyurethane resin, an acrylic resin, a cellulose resin, and a vinyl chloride resin are preferable. These resins can be used as the binding agent even in the non-magnetic layer and/or a back coating layer which will be described later. For the binding agent described above, description disclosed in paragraphs 0029 to 0031 of JP2010-024113A can be referred to. An average molecular weight of the resin used as the binding agent can be, for example, 10,000 to 200,000 as a weight-average molecular weight. The weight-average molecular weight of the invention and the specification is a value obtained by performing polystyrene conversion of a value measured by gel permeation chromatography (GPC). As the measurement conditions, the following conditions can be used. Unless otherwise noted, the weight-average molecular weight shown in examples which will be described later is a value obtained by performing polystyrene conversion of a value measured under the following measurement conditions.

GPC device: HLC-8120 (manufactured by Tosoh Corporation)

Column: TSK gel Multipore HXL-M (manufactured by Tosoh Corporation, 7.8 mmID (inner diameter)×30.0 cm)

Eluent: Tetrahydrofuran (THF)

In addition, a curing agent can also be used together with the resin usable as the binding agent. As the curing agent, in one aspect, a thermosetting compound which is a compound in which a curing reaction (crosslinking reaction) proceeds due to heating can be used, and in another aspect, a photo-curable compound in which a curing reaction (crosslinking reaction) proceeds due to light irradiation can be used. At least a part of the curing agent is included in the magnetic layer in a state of being reacted (crosslinked) with other components such as the binding agent, by proceeding the curing reaction in the manufacturing step of the magnetic tape. The preferred curing agent is a thermosetting compound, polyisocyanate is suitable. For details of the polyisocyanate, descriptions disclosed in paragraphs 0124 and 0125 of JP2011-216149A can be referred to, for example. The amount of the curing agent can be, for example, 0 to 80.0 parts by mass with respect to 100.0 parts by mass of the binding agent in the magnetic layer forming composition, and is preferably 50.0 to 80.0 parts by mass, from a viewpoint of improvement of strength of the magnetic layer.

Additives

The magnetic layer may include a ferromagnetic powder and a binding agent, and, if necessary, include one or more kinds of additives. As the additives, the curing agent described above is used as an example. In addition, examples of the additive which can be included in the magnetic layer include a non-magnetic powder (for example, inorganic powder or carbon black), a lubricant, a dispersing agent, a dispersing assistant, an antibacterial agent, an antistatic agent, and an antioxidant. As the non-magnetic powder, a non-magnetic powder which can function as an abrasive, or a non-magnetic powder which can function as a projection formation agent which forms projections suitably protruded from the surface of the magnetic layer (for example, non-magnetic colloidal particles) is used. An average particle size of the colloidal silica (silica colloidal particles) shown in examples which will be described later is a value obtained by a method disclosed in a paragraph 0015 of JP2011-048878A as a measurement method of an average particle diameter. As the additives, a commercially available product can be suitably selected or manufactured by a well-known method according to the desired properties, and any amount thereof can be used. As an example of the additive which can be used in the magnetic layer including the abrasive, a dispersing agent disclosed in paragraphs 0012 to 0022 of JP2013-131285A can be used as a dispersing agent for improving dispersibility of the abrasive. For example, for the lubricant, descriptions disclosed in paragraphs 0030 to 0033, 0035, and 0036 of JP2016-126817A can be referred to. The non-magnetic layer may include a lubricant. For the lubricant which may be included in the non-magnetic layer, descriptions disclosed in paragraphs 0030, 0031, 0034, 0035, and 0036 of JP2016-126817A can be referred to. For the dispersing agent, a description disclosed in paragraphs 0061 and 0071 of JP2012-133837A can be referred to. The dispersing agent may be included in the non-magnetic layer. For the dispersing agent which can be included in the non-magnetic layer, a description disclosed in a paragraph 0061 of JP2012-133837A can be referred to.

The magnetic layer described above can be provided on the surface of the non-magnetic support directly or indirectly through the non-magnetic layer.

Non-Magnetic Layer

Next, the non-magnetic layer will be described. The magnetic tape may directly include a magnetic layer on a non-magnetic support, or may include a non-magnetic layer including non-magnetic powder and a binding agent between the non-magnetic support and the magnetic layer. The non-magnetic powder used in the non-magnetic layer may be powder of inorganic substances or powder of organic substances. In addition, carbon black and the like can be used. Examples of the inorganic substance include metal, metal oxide, metal carbonate, metal sulfate, metal nitride, metal carbide, and metal sulfide. These non-magnetic powders can be purchased as a commercially available product or can be manufactured by a well-known method. For details thereof, descriptions disclosed in paragraphs 0146 to 0150 of JP2011-216149A can be referred to. For carbon black which can be used in the non-magnetic layer, descriptions disclosed in paragraphs 0040 and 0041 of JP2010-024113A can be referred to. The content (filling percentage) of the non-magnetic powder of the non-magnetic layer is preferably 50 to 90 mass % and more preferably 60 to 90 mass %.

In regards to other details of a binding agent or additives of the non-magnetic layer, the well-known technology regarding the non-magnetic layer can be applied. In addition, in regards to the type and the content of the binding agent, and the type and the content of the additive, for example, the well-known technology regarding the magnetic layer can be applied.

The non-magnetic layer of the magnetic tape also includes a substantially non-magnetic layer including a small amount of ferromagnetic powder as impurities or intentionally, together with the non-magnetic powder. Here, the substantially non-magnetic layer is a layer having a residual magnetic flux density equal to or smaller than 10 mT, a layer having coercivity equal to or smaller than 7.96 kA/m (100 Oe), or a layer having a residual magnetic flux density equal to or smaller than 10 mT and coercivity equal to or smaller than 7.96 kA/m (100 Oe). It is preferable that the non-magnetic layer does not have a residual magnetic flux density and coercivity.

Non-Magnetic Support

Next, the non-magnetic support will be described. As the non-magnetic support (hereinafter, also simply referred to as a "support"), well-known components such as polyethylene terephthalate, polyethylene naphthalate, polyamide, polyamide imide, aromatic polyamide subjected to biaxial stretching are used. Among these, polyethylene terephthalate, polyethylene naphthalate, and polyamide are preferable. Corona discharge, plasma treatment, easy-bonding treatment, or thermal treatment may be performed with respect to these supports in advance.

Back Coating Layer

The magnetic tape can also include a back coating layer including non-magnetic powder and a binding agent on a surface side of the non-magnetic support opposite to the surface provided with the magnetic layer. The back coating layer preferably includes one or both of carbon black and inorganic powder. In regards to the binding agent included in the back coating layer and various additives which can be randomly included in the back coating layer, a well-known technology regarding the back coating layer can be applied, and a well-known technology regarding the treatment of the magnetic layer and/or the non-magnetic layer can be applied. For example, for the back coating layer, descriptions disclosed in paragraphs 0018 to 0020 of JP2006-331625A and page 4, line 65, to page 5, line 38, of U.S. Pat. No. 7,029,774B can be referred to.

Various Thickness

A thickness of the non-magnetic support is preferably 3.0 to 6.0 µm.

A thickness of the magnetic layer is preferably equal to or smaller than 0.15 µm and more preferably equal to or smaller than 0.1 µm, from a viewpoint of realization of high-density recording required in recent years. The thickness of the magnetic layer is even more preferably 0.01 to 0.1 µm. The magnetic layer may be at least single layer, the magnetic layer may be separated into two or more layers having different magnetic properties, and a configuration of a well-known multilayered magnetic layer can be applied. A thickness of the magnetic layer in a case where the magnetic layer is separated into two or more layers is a total thickness of the layers.

A thickness of the non-magnetic layer is, for example, 0.1 to 1.5 µm and is preferably 0.1 to 1.0 µm.

A thickness of the back coating layer is preferably equal to or smaller than 0.9 µm and even more preferably 0.1 to 0.7 µm.

The thicknesses of various layers of the magnetic tape and the non-magnetic support can be acquired by a well-known film thickness measurement method. As an example, a cross section of the magnetic tape in a thickness direction is, for example, exposed by a well-known method of ion beams or microtome, and the exposed cross section is observed with a scanning electron microscope. In the cross section observation, various thicknesses can be acquired as a thickness acquired at one portion of the cross section in the thickness direction, or an arithmetical mean of thicknesses acquired at a plurality of portions of two or more portions, for example, two portions which are randomly extracted. In addition, the thickness of each layer may be acquired as a designed thickness calculated according to the manufacturing conditions.

Manufacturing Step

A step of preparing each composition for forming the magnetic layer, the non-magnetic layer, or the back coating layer generally includes at least a kneading step, a dispersing step, and a mixing step provided before and after these steps, if necessary. Each step may be divided into two or more stages. The component used in the preparation of each layer forming composition may be added at an initial stage or in a middle stage of each step. As the solvent, one kind or two or more kinds of various solvents generally used for manufacturing a coating type magnetic recording medium can be used. For the solvent, a description disclosed in a paragraph 0153 of JP2011-216149A can be referred to, for example. In addition, each component may be separately added in two or more steps. For example, a binding agent may be separately added in a kneading step, a dispersing step, and a mixing step for adjusting viscosity after the dispersion. In order to manufacture the magnetic tape, a well-known manufacturing technology of the related art can be used in various steps. In the kneading step, a kneader having a strong kneading force such as an open kneader, a continuous kneader, a pressure kneader, or an extruder is preferably used. For details of the kneading processes, descriptions disclosed in JP1989-106338A (JP-H01-106338A) and JP1989-079274A (JP-H01-079274A) can be referred to. As a dispersing device, a well-known dispersing device can be used.

In addition, as one method of obtaining a magnetic tape having the cos θ of 0.85 to 1.00, it is preferable that the dispersion conditions are reinforced (an increase in dispersion time, a decrease in diameter and/or an increase in degree of filling of dispersion beads used in the dispersion, using the dispersing agent, and the like). Each layer forming composition may be filtered by a well-known method before performing the coating step. The filtering can be performed by using a filter, for example. As the filter used in the filtering, a filter having a hole diameter of 0.01 to 3 μm (for example, filter made of glass fiber or filter made of polypropylene) can be used, for example. For details of the manufacturing method of the magnetic tape, descriptions disclosed in paragraphs 0051 to 0057 of JP2010-024113A can be referred to. For the alignment process, various well-known technologies such as descriptions disclosed in a paragraph 0052 of JP2010-024113A can be used. As one method for obtaining a magnetic tape having the cos θ of 0.85 to 1.00, a homeotropic alignment process is preferably performed. For example, the homeotropic alignment process can be performed by a well-known method using a polar opposing magnet. In the alignment zone, a drying speed of the coating layer of the magnetic layer forming composition can be controlled depending on a temperature and an air flow of dry air and/or a transportation speed of the magnetic tape in the alignment zone. In addition, the coating layer may be preliminarily dried before the transportation to the alignment zone.

A servo pattern is formed on the magnetic layer of the magnetic tape. The formation of a servo pattern on the magnetic layer is performed by magnetizing a specific position of the magnetic layer with a servo pattern recording head (also referred to as a "servo write head"). A shape of the servo pattern and disposition thereof in the magnetic layer for realizing the tracking are well known, and the region magnetized by the servo write head (position where a servo pattern is formed) is determined by standards. In regards to the servo pattern of the magnetic layer of the magnetic tape, a well-known technology can be used. For example, as a tracking system, a timing-based servo system and an amplitude-based servo system are known. The servo pattern which can be formed on the magnetic layer of the magnetic tape may be a servo pattern capable of allowing tracking of any system. In addition, a servo pattern capable of allowing tracking in the timing-based servo system and a servo pattern capable of allowing tracking in the amplitude-based servo system may be formed on the magnetic layer.

Figure 14:
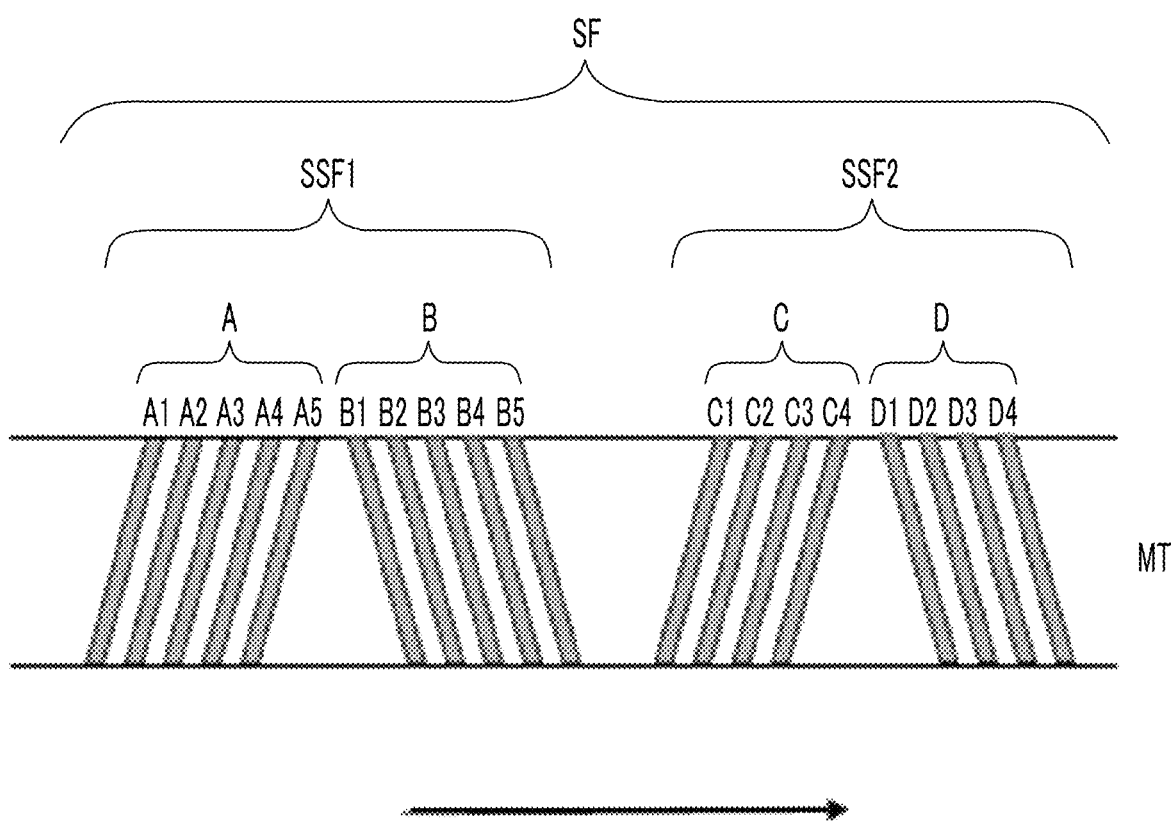
FIG. 14 shows a servo pattern disposition example of a linear-tape-open (LTO) Ultrium format tape.

In the magnetic tape, data is normally recorded on a data band of the magnetic tape. Accordingly, tracks are formed in the data band. Specifically, a plurality of regions including a servo pattern (referred to as "servo bands") are generally present in the magnetic tape along a longitudinal direction. The data band is a region interposed between two servo bands. For example, a track region 30 in FIG. 2 is a data band. The recording of data is performed on the data band, and a plurality of tracks are formed on the data band along the longitudinal direction. For example, in an LTO Ultrium format tape which is based on a local standard, a servo pattern with which the tracking of the timing-based servo system can be performed is formed. In order to perform the tracking in the timing-based servo system, a plurality of servo patterns having two or more kinds of different shapes are formed on the magnetic layer. The positions of the servo head are recognized by a time interval at which the servo head has reproduced (read) two servo patterns having different shapes, and a time interval at which the servo head has reproduced two servo patterns having the same shape. The tracking is performed based on the position of the servo head recognized as described above. Specifically, a plurality of servo patterns tilted in a tape width direction as shown in FIG. 14 are formed on a servo band, in a case of manufacturing the LTO Ultrium format tape. In FIG. 14, a servo frame SF on the servo band is configured with a servo sub-frame 1 (SSF1) and a servo sub-frame 2 (SSF2). The servo sub-frame 1 is configured with an A burst (in FIG. 14, reference numeral A) and a B burst (in FIG. 14, reference numeral B). The A burst is configured with servo patterns A1 to A5 and the B burst is configured with servo patterns B1 to B5. Meanwhile, the servo sub-frame 2 is configured with a C burst (in FIG. 14, reference numeral C) and a D burst (in FIG. 14, reference numeral D). The C burst is configured with servo patterns C1 to C4 and the D burst is configured with servo patterns D1 to D4. Such 18 servo patterns are disposed in the sub-frames in the arrangement of 5, 5, 4, 4, as the sets of 5 servo patterns and 4 servo patterns, and are used for recognizing the servo frames. FIG. 14 shows one servo frame for description. However, in practice, in the magnetic layer of the magnetic tape in which the tracking is performed in the timing-based servo system, a plurality of servo frames are disposed in each servo band in a running direction. In FIG. 14, an arrow shows the running direction. For example, an LTO Ultrium format tape generally includes 5,000 or more servo frames per a tape length of 1 m, in each servo band of the magnetic layer. The servo element sequentially reads the servo patterns in the plurality of servo frames, while coming into contact with and sliding on the surface of the magnetic layer of the magnetic tape transported in the magnetic tape apparatus. Hereinafter, the servo pattern with which the tracking of the timing-based servo system can be performed is referred to as a "timing-based servo pattern".

The prevention of the magnetization at an unintended portion on the magnetic layer, during the magnetization (formation of servo pattern) by the servo write head can be evaluated, for example, by a difference ($L_{99.9}-L_{0.1}$) of a value $L_{99.9}$ of a cumulative distribution function of 99.9% of a position deviation width of an edge shape of the timing-based servo pattern specified by magnetic force microscope observation from an ideal shape in a longitudinal direction of the magnetic tape, and a value $L_{0.1}$ of the cumulative distribution function of 0.1% thereof (hereinafter, also simply referred to as a "difference ($L_{99.9}-L_{0.1}$)"). The timing-based servo pattern is formed on the magnetic layer as a plurality of servo patterns having two or more different shapes. As an example, the plurality of servo patterns having two or more different shapes are continuously disposed at regular intervals for each of the plurality of servo patterns having the same shapes. As another example, different types of the servo patterns are alternately disposed. In regards to that the servo patterns have the same shape, a position deviation of edge shapes of the servo patterns is not considered. The shapes of the servo pattern with which the tracking of the timing-based servo system can be performed and the disposition thereof on the servo band are well known and the servo pattern shown in FIG. 14 is a specific example thereof. In the invention and the specification, the edge shape of the timing-based servo pattern specified by magnetic force microscope observation is a shape of an edge (edge side) positioning on a downstream side with respect to a magnetic tape running direction (hereinafter, also simply referred to as a "running direction") in a case of recording a magnetic signal (data). For example, in FIG. 14, a side of a traveling direction of an arrow is the upstream side, and the opposite side is the downstream side.

Hereinafter, the edge shape of the timing-based servo pattern specified by magnetic force microscope observation, the difference ($L_{99.9}-L_{0.1}$) of a value $L_{99.9}$ of a cumulative distribution function of 99.9% of a position deviation width from an ideal shape of this edge shape in a longitudinal direction of the magnetic tape and a value $L_{0.1}$ of the cumulative distribution function of 0.1% thereof, and the ideal shape thereof will be described.

Hereinafter, a linear servo pattern which continuously extends from one side to the other side in the width direction of the magnetic tape and is tilted with respect to the width direction of the magnetic tape by an angle $\alpha$ will be mainly described as an example. The angle $\alpha$ is an angle formed by a line segment connecting two end portions of the edge of the servo pattern, in the tape width direction, positioning on a downstream side with respect to the running direction of the magnetic tape in a case of recording a magnetic signal (data), and the width direction of the magnetic tape. This point will also be described, hereinafter.

Figure 15:
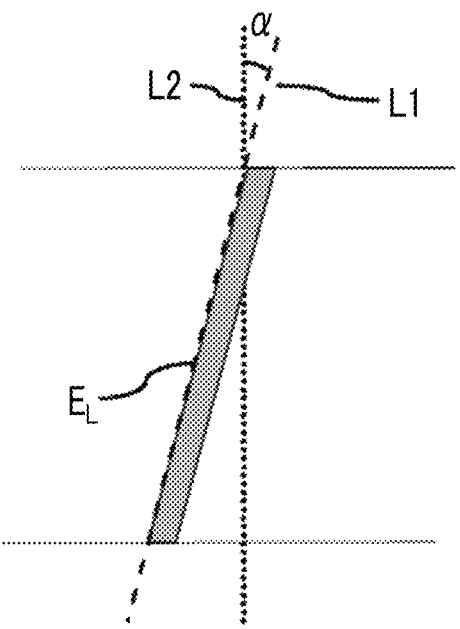
FIG. 15 is an explanatory view of an angle α regarding an edge shape of a servo pattern.
Figure 16:
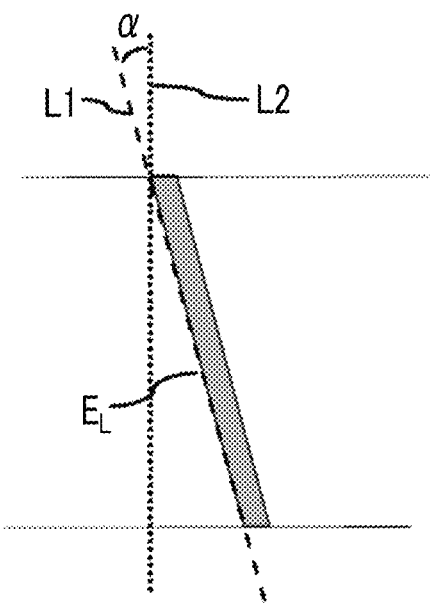
FIG. 16 is another explanatory view of the angle α regarding the edge shape of the servo pattern.

FIGS. 15 and 16 are explanatory views of the angle $\alpha$. Regarding the servo patterns tilted towards the upstream side of the running direction such as the servo patterns A1 to A5 and C1 to C4 in the servo patterns shown in FIG. 14, an angle formed by a line segment connecting two end portions of an edge $E_L$ on the downstream side (in FIG. 15, broken line L1) and the tape width direction (in FIG. 15, broken line L2) is set as the angle $\alpha$. Meanwhile, regarding the servo patterns tilted towards the downstream side of the running direction such as the servo patterns B1 to B5 and D1 to D4, an angle formed by a line segment connecting two end portions of an edge $E_L$ on the downstream side (in FIG. 16, broken line L1) and the tape width direction (in FIG. 16, broken line L2) is set as the angle $\alpha$. The angle $\alpha$ is generally called an azimuth angle, and is determined by setting of the servo write head in a case of forming a magnetized region (servo pattern) on the servo band.

Figure 17:
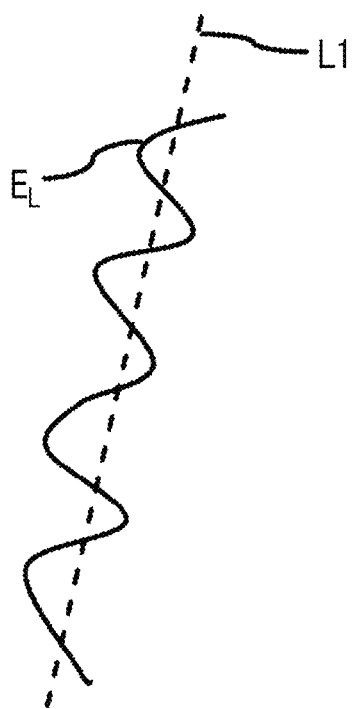
FIG. 17 shows an example of the edge shape of the servo pattern.

In a case where the servo pattern is ideally formed, in a case of forming a magnetized region (servo pattern) on the servo band, the edge shape of the servo pattern tilted by the angle $\alpha$ with respect to the width direction of the magnetic tape coincides with the shape of the line segment connecting the two end portions of the edge (in FIGS. 15 and 16, broken line L1). That is, the edge shape becomes a linear line. Accordingly, in each portion on the edge, a position deviation width from the ideal shape in the longitudinal direction of the magnetic tape (hereinafter, also simply referred to as a "position deviation width") becomes zero. However, it is considered that, as an example shown in FIG. 17, the edge shape of the servo pattern deviated from the ideal shape, an increase in position deviation width thereof, and an increase in variation of the values of the position deviation width in each portion of the edge cause a decrease in accuracy of specifying the position of the reading element by reading the servo pattern. With respect to this, the difference ($L_{99.9}-L_{0.1}$) is a value which may be an index showing a small position deviation width at each position of the edge of the servo pattern from the ideal shape and a small variation of the value of the position deviation width at each portion of the edge.

The difference ($L_{99.9}-L_{0.1}$) is a value obtained by the following method.

A surface of the magnetic layer of the magnetic tape where the servo pattern is formed is observed with a magnetic force microscope (MFM). A measurement range is set as a range where five servo patterns are included. For example, in a LTO Ultrium format tape, the measurement range is set to have a size of 90 μm×90 μm, and thus, five servo patterns of the A burst or the B burst can be observed. The servo pattern (magnetized region) is extracted by performing measurement (rough measurement) of the measurement range at a pitch of 100 nm.

Then, in order to detect a boundary between a magnetized region and a non-magnetized region in the edge of the servo pattern positioned on the downstream side with respect to the running direction, a magnetic profile is obtained by performing the measurement in the vicinity of the boundary at a pitch of 5 nm. In a case where the obtained magnetic profile is tilted with respect to the width direction of the magnetic tape by the angle $\alpha$, rotation correction is performed so that the magnetic profile follows along the magnetic tape width direction (so that $\alpha=0°$) by analysis software. After that, a position coordinate of a peak value of each profile measured at a pitch of 5 nm is calculated by analysis software. The position coordinate of the peak value shows a position of a boundary between the magnetized region and the non-magnetized region. The position coordinate is, for example, specified by an xy coordinate system in which the running direction is on the x coordinate and the width direction is on the y coordinate.

In an example of a case where the ideal shape is a linear line and the position coordinate of the position on the linear line is shown as (x,y)=(a,b), in a case where the edge shape actually obtained (position coordinate of the boundary) coincides with the ideal shape, the position coordinate to be calculated is (x,y)=(a,b). In this case, the position deviation width is zero. On the other hand, in a case where the edge shape actually obtained is deviated from the ideal shape, the x coordinate of the position of the boundary where y=b becomes x=a+c or x=a−c. The coordinate of x=a+c shows, for example, a case of being deviated to the upstream side with respect to the running direction by a width c, and the coordinate of x=a−c shows, for example, a case of being deviated to the downstream side with respect to the running direction by the width c (that is, −c, in a case of using the upstream side as a reference). Here, c is the position deviation width. That is, an absolute value of the position deviation width of the x coordinate from the ideal shape is the position deviation width in the longitudinal direction of the magnetic tape from the ideal shape. By doing so, the position deviation width at each portion of the edge on the downstream side of the running direction obtained by the measurement at a pitch of 5 nm is obtained.

Cumulative distribution functions are obtained from the value obtained regarding each servo pattern by analysis software. From the obtained cumulative distribution functions, a value $L_{99.9}$ of a cumulative distribution function of 99.9% and a value $L_{0.1}$ of the cumulative distribution function of 0.1% are obtained, and a difference ($L_{99.9}-L_{0.1}$) regarding each servo pattern is obtained from the obtained values.

The above measurement is performed in measurement ranges at three different portions (measurement number N=3).

An arithmetical mean of the difference ($L_{99.9}-L_{0.1}$) obtained regarding each servo pattern is defined as the difference ($L_{99.9}-L_{0.1}$) of the magnetic tape.

Figure 18:
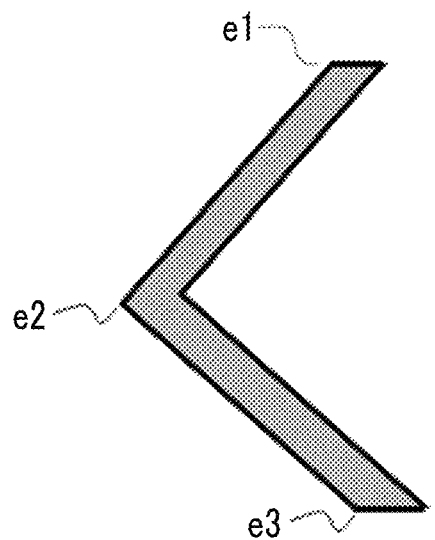
FIG. 18 shows an example of a servo pattern.
Figure 19:
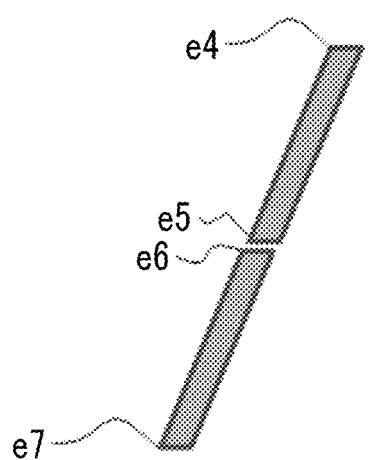
FIG. 19 shows another example of the servo pattern.
Figure 20:
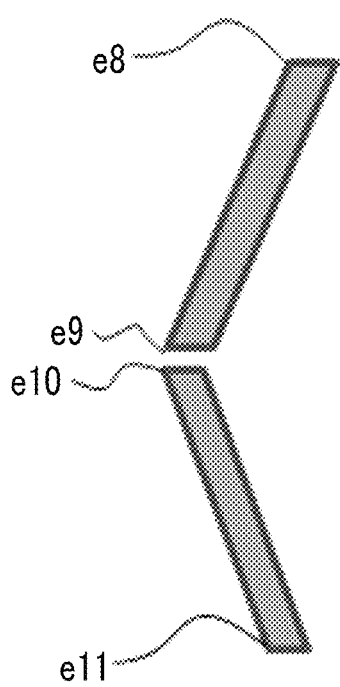
FIG. 20 shows still another example of the servo pattern.

The "ideal shape" of the edge shape of the servo pattern of the specification is an edge shape, in a case where the servo pattern is formed without any position deviation. For example, in one aspect, the servo pattern is a linear servo pattern which continuously or discontinuously extends from one side to the other side in the width direction of the magnetic tape. The "linear shape" regarding the servo pattern is a pattern shape which does not include a curved portion, regardless of the position deviation of the edge shape. The "continuous" state means extending from one side to the other side in the tape width direction without any inflection point of a tilt angle and any break. An example of a servo pattern which continuously extends from one side to the other side in the width direction of the magnetic tape is the servo pattern shown in FIG. 14. On the other hand, the "discontinuous" state means extending with one or more inflection points of a tilt angle and/or with breaks at one or more portions. A shape extending with an inflection point of a tilt angle but without any break is a so-called polygonal line shape. An example of a discontinuous servo pattern which extends from one side to the other side in the tape width direction with one inflection point of a tilt angle and without any break is a servo pattern shown in FIG. 18. Meanwhile, an example of a discontinuous servo pattern which extends from one side to the other side in the tape width direction with break at one portion without any inflection point of a tilt angle is a servo pattern shown in FIG. 19. In addition, an example of a discontinuous servo pattern which extends from one side to the other side in the tape width direction with one inflection point of a tilt angle and break at one portion is a servo pattern shown in FIG. 20.

Regarding the linear servo pattern which continuously extends from one side to the other side in the tape width direction, the "ideal shape" of the edge shape is a shape (linear line shape) of a line segment connecting two end portions of the edge on the downstream side of the running direction of the linear servo pattern. For example, the ideal shape of the linear servo pattern shown in FIG. 14 is a shape of a linear line shown as L1 in FIG. 15 or 16. Meanwhile, the ideal shape of the linear servo pattern which discontinuously extends, is a shape (linear line shape) of a line segment connecting one end and the other end of a portion where the tilt angle is the same, regarding the shape having the inflection point of the tilt angle. In addition, regarding the shape which extends with breaks at one or more portions, the ideal shape is a shape (linear line shape) of a line segment connecting one end and the other end of each portion which continuously extends. For example, regarding servo patterns shown in FIG. 18, the ideal shapes are shapes of a line segment connecting e1 and e2 and a line segment connecting e2 and e3. Regarding servo patterns shown in FIG. 19, the ideal shapes are shapes of a line segment connecting e4 and e5 and a line segment connecting e6 and e7. Regarding servo patterns shown in FIG. 20, the ideal shapes are shapes of a line segment connecting e8 and e9 and a line segment connecting e10 and e11.

Hereinabove, the linear servo pattern has been described as an example. However, the servo pattern may be a servo pattern in which the ideal shape of the edge shape is a curved shape. For example, regarding a servo pattern in which an edge shape on a downstream side with respect to the running direction is ideally a partial arc shape, the difference ($L_{99.9}-L_{0.1}$) can be obtained from the position deviation width obtained by the position coordinate of the edge shape on the downstream side with respect to the running direction, obtained by the magnetic force microscope, with respect to the position coordinate of the partial arc.

As the magnetic force microscope used in the above measurement, a magnetic force microscope which is commercially available or has a well-known configuration is used in a frequency modulation (FM) mode. As a probe of the magnetic force microscope, for example, SSS-MFMR (official radius of curvature: 15 nm) manufactured by NanoWorld AG can be used. A distance between the surface of the magnetic layer and a distal end of the probe in a case of the magnetic force microscope observation is set to be 20 to 50 nm.

In addition, as the analysis software, commercially available analysis software, or analysis software using a well-known arithmetic expression can be used.

The difference ($L_{99.9}-L_{0.1}$) can be equal to or smaller than 180 nm, equal to or smaller than 170 nm, equal to or smaller than 160 nm, equal to or smaller than 150 nm, equal to or smaller than 140 nm, equal to or smaller than 130 nm, equal to or smaller than 120 nm, equal to or smaller than 110 nm, or equal to or smaller than 100 nm. In addition, the difference ($L_{99.9}-L_{0.1}$) can be, for example, equal to or greater than 50 nm, equal to or greater than 60 nm, or equal to or greater than 70 nm. The difference ($L_{99.9}-L_{0.1}$) can be controlled by the kind (specifically, leakage magnetic field) of the servo write head used for forming the servo pattern. As the servo write head, a servo write head having a leakage magnetic field of 150 to 400 kA/m and preferably 200 to 400 kA/m can be used, for example. However, as the activation volume of the hexagonal ferrite powder included in the magnetic layer decreases, a decrease in difference ($L_{99.9}-L_{0.1}$) tends to hardly occur, only by improving ability of the servo write head. It is surmised that this is because that the strain of the disposition of particles of the hexagonal ferrite powder in the magnetic layer is easily generated due to a decrease in activation volume, and the magnetic strain is easily generated on the magnetic layer. However, this is merely a surmise. With respect to this, in the magnetic tape having the cos θ of 0.85 to 1.00, a decrease in difference ($L_{99.9}-L_{0.1}$), for example, to be equal to or smaller than 180 nm easily occurs, even with a small activation volume of the hexagonal ferrite powder included in the magnetic layer. This point also applies to the servo pattern other than the timing-based servo pattern. That is, the cos θ of 0.85 to 1.00 can contribute to prevention of magnetization at an unintended portion on the magnetic layer, during the magnetization (formation of servo pattern) by the servo write head.

In the timing-based servo system, for example, the servo patterns are configured of consecutive alignment of a plurality of pairs of magnetic stripes (also referred to as "servo stripes"), in each pair of which magnetic stripes are not parallel with each other, in the longitudinal direction of the magnetic tape. Servo signals can be obtained by reading the servo stripes with the servo element.

In one aspect, information on the number of servo bands (also referred to as information on a "servo band identification (ID)" or a "unique data band identification method (UDIM)") is embedded in each servo band as shown in Japanese Patent Application Publication No. 2004-318983. This servo band ID is recorded shiftedly such that the position of a specific pair of servo stripes, among a plurality of servo stripes present in a servo band, should shift in the longitudinal direction of the magnetic tape. Specifically, the degree of shifting the specific pair of servo stripes among the plurality of pairs of servo stripes is changed by each servo band. Accordingly, the recorded servo band ID is unique by each servo band, and the servo band is uniquely specified by reading one servo band with the servo signal reading element.

As another method for uniquely specifying a servo band, a method using a staggered technique as shown in ECMA-319 can be applied. In this staggered technique, a group of a plurality of pairs of magnetic stripes (servo stripes), in each pair of which magnetic stripes are not parallel with each other and which are placed consecutively in the longitudinal direction of the magnetic tape, are shiftedly recorded by each servo band in the longitudinal direction of the magnetic tape. A combination of ways of shifting for each adjacent servo bands is unique in the entire magnetic tape. Accordingly, when a servo pattern is read with two servo signal reading elements, the servo band can be uniquely specified.

Information indicating a position in the longitudinal direction of the magnetic tape (also referred to as "longitudinal position (LPOS) information") is also generally embedded in each servo band as shown in ECMA (European Computer Manufacturers Association)-319. This LPOS information is also recorded by shifting the position of the pair of servo stripes in the longitudinal direction of the magnetic tape. Unlike the UDIM information, the same signal is recorded in each servo band in the case of LPOS information.

Other information different from UDIM information and LPOS information as mentioned above can also be embedded in the servo band. In this case, the information to be embedded may be different by each servo band like the UDIM information or may be the same by each servo band like the LPOS information.

As a method for embedding information in a servo band, a method other than the above-described method may also be employed. For example, among a group of pairs of servo stripes, a predetermined pair of servo stripes is thinned out to record a predetermined code.

The servo write head has the same number of pairs of gaps corresponding to the respective pairs of servo patterns as the number of servo bands. Generally, a core and a coil are connected to each pair of gaps, and a magnetic field generated in the core by suppling a current pulse to the coil can generate a leakage magnetic field to the pair of gaps. When a servo pattern is formed, a magnetic pattern corresponding to a pair of gaps can be transferred to the magnetic tape by inputting a current pulse while causing a magnetic tape to run over the servo write head, to form a servo pattern. Thus, the servo pattern can be formed. The width of each gap can be set as appropriate according to the density of the servo pattern to be formed. The width of each gap can be set to, for example, 1 µm or less, 1 to 10 µm, or 10 µm or larger.

Before forming a servo pattern on the magnetic tape, the magnetic tape is generally subjected to a demagnetization (erasing) treatment. This erasing treatment may be performed by adding a uniform magnetic field to the magnetic tape using a direct current magnet or an alternate current magnet. The erasing treatment includes direct current (DC) erasing and an alternating current (AC) erasing. The AC erasing is performed by gradually reducing the intensity of the magnetic field while inverting the direction of the magnetic field applied to the magnetic tape. In contrast, the DC erasing is performed by adding a one-direction magnetic field to the magnetic tape. The DC erasing further includes two methods. The first method is horizontal DC erasing of applying a one-direction magnetic field along the longitudinal direction of the magnetic field. The second method is a vertical DC erasing of applying a one-direction magnetic field along the thickness direction of the magnetic tape. The erasing treatment may be applied to the entire magnetic tape of the magnetic tape, or may be applied to each servo band of the magnetic tape.

The direction of the magnetic field of the servo pattern to be formed is determined according to the direction of the erasing. For example, when the magnetic tape has been subjected to the horizontal DC erasing, the servo pattern is formed so that the direction of the magnetic field becomes reverse to the direction of the erasing. Accordingly, the output of the servo signal, which can be yielded by reading the servo pattern, can be increased. As shown in Japanese Patent Application Publication No. 2012-53940, when a magnetic pattern is transferred to the magnetic tape which has been subjected to the vertical DC erasing using the gaps, the servo signal, which has been yielded by reading the servo pattern thus formed, has a unipolar pulse shape. In contrast, when a magnetic pattern is transferred to the magnetic tape which has been subjected to the parallel DC erasing, the servo signal, which has been yielded by reading the servo pattern thus formed, has a bipolar pulse shape.

The magnetic tape described above is generally accommodated in a magnetic tape cartridge and the magnetic tape cartridge is mounted in the magnetic tape apparatus. The configuration of the magnetic tape cartridge is well known. For one aspect of the magnetic tape cartridge, the aforementioned description regarding the magnetic tape cartridge 12 in FIG. 1 can be referred to.

According to one aspect, the following magnetic tape is also provided.

A magnetic tape comprising:

a non-magnetic support; and a magnetic layer including a ferromagnetic powder and a binding agent on the non-magnetic support, in which the magnetic layer includes a servo pattern, the ferromagnetic powder is a hexagonal ferrite powder, and a tilt cos θ of the hexagonal ferrite powder with respect to a surface of the magnetic layer acquired by cross section observation performed by using a scanning transmission electron microscope is 0.85 to 1.00.

According to one aspect, the following magnetic tape is also provided.

A magnetic tape used for recording data or reading the recorded data, the magnetic tape comprising:

a non-magnetic support; and a magnetic layer including a ferromagnetic powder and a binding agent on the non-magnetic support, in which the magnetic layer includes a servo pattern, the ferromagnetic powder is a hexagonal ferrite powder, and a tilt cos θ of the hexagonal ferrite powder with respect to a surface of the magnetic layer acquired by cross section observation performed by using a scanning transmission electron microscope is 0.85 to 1.00.

In one aspect, the reading of data may be performed by a reading element unit.

In one aspect, the reading element unit may include a plurality of reading elements each of which reads data by a linear scanning method from a specific track region including a reading target track in a track region included in the magnetic tape.

In one aspect, a reading result for each reading element may be extracted by an extraction unit.

In one aspect, the extraction unit may extract data derived from the reading target track from the reading result for each reading element.

In one aspect, the extraction unit may perform a waveform equalization process according to a deviation amount between positions of the magnetic tape and the reading element unit, with respect to each reading result for each reading element, to extract data derived from the reading target track from the reading result.

For specific aspects of the magnetic tape, the reading element unit, and the extraction unit, the aforementioned description can be referred to.

EXAMPLES

Hereinafter, the invention will be described with reference to examples. However, the invention is not limited to aspects shown in the examples. "Parts" and "%" in the following description mean "parts by mass" and "mass %", unless otherwise noted. "eq" in the following description is an equivalent and is a unit and cannot be converted into the SI unit system. In addition, steps and evaluations described below are performed in an environment of an atmosphere temperature of 23° C.±1° C., unless otherwise noted.

The average particle size described below is a value measured by a method disclosed in paragraphs 0027 to 0030 of JP2016-177851A. The measurement was performed by using transmission electron microscope H-9000 manufactured by Hitachi, Ltd. as the transmission electron microscope, and image analysis software KS-400 manufactured by Carl Zeiss as the image analysis software.

Examples 1 to 7 and Comparative Examples 1 to 6

1. Preparation of Alumina Dispersion (Abrasive Solution)

3.0 parts of 2,3-dihydroxynaphthalene (manufactured by Tokyo Chemical Industry Co., Ltd.), 31.3 parts of a 32% solution (solvent is a mixed solvent of methyl ethyl ketone and toluene) of a $SO_3Na$ group-containing polyester polyurethane resin (UR-4800 (polar group weight: 80 meq/kg) manufactured by Toyobo Co., Ltd.) as a polar group, and 570.0 parts of a mixed solution of methyl ethyl ketone and cyclohexanone (mass ratio of 1:1) as a solvent were mixed with respect to 100.0 parts of alumina powder (HIT-80 manufactured by Sumitomo Chemical Co., Ltd.; Mohs hardness: 9) having a gelatinization ratio of approximately 65% and a Brunauer-Emmett-Teller (BET) specific surface area of 20 $m^2/g$, and dispersed in the presence of zirconia beads by a paint shaker for 5 hours. After the dispersion, the dispersion liquid and the beads were separated by a mesh and an alumina dispersion (abrasive solution) was obtained.

2. Magnetic Layer Forming Composition List
Magnetic Liquid
    Hexagonal ferrite powder: 100.0 parts
      (kind: barium ferrite, activation volume: see Table 1)
    $SO_3Na$ group-containing polyurethane resin: 14.0 parts
      (Weight-average molecular weight: 70,000, $SO_3Na$ group: 0.2 meq/g)
    Dispersing agent: see Table 1
    Cyclohexanone: 150.0 parts
    Methyl ethyl ketone: 150.0 parts
Abrasive Solution
    Alumina dispersion prepared in the section (1): 6.0 parts
Silica Sol (Projection formation Agent Liquid)
    Colloidal silica (Average particle size: 100 nm) 2.0 parts
    Methyl ethyl ketone: 1.4 parts
Other Components
    Stearic acid: 2.0 parts
    Butyl stearate: 6.0 parts
    Polyisocyanate (CORONATE (registered trademark) manufactured by Tosoh Corporation): 2.5 parts
    Finishing Additive Solvent
    Cyclohexanone: 200.0 parts
    Methyl ethyl ketone: 200.0 parts The details of synthesis method of the dispersing agent shown in Table 1 are will be described later.

3. Non-Magnetic Layer Forming Composition List
Non-magnetic inorganic powder: α-iron oxide: 100.0 parts
    Average particle size (average long axis length): 0.15 μm
    Average acicular ratio: 7
    BET specific surface area: 52 $m^2/g$
Carbon black: 20.0 parts
    Average particle size: 20 nm
$SO_3Na$ group-containing polyurethane resin: 18.0 parts
    (Weight-average molecular weight: 70,000, $SO_3Na$ group: 0.2 meq/g)
Stearic acid: 1.0 part
Cyclohexanone: 300.0 parts
Methyl ethyl ketone: 300.0 parts 4. Back Coating Layer Forming Composition List
Non-magnetic inorganic powder: α-iron oxide: 80.0 parts
    Average particle size (average long axis length): 0.15 μm
    Average acicular ratio: 7
    BET specific surface area: 52 $m^2/g$
Carbon black: 20.0 parts
    Average particle size: 20 nm
A vinyl chloride copolymer: 13.0 parts
Sulfonate group-containing polyurethane resin: 6.0 parts
Phenylphosphonic acid: 3.0 parts
Methyl ethyl ketone: 155.0 parts
Stearic acid: 3.0 parts
Butyl stearate: 3.0 parts
Polyisocyanate: 5.0 parts
Cyclohexanone: 355.0 parts 5. Preparation of Each Layer Forming Composition (1) Preparation of Magnetic Layer Forming Composition The magnetic layer forming composition was prepared by the following method.

A magnetic liquid was prepared by performing beads-dispersing of the magnetic liquid components described above by using beads as the dispersion medium in a batch type vertical sand mill. Specifically, the dispersion process was performed for the dispersion retention time shown in Table 1 by using zirconia beads having a bead diameter shown in Table 1 as the beads dispersion of each stage (first stage and second stage, or first to third stages). In the beads dispersion, dispersion liquid obtained by using a filter (hole diameter of 5 μm) was filtered after completion of each stage. In the beads dispersion of each stage, the filling percentage of the dispersion medium was set to be approximately 50 to 80 volume %.

The magnetic liquid obtained as described above was mixed with the abrasive solution, silica sol, other components, and the finishing additive solvent and beads-dispersed for 5 minutes by using the sand mill, and ultrasonic dispersion was performed with a batch type ultrasonic device (20 kHz, 300 W) for 0.5 minutes. After that, the obtained mixed liquid was filtered by using a filter (hole diameter of 0.5 μm), and the magnetic layer forming composition was prepared.

A circumferential speed of a distal end of the sand mill at the time of beads dispersion was in a range of 7 to 15 m/sec.

(2) Preparation of Non-Magnetic Layer Forming Composition

The non-magnetic layer forming composition was prepared by the following method.

Various components described above excluding stearic acid, cyclohexanone, and methyl ethyl ketone were beads-dispersed by using a batch type vertical sand mill (dispersion medium: zirconia beads (bead diameter: 0.1 mm), dispersion retention time: 24 hours) to obtain dispersion liquid. After that, the remaining components were added into the obtained dispersion liquid and stirred with a dissolver. Then, the obtained dispersion liquid was filtered by using the filter (hole diameter of 0.5 μm), and a non-magnetic layer forming composition was prepared.

(3) Preparation of Back Coating Layer Forming Composition

The back coating layer forming composition was prepared by the following method.

Various components described above excluding stearic acid, butyl stearate, polyisocyanate, and cyclohexanone were kneaded and diluted by an open kneader. Then, the obtained mixed liquid was subjected to a dispersion process of 12 passes, with a transverse beads mill by using zirconia beads having a bead diameter of 1 mm, by setting a bead filling percentage as 80 volume %, a circumferential speed of rotor distal end as 10 m/sec, and a retention time for 1 pass as 2 minutes. After that, the remaining components were added into the obtained dispersion liquid and stirred with a dissolver. Then, the obtained dispersion liquid was filtered with a filter (hole diameter of 1 μm) and a back coating layer forming composition was prepared.

6. Manufacturing of Magnetic Tape and Formation of Timing-Based Servo Pattern

The non-magnetic layer forming composition prepared in the section 5.(2) was applied onto a surface of a polyethylene naphthalate support having a thickness of 5.0 μm and dried so that the thickness after the drying becomes 1.0 μm, to form a non-magnetic layer. Then, the magnetic layer forming composition prepared in the section 5.(1) was applied on the non-magnetic layer so that the thickness after the drying becomes 0.1 μm. In the examples and the comparative examples in which "performed" was shown in the column of the vertical alignment process in Table 1, a magnetic field having a magnetic field strength of 0.3 T was applied in a vertical direction with respect to a coating surface, while the coated magnetic layer forming composition is wet, to perform the vertical alignment process, and then, the coating surface was dried, and a magnetic layer was formed. In the comparative examples in which "none" was shown in the column of the vertical alignment process in Table 1, the magnetic layer forming composition applied without performing the vertical alignment process was dried and a magnetic layer was formed.

After that, the back coating layer forming composition prepared in the section 5.(3) was applied onto a surface of the polyethylene naphthalate support opposite to the surface where the non-magnetic layer and the magnetic layer are formed, and dried so that the thickness after the drying becomes 0.5 μm, and a laminate was obtained.

After that, the surface smoothing treatment (calender process) was performed with respect to the obtained laminate with a calender roll configured of only a metal roll, at a calender process speed of 100 m/min, linear pressure of 294 kN/m (300 kg/cm), and a surface temperature of a calender roll of 100° C. After that, the thermal treatment was performed in the environment of the atmosphere temperature of 70° C. for 36 hours. The laminated subjected to the thermal treatment was slit to have a width of ½ inches (0.0127 meters) using a slitter, and a magnetic tape was manufactured.

In a state where the magnetic layer of the manufactured magnetic tape was demagnetized, servo patterns having disposition and shapes according to the LTO Ultrium format were formed on the magnetic layer by using a servo write head (leakage magnetic field: see Table 1). Accordingly, a magnetic tape including data bands, servo bands, and guide bands in the disposition according to the LTO Ultrium format in the magnetic layer, and including servo patterns (timing-based servo pattern) having the disposition and the shape according to the LTO Ultrium format on the servo band is obtained. Regarding the servo write head, as the value of the leakage magnetic field increases, ability to record the servo pattern can increase. In the examples and the comparative examples, two kinds of different servo write heads having the leakage magnetic field were used.

Dispersing agents 1 to 4 shown in Table 1 are dispersing agents 1 to 4 disclosed in JP2017-224365A. For details of the synthesis method of the dispersing agents 1 to 4, a description disclosed in paragraphs 0172 to 0186 of JP2017-224365A is referred to.

In Comparative Examples 4 and 5, 2,3-dihydroxynaphthalene was used instead of the dispersing agents 1 to 4.

Evaluation Method (1) Measurement of Activation Volume

The powder in a powder lot which is the same as that of hexagonal barium ferrite powder used in the preparation of the magnetic layer forming composition was used as a measurement sample of the activation volume. The magnetic field sweep rates in the Hc measurement part at timing points of 3 minutes and 30 minutes were measured by using a vibrating sample magnetometer (manufactured by Toei Industry Co., Ltd.), and the activation volume was calculated from the relational expression described above. The measurement was performed in the environment of 23° C.±1° C. The calculated activation volume is shown in Table 1.

(2) Measurement of Cos θ

A cross section observation sample was cut out from each magnetic tape of the examples and the comparative examples and cos θ was acquired by the method described above by using this sample. The cos θ obtained regarding each magnetic tape of the examples and the comparative examples is shown in Table 2. In each magnetic tape of the examples and the comparative examples, a percentage of hexagonal ferrite particles having the aspect ratio and the length in the long axis direction in the ranges described above which is a measurement target of cos θ occupying all of the hexagonal ferrite particles observed in the STEM image, was approximately 80% to 95% based on the particle number.

The cross section observation sample used for the measurement of cos θ was manufactured by the following method.

(i) Manufacturing of Sample Including Protective Film

A sample including a protective film (laminated film of a carbon film and a platinum film) was manufactured by the following method.

A sample having a size of a width direction 10 mm×longitudinal direction 10 mm of the magnetic tape was cut out from the magnetic tape which is a target acquiring the cos θ, with a blade. The width direction of the sample described below is a direction which was a width direction of the magnetic tape before the cutting out. The same applies to the longitudinal direction.

A protective film was formed on the surface of the magnetic layer of the cut-out sample to obtain a sample including a protective film. The formation of the protective film was performed by the following method.

A carbon film (thickness of 80 nm) was formed on the surface of the magnetic layer of the sample by vacuum deposition, and a platinum (Pt) film (thickness of 30 nm) was formed on the surface of the formed carbon film by sputtering. The vacuum deposition of the carbon film and the sputtering of the platinum film were respectively performed under the following conditions.

Vacuum Deposition Conditions of Carbon Film

Deposition source: carbon (core of a mechanical pencil having a diameter of 0.5 mm)

Degree of vacuum in a chamber of a vacuum deposition device: equal to or smaller than $2\times10^{-3}$ Pa Current value: 16 A Sputtering Conditions of Platinum Film Target: Pt Degree of vacuum in a chamber of a sputtering device: equal to or smaller than 7 Pa Current value: 15 mA (ii) Manufacturing Cross Section Observation Sample A sample having a thin film shape was cut out from the sample including a protective film manufactured in the section (i), by FIB processing using a gallium ion ($Ga^+$) beam. The cutting out was performed by performing the following FIB processing two times. An acceleration voltage of the FIB processing was 30 kV.

In a first FIB processing, one end portion (that is, portion including one side surface of the sample including a protective film in the width direction) of the sample including a protective film in the longitudinal direction, including the area from the surface of the protective film to a region of a depth of approximately 5 μm was cut. The cut-out sample includes the area from the protective film to a part of the non-magnetic support.

Then, a microprobe was loaded on a cut-out surface side (that is, sample cross section side exposed by the cutting out) of the cut-out sample and the second FIB processing was performed. In the second FIB processing, the surface side opposite to the cut-out surface side (that is, one side surface in the width direction) was irradiated with a gallium ion beam to perform the cutting out of the sample. The sample was fixed by bonding the cut-out surface of the second FIB processing to the end surface of the mesh for STEM observation. After the fixation, the microprobe was removed.

In addition, the surface of the sample fixed to the mesh, from which the microprobe is removed, was irradiated with a gallium ion beam at the same acceleration voltage described above, to perform the FIB processing, and the sample fixed to the mesh was further thinned.

The cross section observation sample fixed to the mesh manufactured as described above was observed by a scanning transmission electron microscope, and the cos θ was acquired by the method described above. The cos θ acquired as described above is shown in Table 2.

(3) Evaluation of Squareness Ratio (SQ)

A squareness ratio of each manufactured magnetic tape was measured as a reference value at a magnetic field strength of 1194 kA/m (15 kOe) by using a vibrating sample magnetometer (manufactured by Toei Industry Co., Ltd.). The measurement result is shown in Table 2. 2,3-dihydroxynaphthalene used instead of the dispersing agents 1 to 4 in Comparative Example 4 and 5 is a compound used as an additive for adjusting a squareness ratio in JP2012-203955A.

A squareness ratio is known as an index for a presence state (alignment state) of the ferromagnetic powder in the magnetic layer. However, as shown in Table 2 which will be described later, a correlation was not observed between the control of the squareness ratio and the control of the cos θ. The squareness ratio is a value indicating a ratio of residual magnetization with respect to saturation magnetization, and is measured using all of the particles as targets, regardless of the shapes and size of the particles included in the hexagonal ferrite powder. With respect to this, the cos θ is a value measured by selecting the hexagonal ferrite particles having the aspect ratio and the length in the long axis direction in the ranges described above. The inventors have thought that such a difference is a reason that the control of the squareness ratio and the control of the cos θ are not correlated to each other.

(4) Measurement and Calculation of Difference ($L_{99.9}$–$L_{0.1}$)

For each magnetic tape of the examples and the comparative examples, the difference ($L_{99.9}$–$L_{0.1}$) was obtained by the following method.

Rough measurement was performed in a measurement range of the surface of the magnetic layer of the magnetic tape where the servo pattern is formed, having a size of 90 μm×90 μm, at a pitch of 100 nm, and servo patterns (magnetized region) were extracted by using Dimension 3100 manufactured by Bruker in a frequency modulation mode as a magnetic force microscope, and SSS-MFMR (nominal radius of curvature of 15 nm) manufactured by NanoWorld AG as a probe. A distance between the surface of the magnetic layer and a distal end of the probe during the magnetic force microscope observation was 20 nm. The measurement range includes five servo patterns of the A burst formed according to LTO Ultrium format, and thus, these five servo patterns were extracted.

Regarding the edge on the downstream side with respect to the running direction of each servo pattern, the measurement was performed with respect to the vicinity of the boundary between the magnetized region and non-magnetized region at a pitch of 5 nm by using the magnetic force microscope and the probe, and a magnetic profile was obtained. The obtained magnetic profile was tilted by an angle α=12°, and accordingly, rotation correction was performed by analysis software so that the angle α=0°.

The measurement was performed at three different portions of the surface of the magnetic layer. Each measurement range included five servo patterns of the A burst.

After that, the difference ($L_{99.9}$–$L_{0.1}$) was obtained by the method described above by using the analysis software. As the analysis software, MATLAB manufactured by Math Works was used. The difference ($L_{99.9}-L_{0.1}$) obtained as described above was shown in Table 2.

(5) Evaluation of Performance (i) The recording of data was performed on the magnetic layer of each magnetic tape of the examples and the comparative examples by using a recording and reproducing head mounted on TS1155 tape drive manufactured by IBM, under recording conditions of a rate of 6 m/s, a linear recording density of 600 kbpi (255 bit PRBS), and a track pitch of 2 μm. The unit kbpi is a unit of linear recording density (cannot be converted into SI unit system). The PRBS is an abbreviation of Pseudo Random Bit Sequence.

By the recording, a specific track region, where the reading target track is positioned, is formed on the magnetic layer of each magnetic tape between two adjacent tracks, that is, between a first noise mixing source track and a second noise mixing source track.

(ii) The following data reading was performed as a model experiment of performing the data reading using the reading element unit including two reading elements disposed in adjacent state. In the following model experiment, the data reading was performed by bringing the surface of the magnetic layer and the reading element into contact with each other to slide on each other.

The reading was started in a state where the magnetic head including a single reading element was disposed so that the center of the reading target track in the tape width direction coincides with the center of the reading element in the track width direction, and a first data reading was performed. During this first data reading, the servo pattern was read by the servo element, and the tracking in the timing-based servo system was also performed. In addition, the data reading operation was performed by the reading element synchronously with the servo pattern reading operation.

Then, the position of the same magnetic head was deviated in the tape width direction (one adjacent track side) by 500 nm, and a second data reading was performed, in the same manner as in the first data reading. The two times of data reading described above were respectively performed under reading conditions of a reproducing element width of 0.2 μm, a rate of 4 m/s, and a sampling rate:bit rate of 1.25 times.

A reading signal obtained by the first data reading was input to an equalizer, and the waveform equalization process according to the deviation amount of the positions between the magnetic tape and the magnetic head (reading element) of the first data reading was performed. This waveform equalization process is a process performed as follows. A ratio between an overlapping region of the reading element and the reading target track and an overlapping region of the reading element and the adjacent track is specified from the deviation amount of the position obtained by reading the servo pattern formed at regular cycle by the servo element. A convolution arithmetic operation of a tap coefficient derived from this specific ratio using an arithmetic expression, was performed with respect to the reading signal, and accordingly, the waveform equalization process was performed. The arithmetic expression is an arithmetic expression in which Extended Partial Response class 4 (EPR4) is set as a reference waveform (target). Regarding a reading signal obtained in the second data reading, the waveform equalization process was performed in the same manner.

By performing a phase matching process of the two reading signals subjected to the waveform equalization process (hereinafter, referred to as "two-dimensional signal process"), a reading signal which was expected to be obtained by the reading element unit including two reading elements disposed in an adjacent state (reading element pitch=500 nm) was obtained. Regarding the reading signal obtained by doing so, an SNR at a signal detection point was calculated.

(iii) The operation of (ii) was repeated while performing track off-set of the position of the reading element at the start of the first data reading to the first noise mixing source track and the second noise mixing source track, respectively from the center of the reading target track in the tape width direction at interval of 0.1 μm, and an envelope of the SNR with respect to the track position was obtained.

In Table 2, in the examples and the comparative examples in which "performed" is disclosed in a column of the "two-dimensional signal process", the envelope of the SNR was obtained by the method described above.

In Table 2, in the comparative examples in which "none" is disclosed in a column of the "two-dimensional signal process", the second data reading was not performed, and the envelope of the SNR was obtained regarding the first data reading result (that is, data reading result obtained with only a single element).

(iv) The envelope of the SNR of Comparative Example 1 was set as a reference envelope, and the SNR decreased from the SNR of the track center of the reference envelope by −3 dB was set as an SNR lower limit value. Regarding each envelope, the maximum track off-set amount equal to or greater than the lower limit value was set as allowable track off-set amount. In respective examples and the comparative examples, a rate of increase of the allowable track off-set amount with respect to the allowable track off-set amount of Comparative Example 1 was obtained as a "rate of increase of the allowable track off-set amount".

The results described above are shown in Table 2.

TABLE 1

| | Hexagonal ferrite | | Dispersing agent | | Magnetic liquid beads dispersion conditions First stage | |
|---|---|---|---|---|---|---|
| | powder | | | | Dispersion | Bead |
| | Activation volume [nm³] | Kind | | Content [part] | retention time [h] | diameter [mm] |
| Comparative Example 1 | 1600 | — | | — | 10 | 0.5 |
| Comparative Example 2 | 1300 | — | | — | 10 | 0.5 |
| Comparative Example 3 | 1600 | — | | — | 10 | 0.5 |

TABLE 1-continued

| | | | | | |
|---|---|---|---|---|---|
| Comparative Example 4 | 1600 | 2,3-dihydroxynaphthalene | 12.0 | 10 | 0.5 |
| Comparative Example 5 | 1600 | Dispersing agent 1 | 6.0 | 10 | 0.5 |
| Comparative Example 6 | 1600 | 2,3-dihydroxynaphthalene | 12.0 | 10 | 0.5 |
| Example 1 | 1600 | Dispersing agent 1 | 6.0 | 10 | 0.5 |
| Example 2 | 1600 | Dispersing agent 1 | 12.0 | 10 | 0.5 |
| Example 3 | 1600 | Dispersing agent 1 | 12.0 | 10 | 0.5 |
| Example 4 | 1600 | Dispersing agent 2 | 6.0 | 10 | 0.5 |
| Example 5 | 1600 | Dispersing agent 3 | 6.0 | 10 | 0.5 |
| Example 6 | 1600 | Dispersing agent 4 | 6.0 | 10 | 0.5 |
| Example 7 | 1300 | Dispersing agent 1 | 12.0 | 10 | 0.5 |

| | Magnetic liquid beads dispersion conditions | | | | | Servo write head |
|---|---|---|---|---|---|---|
| | Second stage | | Third stage | | | |
| | | | Dispersion | | | |
| | Dispersion retention time [h] | Bead diameter [mm] | retention time [h] | Bead diameter [mm] | Vertical alignment process | Leakage magnetic field [kA/m] |
| Comparative Example 1 | — | — | — | — | None | 247 |
| Comparative Example 2 | — | — | — | — | None | 247 |
| Comparative Example 3 | — | — | — | — | None | 366 |
| Comparative Example 4 | 10 | 0.1 | — | — | Performed | 247 |
| Comparative Example 5 | 10 | 0.1 | — | — | Performed | 247 |
| Comparative Example 6 | 10 | 0.1 | — | — | Performed | 247 |
| Example 1 | 10 | 0.1 | — | — | Performed | 247 |
| Example 2 | 30 | 0.1 | — | — | Performed | 247 |
| Example 3 | 10 | 0.1 | 10 | 0.05 | Performed | 247 |
| Example 4 | 10 | 0.1 | — | — | Performed | 247 |
| Example 5 | 10 | 0.1 | — | — | Performed | 247 |
| Example 6 | 10 | 0.1 | — | — | Performed | 247 |
| Example 7 | 10 | 0.1 | 10 | 0.05 | Performed | 247 |

TABLE 2

| | Evaluation result | | | | |
|---|---|---|---|---|---|
| | SQ [—] | cosθ [—] | $L_{99.9}$-$L_{0.1}$ [nm] | Two-dimensional signal process | Rate of increase of allowable track off-set amount [%] |
| Comparative Example 1 | 0.54 | 0.65 | 240 | None | 0 |
| Comparative Example 2 | 0.54 | 0.65 | 290 | None | 0 |
| Comparative Example 3 | 0.54 | 0.65 | 230 | None | 0 |
| Comparative Example 4 | 0.78 | 0.80 | 210 | None | 0 |
| Comparative Example 5 | 0.73 | 0.87 | 140 | None | 3 |
| Comparative Example 6 | 0.78 | 0.80 | 210 | Performed | 13 |
| Example 1 | 0.73 | 0.87 | 140 | Performed | 25 |
| Example 2 | 0.74 | 0.96 | 90 | Performed | 30 |
| Example 3 | 0.74 | 0.98 | 80 | Performed | 34 |
| Example 4 | 0.73 | 0.87 | 130 | Performed | 25 |
| Example 5 | 0.73 | 0.85 | 175 | Performed | 23 |
| Example 6 | 0.73 | 0.85 | 170 | Performed | 23 |
| Example 7 | 0.73 | 0.95 | 90 | Performed | 29 |

As shown in Table 2, according to the examples, the rate of increase of the allowable track off-set amount equal to or greater than 20% could be realized.

A large allowable track off-set amount obtained by the method described above is advantageous, from a viewpoint of performing the reproducing with high reproducing quality, even with a small track margin. From this viewpoint, the rate of increase of the allowable track off-set amount is preferably equal to or greater than 20%.

One aspect of the invention is effective for usage of magnetic recording for which reproducing of data recorded with high density with high reproducing quality is desired.

What is claimed is:
1. A magnetic tape apparatus comprising:
a magnetic tape;
a reading element unit; and
an extraction unit,
wherein the magnetic tape includes a non-magnetic support, and a magnetic layer including a ferromagnetic powder and a binding agent on the non-magnetic support,
the magnetic layer includes a servo pattern,
the ferromagnetic powder is a hexagonal ferrite powder,
a tilt cos θ of the hexagonal ferrite powder with respect to a surface of the magnetic layer acquired by cross section observation performed by using a scanning transmission electron microscope is 0.85 to 1.00,
the reading element unit includes a plurality of reading elements each of which reads data by a linear scanning method from a specific track region including a reading target track in a track region included in the magnetic tape, the extraction unit performs a waveform equalization process according to a deviation amount between positions of the magnetic tape and the reading element unit, with respect to each reading result for each reading element, to extract data derived from the reading target track from the reading result, and the deviation amount is determined in accordance with a result obtained by reading of the servo pattern included in the magnetic layer of the magnetic tape by a servo element.

2. The magnetic tape apparatus according to claim 1, wherein parts of the plurality of reading elements are overlapped each other in a running direction of the magnetic tape.

3. The magnetic tape apparatus according to claim 2, wherein the specific track region is a region including the reading target track and adjacent tracks which are adjacent to the reading target track, and each of the plurality of reading elements straddles over both of the reading target track and the adjacent track, in a case where a positional relationship with the magnetic tape is changed.

4. The magnetic tape apparatus according to claim 1, wherein the plurality of reading elements are disposed in a line in a state of being adjacent to each other, in a width direction of the magnetic tape.

5. The magnetic tape apparatus according to claim 1, wherein the plurality of reading elements fall in the reading target track in a width direction of the magnetic tape.

6. The magnetic tape apparatus according to claim 1, wherein the waveform equalization process is performed by using a tap coefficient determined in accordance with the deviation amount.

7. The magnetic tape apparatus according to claim 6, wherein, regarding each of the plurality of reading elements, a ratio between an overlapping region with the reading target track and an overlapping region with an adjacent track which is adjacent to the reading target track is specified from the deviation amount, and the tap coefficient is determined in accordance with the specified ratio.

8. The magnetic tape apparatus according to claim 2, wherein the waveform equalization process is performed by using a tap coefficient determined in accordance with the deviation amount.

9. The magnetic tape apparatus according to claim 8, wherein, regarding each of the plurality of reading elements, a ratio between an overlapping region with the reading target track and an overlapping region with an adjacent track which is adjacent to the reading target track is specified from the deviation amount, and the tap coefficient is determined in accordance with the specified ratio.

10. The magnetic tape apparatus according to claim 3, wherein the waveform equalization process is performed by using a tap coefficient determined in accordance with the deviation amount.

11. The magnetic tape apparatus according to claim 10, wherein, regarding each of the plurality of reading elements, a ratio between an overlapping region with the reading target track and an overlapping region with an adjacent track which is adjacent to the reading target track is specified from the deviation amount, and the tap coefficient is determined in accordance with the specified ratio.

12. The magnetic tape apparatus according to claim 4, wherein the waveform equalization process is performed by using a tap coefficient determined in accordance with the deviation amount.

13. The magnetic tape apparatus according to claim 12, wherein, regarding each of the plurality of reading elements, a ratio between an overlapping region with the reading target track and an overlapping region with an adjacent track which is adjacent to the reading target track is specified from the deviation amount, and the tap coefficient is determined in accordance with the specified ratio.

14. The magnetic tape apparatus according to claim 5, wherein the waveform equalization process is performed by using a tap coefficient determined in accordance with the deviation amount.

15. The magnetic tape apparatus according to claim 14, wherein, regarding each of the plurality of reading elements, a ratio between an overlapping region with the reading target track and an overlapping region with an adjacent track which is adjacent to the reading target track is specified from the deviation amount, and the tap coefficient is determined in accordance with the specified ratio.

16. The magnetic tape apparatus according to claim 1, wherein a reading operation by the reading element unit is performed synchronously with a reading operation by the servo element.

17. The magnetic tape apparatus according to claim 1, wherein the extraction unit includes a two-dimensional FIR filter, and the two-dimensional FIR filter composes each result obtained by performing the waveform equalization process with respect to each reading result for each reading element, to extract data derived from the reading target track from the reading result.

18. The magnetic tape apparatus according to claim 1, wherein the plurality of reading elements are a pair of reading elements.

19. The magnetic tape apparatus according to claim 1, wherein an activation volume of the hexagonal ferrite powder is equal to or smaller than $1,600 \text{ nm}^3$.

* * * * *